United States Patent
Whear

(10) Patent No.: US 12,087,969 B2
(45) Date of Patent: Sep. 10, 2024

(54) LEAD ACID BATTERY SEPARATORS HAVING IMPROVED RIB-PROFILES, BATTERIES, SYSTEMS, AND RELATED METHODS

(71) Applicant: DARAMIC, LLC, Charlotte, NC (US)

(72) Inventor: J. Kevin Whear, Utica, KY (US)

(73) Assignee: Daramic LLC, Charlotte, NC (US)

(*) Notice: Subject to any disclaimer, the term of this patent is extended or adjusted under 35 U.S.C. 154(b) by 710 days.

(21) Appl. No.: 16/979,184

(22) PCT Filed: Mar. 8, 2019

(86) PCT No.: PCT/US2019/021259
§ 371 (c)(1),
(2) Date: Sep. 9, 2020

(87) PCT Pub. No.: WO2019/173661
PCT Pub. Date: Sep. 12, 2019

(65) Prior Publication Data
US 2020/0411830 A1    Dec. 31, 2020

Related U.S. Application Data

(60) Provisional application No. 62/640,767, filed on Mar. 9, 2018.

(51) Int. Cl.
*H01M 50/463* (2021.01)
*H01M 10/14* (2006.01)
(Continued)

(52) U.S. Cl.
CPC ......... *H01M 50/463* (2021.01); *H01M 10/14* (2013.01); *H01M 50/403* (2021.01);
(Continued)

(58) Field of Classification Search
CPC .............................. H01M 10/14; H01M 10/06
See application file for complete search history.

(56) References Cited

U.S. PATENT DOCUMENTS 5,776,630 A * 7/1998 Bohnstedt ........... H01M 50/463
429/146
5,894,055 A    4/1999 Young et al.
(Continued)

FOREIGN PATENT DOCUMENTS

JP    407105929 A    4/1995
JP    2001093500     4/2001
(Continued)

OTHER PUBLICATIONS

EP Extended Search Report dated Nov. 4, 2021, from EP counterpart Application No. 19763343.1.

*Primary Examiner* — Nathanael T Zemui
(74) *Attorney, Agent, or Firm* — Hammer & Associates, P.C.

(57) ABSTRACT

Disclosed herein are exemplary embodiments of improved separators for lead acid batteries, improved lead acid batteries incorporating the improved separators, and vehicles, devices, or systems incorporating the same. A lead acid battery separator is provided with a porous membrane with a plurality of ribs extending from a surface thereon. The plurality of ribs preferably includes both positive ribs and negative ribs having similar heights. The ribs are provided with a plurality of discontinuous peaks arranged such as to provide resilient support for the porous membrane in order to resist forces exerted by active material swelling and thus mitigate the effects of acid starvation associated with such swelling, and increasing the acid availability at the electrodes. A lead acid battery is further provided that incorporates the provided separator. Such a lead acid battery may be a flooded lead acid battery, an enhanced flooded lead acid (Continued)

battery, a gel battery, an AGM battery, and may be provided as operating in a partial state of charge. Systems incorporating such a lead acid battery are also provided, such as a vehicle or any other energy storage system, such as solar or wind energy collection. Other exemplary embodiments are provided such as to have any one or more of the following: increased or improved acid availability, reduced or mitigated acid starvation, and other improvements.

19 Claims, 15 Drawing Sheets

(51) Int. Cl.
*H01M 50/403* (2021.01)
*H01M 50/406* (2021.01)
*H01M 50/451* (2021.01)
*H01M 50/489* (2021.01)

(52) U.S. Cl.
CPC ....... *H01M 50/451* (2021.01); *H01M 50/489* (2021.01); *H01M 50/406* (2021.01); *H01M 2220/20* (2013.01)

(56) References Cited

U.S. PATENT DOCUMENTS

| | | | |
|---|---|---|---|
| 6,641,954 | B2 | 11/2003 | Weerts et al. |
| 2002/0004166 | A1 | 1/2002 | Weerts et al. |
| 2003/0129486 | A1* | 7/2003 | Bohnstedt ........... H01M 50/466 428/167 |
| 2011/0091761 | A1* | 4/2011 | Miller ................. H01M 50/417 429/143 |
| 2012/0070713 | A1* | 3/2012 | Whear ................ H01M 50/463 524/21 |
| 2015/0188111 | A1* | 7/2015 | Whear ................ H01M 50/463 429/143 |
| 2015/0318529 | A1* | 11/2015 | Whear ................ H01M 50/434 429/246 |

FOREIGN PATENT DOCUMENTS

| | | |
|---|---|---|
| JP | 2001093500 A | 4/2001 |
| WO | WO2017062781 A1 | 4/2017 |
| WO | WO2017210405 A1 | 12/2017 |
| WO | WO2019087681 A1 | 5/2019 |

\* cited by examiner

☐ Foam backing simulating electrode expansion
☐ Separator with Ribs to paint
☐ Solid plate with red paint film to simulate PAM

LEAD ACID BATTERY SEPARATORS HAVING IMPROVED RIB-PROFILES, BATTERIES, SYSTEMS, AND RELATED METHODS

RELATED APPLICATIONS

This application is a 371 Application to PCT/US2019/021259, filed Mar. 8, 2019, which claims priority to and the benefit of U.S. Provisional Patent App. No. 62/640,767, filed on Mar. 9, 2018.

FIELD

In accordance with at least select embodiments, the present disclosure or invention is directed to novel or improved separators for lead acid batteries, such as flooded lead acid batteries, and in particular enhanced flooded lead acid batteries ("EFBs"), and various other lead acid batteries, such as VRLA batteries, gel batteries, and absorptive glass mat ("AGM") batteries. In accordance with at least select embodiments, the present disclosure or invention is directed to novel or improved separators, battery separators, resilient separators, balanced separators, EFB separators, separator membranes, batteries, cells, systems, methods involving the same, vehicles or devices using the same, methods of manufacturing the same, the use of the same, and combinations thereof. In addition, disclosed herein are methods, systems, and battery separators for enhancing battery life and reducing battery failure by reducing battery electrode acid starvation.

In accordance with at least certain embodiments, the present disclosure or invention is directed to novel or improved battery separators, resilient separators, balanced separators, flooded lead acid battery separators, enhanced flooded lead acid battery separators, gel battery separators, AGM battery separators, and/or the like, and combinations thereof.

In accordance with at least certain embodiments, and in addition to the exemplary separators discussed above, such separators may be used or useful in a variety of applications. Such exemplary applications may include: deep-cycling and/or partial state of charge ("PSoC") applications; electric motive machine applications, such as fork lifts and golf carts (sometimes referred to as golf cars), e-rickshaws, e-bikes, e-trikes, and/or the like; automobile applications such as starting lighting ignition ("SLI") batteries, such as those used for internal combustion engine vehicles; idle-start-stop ("ISS") vehicle applications; hybrid vehicle applications; hybrid-electric vehicle applications; batteries with high power requirements, such as uninterrupted power supply ("UPS"), or valve regulated lead acid ("VRLA") batteries, and/or for batteries with high CCA requirements; inverters; and energy storage systems, such as those found in renewable and/or alternative energy systems, such as solar and wind power collection systems; any battery in motion; any stationary battery; and/or the like; and combinations thereof.

In accordance with at least certain embodiments, and in addition to the exemplary separators and applications discussed above, such separators and applications may be used or useful in accomplishing a variety of capabilities. Such exemplary capabilities may include: increasing, enhancing, or improving battery life; increasing, enhancing, or improving acid availability to both the positive and negative electrodes; reducing or mitigating acid starvation; reducing or mitigating acid stratification; increasing, enhancing, or improving charge acceptance; reducing or mitigating the effects of oxidation; reducing or mitigating water loss; increasing, enhancing, or improving wettability; improving, enhancing, or improving acid diffusion; reducing or mitigating dendrite growth; having reduced electrical resistance; increasing, enhancing, or improving cold cranking amps; and/or the like; and combinations thereof.

In accordance with at least certain embodiments, and in addition to the exemplary separators, applications, and capabilities discussed above, such separators, applications, and capabilities may be used or useful in a variety of methods, and/or systems. Such methods and/or systems may include: increasing, enhancing, or improving battery life; increasing, enhancing, or improving acid availability to both the positive and negative electrodes; reducing or mitigating acid starvation; reducing or mitigating acid stratification; increasing, enhancing, or improving charge acceptance; reducing or mitigating the effects of oxidation; reducing or mitigating water loss; increasing, enhancing, or improving wettability; improving, enhancing, or improving acid diffusion; reducing or mitigating dendrite growth; having reduced electrical resistance; increasing, enhancing, or improving cold cranking amps; and/or the like; and combinations thereof.

In accordance with at least particular embodiments, the present disclosure or invention is directed to improved battery separators that may include an improved and novel rib design, and improved separator resiliency. In accordance with at least particular embodiments, the present disclosure or invention is directed to an improved separator for enhanced flooded lead acid batteries wherein the separator includes performance enhancing additives or coatings, carbon additives, nucleation additives, increased oxidation resistance, optimized porosity, increased void volume, amorphous silica, higher oil absorption silica, higher silanol group silica, silica with an OH to Si ratio of 21:100 to 35:100, a shish-kebab structure or morphology, a polyolefin microporous membrane containing particle-like filler in an amount of 40% or more by weight of the membrane and polymer, such as ultrahigh molecular weight polyethylene ("UHMWPE"), having shish-kebab formations with extended chain crystal (shish formation) and folded chain crystal (kebab formation) and the average repetition periodicity of the kebab formation from 1 nm to 150 nm, decreased sheet thickness, optimized tortuosity, reduced thickness, reduced oil content, increased wettability, increased acid diffusion, and/or the like, and combinations thereof.

BACKGROUND

An exemplary lead acid battery has a positive terminal and a negative terminal. Within the battery is an array of alternating positive electrodes and negative electrodes with separators interleaved between each electrode. The positive electrodes are in electrical communication with the positive terminal, and the negative electrodes are in contact with the negative terminal. The positive electrodes have a grid of lead dioxide ($PbO_2$) that is typically doped with a positive active material ("PAM"). The negative electrodes have a grid of lead (Pb) that is typically doped with a negative active material ("NAM"). Both of the PAM and NAM contribute to increasing the functionality of the electrodes. The positive and negative grids may be provided as alloys having at least one of antimony, calcium, tin, selenium, and/or the like, and combinations thereof.

The positive electrodes, negative electrodes, and separators are substantially submerged within an aqueous electrolyte solution. The electrolyte may be, for example, a solution of sulfuric acid ($H_2SO_4$) and water ($H_2O$). The electrolyte solution may have, for example, a specific gravity of approximately 1.28, with a range of approximately 1.215 to 1.300.

The reaction at the lead dioxide (PbO₂) positive (+) electrode (the "positive half-reaction") supplies electrons and is left positive. This positive half-reaction during discharge at the lead dioxide (PbO₂) positive (+) electrode produces lead sulfate (PbSO₄) and water (H₂O) and is shown below in Eq. 1:

$$PbO_2 + SO_4^{-2} + 4H^+ + 2e^- \leftrightarrow PbSO_4 + 2H_2O \quad (Eq.\ 1)$$

where:
  PbO₂ is the solid lead dioxide positive (+) electrode;
  $SO_4^{-2}$ is aqueous;
  $4H^+$ is aqueous;
  $2e^-$ is in the solid lead dioxide (PbO₂) positive (+) electrode;
  PbSO₄ is a solid precipitate within the aqueous electrolyte; and
  H₂O is a liquid.

The positive half-reaction is reversible upon charging the battery.

The negative half-reaction at the lead (Pb) negative (−) electrode (the "negative half-reaction") supplies positive ions and is left negative. The negative half-reaction during discharge produces lead sulfate (PbSO₄) and negative ions (e⁻) and is shown below in Eq. 2:

$$Pb + SO_4^{-2} \leftrightarrow H\ PbSO_4 + 2e^- \quad (Eq.\ 2)$$

where:
  Pb is the solid lead negative (−) electrode;
  $SO_4^{-2}$ is aqueous;
  PbSO₄ is a solid precipitate within the aqueous electrolyte; and
  $2e^-$ is in the lead (Pb) negative (−) electrode;

The negative half-reaction is reversible upon charging the battery.

Together, these half-reactions give way to the overall chemical reaction of the lead acid battery, as shown below in Eq. 3:

$$Pb + PbO_2 + 2H_2SO_4 \leftrightarrow 2PbSO_4 + 2H_2O \quad (Eq.\ 3)$$

where:
  Pb is the solid negative (−) electrode;
  PbO₂ is the solid positive (+) electrode;
  H₂SO₄ is a liquid within the aqueous electrolyte;
  PbSO₄ is a solid precipitate within the aqueous electrolyte; and
  H₂O is a liquid within the aqueous electrolyte.

The overall chemical reaction is reversible upon charging the battery. For each of the above reactions, discharge occurs moving from left to right, and charging occurs moving right to left. It should be noted that other elements may be added to the electrode plates or in pasting material (PAM or NAM), such as antimony (Sb) or carbon (C), in order to increase the efficiency of the above reactions.

As can be seen from the overall reaction, the acid (H₂SO₄) is necessary for the electrochemical reaction as well as providing a medium for ions to flow between the electrodes. It is therefore imperative that the electrodes be in contact with acid at all times, otherwise the electrodes will experience acid starvation and the battery will suffer in terms of capacity, performance, and life.

As can be seen in Eq. 2, the discharging reaction converts a portion of the lead (Pb), which may also present in the NAM, and the acid (H₂SO₄) into lead sulfate (PbSO₄), which is a larger molecule. As the lead sulfate is a larger molecule that the lead, it occupies a larger volume and, as will be discussed hereinafter, is believed to contribute to NAM swelling. Because the lead sulfate is formed during discharge, batteries operating in a partial state of charge (i.e., at least partially discharged) are more susceptible to NAM swelling.

As lead acid batteries are discharged, the lead (Pb) in the negative electrode is converted to the more voluminous molecule lead sulfate (PbSO₄). Upon recharge, the lead sulfate particles that are attached to the grid and have an electronic path of conductance to the grid are reduced and becomes lead. In a frequently discharged battery, this conversion of lead to lead sulfate and back again is repeated thousands of times. If the lead sulfate particle loses contact to the grid, it will not be reduced but will become inert with regard to electrochemical energy storage potential. These lead sulfate crystals that remain inert or unconverted will not continue to simply stay dormant but will continue to grow due to Ostwald Ripening, whereby small crystals dissolve and redeposit onto larger crystals. Therefore, it is a goal of the present invention to keep lead sulfate particles in direct contact with a path of electronic conductance so that they may be reduced back to lead.

In automotive batteries, such as Enhanced Flooded Batteries ("EFBs"), the plate spacing is very narrow (e.g., about 0.60 mm to about 1.00 mm), these swollen inert particles of lead sulfate crystals will grow and can actually fill the void between the electrodes. This growth of lead sulfate crystals can prevent acid from reaching the active lead particles that are still appropriately contacting the grids. Therefore, it is another goal of the present invention to extend the life of a cycling battery by maintaining ample support of the NAM and/or PAM to keep it in contact with the grid in order to prevent or mitigate the possibility or opportunities for the lead sulfate crystals from losing contact with the grid.

VRLA batteries, such that use AGM separators, have uniform compression of the active material and this yields long life in partial state of charge applications. The only support distance of the active material is essentially the width of a pore, which may be approximately 5 μm to approximately 25 μm. Since the pores are tortuous and not simply straight channels, the active material will find support by the next layer of fibers, one to two layers below the surface of the separator. In this scenario, batteries with AGM separators are able to cycle for a very long time in shallow depth discharge.

In comparison, a flooded lead acid battery may only cycle about 50% to about 85% of the AGM battery. Therefore, one particular goal of the present invention is to modify a lead acid battery separator for batteries operating in a PSoC, such as automotive applications, so as to provide as much support as possible to the active material that it may cycle in a similar manner as an AGM battery and keep the active material in contact with the grid.

Acid starvation has been witnessed to occur in the presence of NAM swelling and even PAM swelling. As the NAM swells, it presses against the negative side of the separator and pushes the positive side toward the positive electrode. If severe enough, this swelling may force portions of the separator to deflect and contact the positive electrode and/or PAM. This, in turn, pushes or squeezes the electrolyte or acid, which would normally occupy the volume between the separator and positive electrode, out of that volume. The present invention addresses acid starvation as will be discussed in greater detail herein.

Acid starvation also occurs during conditions of acid stratification, which occurs when the denser-than-water acid settles to the bottom of the battery case and the water in the electrolyte rises to the top of the case. The present invention addresses acid stratification as will be discussed in greater detail herein.

Deep cycle batteries, such as those used in golf carts (also known as golf cars), forklifts, e-rickshaws, e-bikes, electric vehicles, hybrid vehicles, idle-stop-start ("ISS") vehicles, and the like, and stationary applications, such as those used in solar or wind power collection, operate nearly constantly in a partial state of charge. Such batteries, with the possible exception of ISS batteries, are used for 8-12 hours or more being discharged before they are charged. Furthermore, the operators of those batteries may not over-charge the batteries before returning them to service. ISS batteries experience cycles of discharge and brief intermittent charging cycles, and generally rarely achieve a full charge or are ever overcharged. Due to their continuous use and discharge, it is imperative that these batteries are capable of performing to their fullest during use. This is not possible if the electrodes are acid starved.

In some instances, acid starvation can be at least partially avoided using valve regulated lead acid ("VRLA") technology where the acid is immobilized by either a gelled electrolyte and/or by an absorbent glass mat ("AGM") battery separator system. In contrast to the freely-flowing fluid electrolyte in flooded lead acid batteries, in VRLA and/or AGM batteries, the electrolyte is absorbed on a fiber or fibrous material, such as a fiber glass mat, a polymeric fiber mat, a gelled electrolyte, and so forth. However, VRLA batteries and/or AGM battery systems are substantially more expensive to manufacture than flooded battery systems. VRLA batteries and/or AGM technology in some instances, may be more sensitive to overcharging, may dry out in high heat, may experience a gradual decline in capacity, and may have a lower specific energy. Similarly, in some instances, gel VRLA technology may have higher internal resistance and may have reduced charge acceptance.

Given that electric vehicles, hybrid electric vehicles, ISS vehicles and renewable and alternative energy collection are becoming increasingly used to combat emissions of $CO_2$ and other pollutants, enhanced flooded lead acid batteries are expected to become more and more prevalent. Thus, batteries and separators that combat acid starvation are greatly needed.

For at least certain applications or batteries, there remains a need for improved separators providing for improved cycle life, reduced failure, improved performance in a partial state of charge, and/or reduced acid starvation. More particularly, there remains a need for improved separators, and improved batteries, such as those operating at a partial state of charge, utilizing an improved separator, which provides for enhancing battery life, reducing battery failure, improving oxidation stability, improving, maintaining, and/or lowering float current, improving end of charge ("EOC") current, decreasing the current and/or voltage needed to charge and/or fully charge a deep cycle battery, minimizing internal electrical resistance increases, lowering electrical resistance, reducing antimony poisoning, reducing acid stratification, reducing acid starvation, improving acid diffusion, and/or improving uniformity in lead acid batteries.

SUMMARY

The details of one or more embodiments are set forth in the description hereinafter. Other features, objects, and advantages will be apparent from the description, drawings and claims. In accordance with at least select embodiments, the present disclosure or invention may address the above issues, problems or needs. In accordance with at least certain embodiments, aspects, or objects, the present disclosure or invention may provide an improved separator and/or battery utilizing said separator that overcomes the aforementioned problems. For instance, by providing batteries that increase, enhance, or improve battery life; increase, enhance, or improve acid availability to both the positive and negative electrodes; reduce or mitigate acid starvation; reduce or mitigate acid stratification; increase, enhance, or improve charge acceptance; reduce or mitigate the effects of oxidation; reduce or mitigate water loss; increase, enhance, or improve wettability; increase, enhance, or improve acid diffusion; reduce or mitigate dendrite growth; having reduced electrical resistance; increase, enhance, or improve cold cranking amps; and/or the like; and combinations thereof.

In accordance with at least selected embodiments, the present disclosure or invention may address the above issues or needs and/or may provide novel or improved separators and/or enhanced flooded batteries. In accordance with at least selected embodiments, the present disclosure or invention is directed to novel or improved separators, battery separators, enhanced flooded battery separators, gel battery separators, AGM battery separators, batteries, cells, and/or methods of manufacture and/or use of such separators, battery separators, enhanced flooded battery separators, gel battery separators, AGM battery separators, cells, and/or batteries. In accordance with at least certain embodiments, the present disclosure or invention is directed to novel or improved battery separators, resilient separators, balanced separators, flooded lead acid battery separators, or enhanced flooded battery separators, gel battery separators, AGM battery separators, separators for automobile applications, for idle-start-stop ("ISS") batteries, for batteries with high power requirements, such as uninterrupted power supply ("UPS") or valve regulated lead acid ("VRLA"), and/or for batteries with high CCA requirements, and/or improved methods of making and/or using such improved separators, cells, batteries, systems, and/or the like. In accordance with at least certain embodiments, the present disclosure or invention is directed to an improved separator for enhanced flooded batteries, VRLA batteries, gel batteries, AGM batteries, and/or improved methods of using such batteries having such improved separators. In addition, disclosed herein are methods, systems and battery separators for enhancing battery performance and life, reducing acid stratification, reducing internal electrical resistance, increasing cold cranking amps, and/or improving uniformity in at least enhanced flooded batteries. In accordance with at least particular embodiments, the present disclosure or invention is directed to an improved separator for enhanced flooded batteries, VRLA batteries, gel batteries, and/or AGM separators, wherein the separator includes decreased electrical resistance, performance enhancing additives or coatings, improved fillers, increased porosity, optimized tortuosity, reduced thickness, reduced oil content, increased wettability, increased acid diffusion, and/or the like.

In accordance with at least select embodiments, the present disclosure or invention is directed to novel or improved separators for lead acid batteries, such as flooded lead acid batteries, and in particular enhanced flooded lead acid batteries ("EFBs"), and various other lead acid batteries, such as VRLA batteries, gel batteries and absorptive glass mat ("AGM") batteries. In accordance with at least select embodiments, the present disclosure or invention is directed to novel or improved separators, battery separators, resilient separators, balanced separators, EFB separators, gel battery separators, AGM battery separators, batteries, cells, systems, methods involving the same, vehicles using the same, methods of manufacturing the same, the use of the same, and combinations thereof. In addition, disclosed herein are methods, systems, and battery separators for enhancing battery life and reducing battery failure by reducing battery electrode acid starvation.

In accordance with at least selected embodiments, the present disclosure or invention is directed to novel or improved separators, battery separators, enhanced flooded battery separators, batteries, cells, and/or methods of manufacture and/or use of such separators, battery separators, enhanced flooded battery separators, gel battery separators, AGM battery separators, cells, batteries, systems, methods, and/or vehicles using the same. In accordance with at least certain embodiments, the present disclosure or invention is directed to novel or improved battery separators, flooded lead acid battery separators, enhanced flooded lead acid battery separators, gel battery separators, or AGM battery separators, such as those useful for deep-cycling and/or partial state of charge ("PSoC") applications. Such applications may include such non-limiting examples as: electric motive machine applications, such as fork lifts and golf carts (sometimes referred to as golf cars), e-rickshaws, e-bikes, e-trikes, and/or the like; automobile applications such as starting lighting ignition ("SLI") batteries, such as those used for internal combustion engine vehicles; idle-start-stop ("ISS") vehicle batteries; hybrid vehicle applications, hybrid-electric vehicle applications; batteries with high power requirements, such as uninterrupted power supply ("UPS") or valve regulated lead acid ("VRLA"), and/or for batteries with high CCA requirements; inverters; and energy storage systems, such as those found in renewable and/or alternative energy systems, such as solar and wind power collection systems.

In accordance with at least a first aspect of certain selected embodiments, a lead acid battery separator is provided with a porous membrane having a polymer and a filler. The porous membrane is provided with at least a first surface with at least a first plurality of ribs extending from the first surface. The first plurality of ribs are provided with a first plurality of teeth or discontinuous peaks or protrusions, where each of the first plurality of teeth or discontinuous peaks or protrusions are in such proximity to one another to provide resiliency to the separator. Such resiliency may refer to the separators ability to resist deflecting while under pressure resulting from NAM swelling and even PAM swelling. Such proximity may be at least approximately 1.5 mm from one tooth, peak, or protrusion to another. The separator may be further provided with a continuous base portion with the first plurality of teeth or discontinuous peaks or protrusions extending from the base portion.

In certain embodiments, the separator may be provided with a continuous base portion with the first plurality of teeth or discontinuous peaks or protrusions extending from the base portion. The base portion may be wider than the width of the teeth or discontinuous peaks or protrusions. In addition, the base portion may extend continuously between each of the teeth or discontinuous peaks or protrusions.

In certain select embodiments, a lead acid battery separator is provided with a porous membrane having a backweb with a first surface, a second surface, and a backweb thickness defined as the distance between the first surface and the second surface. A first array of ribs may be provided extending from the first surface, and a second array of ribs may be provided extending from the second surface. The first array of ribs having a first height, and the second array of ribs having a second height; whereby the first height is no more than about 300% of the second height, no more than about 200% of the second height, and/or no more than about 100% of the second height, and/or similar ratios. Furthermore in certain aspects, the total separator thickness is no more than approximately 1.5 mm.

In certain aspects of the present invention, the lead acid battery separator may be provided with either of the first array of ribs, the second array of ribs, or both the first array of ribs and the second array of ribs being provided with a top rib width no greater than approximately 500 µm, no greater than approximately 400 µm, no greater than approximately 300 µm, no greater than approximately 200 µm, and/or no greater than approximately 100 µm, and/or similar magnitudes.

In certain select aspects of the present invention, either or both of the first array of ribs are chosen from the group consisting of solid ribs, discrete broken ribs, continuous ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, discrete teeth or toothed ribs, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In accordance with at least select embodiments of the present invention, a lead acid battery is provided with a first electrode and a second electrode. At least a portion of a separator is disposed between the first electrode and the second electrode. The separator is provided with a porous membrane backweb, wherein the backweb is provided with a first surface with a first array of ribs extending therefrom, wherein the first surface faces the first electrode. The separator may be provided with at least 20 ribs in contact with the first electrode, whereby each of the 20 ribs are provided with a first rib top width that is no greater than approximately 500 µm, no greater than approximately 400 µm, no greater than approximately 300 µm, no greater than approximately 200 µm, and/or no greater than approximately 100 µm, and/or similar magnitudes. In certain aspects, the first array of ribs may be provided with at least approximately 20 ribs, at least approximately 30 ribs, at least approximately 40 ribs, and/or more, and/or similar magnitudes on a separator width of approximately 120 mm, approximately 160 mm, and/or the like. The first electrode may be a positive electrode or a negative electrode.

In select possibly preferred embodiments, objects or aspects, the first array of ribs may have a series of discontinuous peaks with each discontinuous peak being in complete contact with the first electrode, thus creating a discontinuous supported area of the first electrode that encompasses a plurality of supported portions of the first electrode, and an unsupported portion of the first electrode; wherein a distance between adjacent supported portions of the plurality of supported portions of the first electrode is no more than approximately 6.0 mm, no more than approximately 5.0 mm, no more than approximately 4.0 mm, no more than approximately 3.0 mm, no more than approximately 2.0 mm, and/or no more than approximately 1.0 mm, and/or similar magnitudes.

In select possibly preferred embodiments, objects or aspects, the lead acid battery has a second surface facing the second electrode and having a second array of ribs extending therefrom. The first array of ribs have a height that is approximately 300% of the height of the second array of ribs, or 200%, or 100%, and/or less. Whereby the first array of ribs are positive ribs and the second array of ribs are negative ribs. In addition, the overall separator thickness may be no more than about 1.5 mm.

In certain possibly preferred embodiments, objects or aspects, the second array of ribs are provided with a second rib top width that is no greater than approximately 500 μm, no greater than approximately 400 μm, no greater than approximately 300 μm, no greater than approximately 200 μm, no greater than approximately 100 μm.

In certain select exemplary possibly preferred embodiments, objects or aspects, the inventive separator may be provided with a nucleation additive. That nucleation additive may be conductive, and be one of either carbon or barium sulfate ($BaSO_4$). Exemplary carbon additives may be carbon, conductive carbon, graphite, artificial graphite, activated carbon, carbon paper, acetylene black, carbon black, high surface area carbon black, graphene, high surface area graphene, keitjen black, carbon fibers, carbon filaments, carbon nanotubes, open-cell carbon foam, a carbon mat, carbon felt, carbon Buckminsterfullerene ("Bucky Balls"), an aqueous carbon suspension, flake graphite, oxidized carbon, and combinations thereof. The conductive element or nucleation additive may have a specific surface area of at least approximately 1,250 $m^2/g$ to approximately 1,750 $m^2/g$, or more. The nucleation additive or conductive element may be an additive within the separator, or an additive on a surface of the separator. The conductive element or nucleation additive may be applied to a surface of a separator, scrim, and/or mat by a method selected from the group consisting of; roller coating, chemical vapor deposition, co-extrusion, a controlled burn to char said surface, a controlled burn to char said surface via plasma exposure, a controlled burn to char said surface via UV exposure, toner printing, ink-jet printing, flexography printing, lithography printing, slurry coating, spraying an aqueous carbon suspension, impregnation, and combinations thereof.

In select embodiments, a lead acid battery may be provided with a separator having positive ribs and/or negative ribs that may be solid ribs, discrete broken ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, discrete teeth or toothed ribs, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In select embodiments, a lead acid battery is provided and may be one of a flat-plate battery, a flooded lead acid battery, an enhanced flooded lead acid battery ("EFB"), a valve regulated lead acid ("VRLA") battery, a deep-cycle battery, a gel battery, an absorptive glass mat ("AGM") battery, a tubular battery, an inverter battery, a vehicle battery, a starting-lighting-ignition ("SLI") vehicle battery, an idling-start-stop ("ISS") vehicle battery, an automobile battery, a truck battery, a motorcycle battery, an all-terrain vehicle battery, a forklift battery, a golf cart battery, a hybrid-electric vehicle ("HEV") battery, an electric vehicle battery, an e-rickshaw battery, an energy storage system battery, a storage battery, and an e-bike battery.

In certain select embodiments of the present invention, a vehicle battery is provided as one of an automobile battery, a truck battery, a motorcycle battery, an all-terrain vehicle battery, a starting-lighting-ignition ("SLI") vehicle battery, an idling-start-stop ("ISS") vehicle battery, a forklift battery, a golf cart battery, a hybrid-electric vehicle ("HEV") battery, an electric vehicle battery, an e-rickshaw battery, and an e-bike battery.

In certain select embodiments of the present invention, a vehicle is provided as one of an automobile, a truck, a motorcycle, an all-terrain vehicle, an idling-start-stop ("ISS") vehicle, a forklift, a golf cart, a hybrid-electric vehicle ("HEV"), an electric vehicle, a light electric vehicle, an e-rickshaw, an e-scooter, e-trike, and an e-bike In accordance with at least certain select embodiments, the separator may be provided with ribs that are one or more of the following: solid ribs, discrete broken ribs, continuous ribs, discontinuous ribs, discontinuous peaks, discontinuous protrusions, angled ribs, linear ribs, longitudinal ribs extending substantially in a machine direction of the porous membrane, lateral ribs extending substantially in a cross-machine direction of the porous membrane, transverse ribs extending substantially in the cross-machine direction of the separator, teeth, toothed ribs, serrations, serrated ribs, battlements, battlemented ribs, curved ribs, sinusoidal ribs, disposed in a continuous zig-zag-sawtooth-like fashion, disposed in a broken discontinuous zig-zag-sawtooth-like fashion, grooves, channels, textured areas, embossments, dimples, columns, mini columns, porous, non-porous, mini ribs, cross-mini ribs, and combinations thereof.

At least a portion of the first plurality of ribs may be defined by an angle that may be neither parallel nor orthogonal relative to an edge of the separator. Furthermore, the angle may be defined as an angle relative to a machine direction of the porous membrane and the angle may be one of the following: between greater than zero degrees (0°) and less than 180 degrees (180°), and greater than 180 degrees (180°) and less than 360 degrees (360°). In certain aspects of disclosed embodiments, the angle may vary throughout the plurality of ribs.

In certain select aspects of the present invention, the first plurality of ribs may have a cross-machine direction spacing pitch of approximately 1.5 mm to approximately 10 mm, and the plurality of teeth or discontinuous peaks or protrusions may have a machine direction spacing pitch of approximately 1.5 mm to approximately 10 mm.

In certain select embodiments, the separator may be provided with a second plurality of ribs extending from a second surface of the porous membrane. The second plurality of ribs may be one or more of the following: solid ribs, discrete broken ribs, continuous ribs, discontinuous ribs, discontinuous peaks, discontinuous protrusions, angled ribs, linear ribs, longitudinal ribs extending substantially in a machine direction of the porous membrane, lateral ribs extending substantially in a cross-machine direction of the porous membrane, transverse ribs extending substantially in the cross-machine direction of the separator, teeth, toothed ribs, battlements, battlemented ribs, curved ribs, sinusoidal ribs, disposed in a continuous zig-zag-sawtooth-like fashion, disposed in a broken discontinuous zig-zag-sawtooth-like fashion, grooves, channels, textured areas, embossments, dimples, columns, mini columns, porous, non-porous, mini ribs, cross-mini ribs, and combinations thereof.

At least a portion of the second plurality of ribs may be defined by an angle that may be neither parallel nor orthogonal relative to an edge of the separator. Furthermore, the angle may be defined as an angle relative to a machine direction of the porous membrane and the angle may be one of the following: between greater than zero degrees (0°) and less than 180 degrees (180°), and greater than 180 degrees (180°) and less than 360 degrees (360°). In certain aspects of disclosed embodiments, the angle may vary throughout the plurality of ribs.

The second plurality of ribs have a cross-machine or machine direction spacing pitch of approximately 1.5 mm to approximately 10 mm.

The first surface may be provided with one or more ribs that are of a different height than the first plurality of ribs disposed adjacent to an edge of the lead acid battery separator. Likewise, the second surface may be provided with one or more ribs that are of a different height than the second plurality of ribs disposed adjacent to an edge of the lead acid battery separator.

In select embodiments, the polymer may be one of the following: a polymer, polyolefin, polyethylene, polypropylene, ultra-high molecular weight polyethylene ("UHMWPE"), phenolic resin, polyvinyl chloride ("PVC"), rubber, synthetic wood pulp ("SWP"), lignins, glass fibers, synthetic fibers, cellulosic fibers, and combinations thereof.

A fibrous mat may be provided. The mat may be one or more of the following: glass fibers, synthetic fibers, silica, at least one performance enhancing additive, latex, natural rubber, synthetic rubber, and combinations thereof, and may be nonwoven, woven, mesh, fleece, net, and combinations thereof.

In addition, the separator may be a cut-piece, a leaf, a pocket, a sleeve, a wrap, an envelope, and a hybrid envelope.

According to at least certain select exemplary embodiments, a separator may be provided with resilient means for mitigating separator deflection.

In accordance with at least certain select embodiments, a lead acid battery is provided with a positive electrode with positive active material or PAM, and a negative electrode provided with negative active material or NAM. The battery may be prone to NAM and/or PAM swelling. A separator is provided with at least a portion of the separator being disposed between the positive electrode and the negative electrode. An electrolyte is provided that substantially submerges at least a portion of the positive electrode, at least a portion of the negative electrode, and at least a portion of the separator. In at least certain select embodiments, the separator may have a porous membrane made of at least a polymer and a filler. A first plurality of ribs may extend from a surface of the porous membrane. The ribs may be arranged such as to prevent acid starvation in the presence of NAM and/or PAM swelling. The lead acid battery may operate in any one or more of the following conditions: in motion, stationary, in a backup power application, in a cycling applications, in a partial state of charge or PSoC, and any combination thereof.

The ribs may be provided with a plurality of teeth, or discontinuous peaks or protrusions. Each tooth, or discontinuous peak or protrusion may be at least approximately 1.5 mm from another of the plurality of discontinuous peaks. A continuous base portion may be provided, with the plurality of teeth, or discontinuous peaks or protrusions extending therefrom.

The first plurality of ribs may further be provided so as to enhance acid mixing in a battery, particularly during movement of the battery. The separator may be disposed parallel to a start and stop motion of the battery. The separator may be provided with a mat adjacent to the positive electrode, the negative electrode, or the separator. The mat may be at least partially made of glass fibers, synthetic fibers, silica, at least one performance enhancing additive, latex, natural rubber, synthetic rubber, and any combination thereof. The mat may be nonwoven, woven, mesh, fleece, net, and combinations thereof.

In at least certain select embodiments of the present invention, the lead acid battery may be a flat-plate battery, a flooded lead acid battery, an enhanced flooded lead acid battery ("EFB"), a valve regulated lead acid ("VRLA") battery, a deep-cycle battery, a gel battery, an absorptive glass mat ("AGM") battery, a tubular battery, an inverter battery, a vehicle battery, a starting-lighting-ignition ("SLI") vehicle battery, an idling-start-stop ("ISS") vehicle battery, an automobile battery, a truck battery, a motorcycle battery, an all-terrain vehicle battery, a forklift battery, a golf cart battery, a hybrid-electric vehicle battery, an electric vehicle battery, an e-rickshaw battery, or an e-bike battery, or any combination thereof.

In certain embodiments, the battery may operate at a depth of discharge of between approximately 1% and approximately 99%.

In accordance with at least one embodiment, a microporous separator with optimized tortuosity is provided. Tortuosity refers to the degree of curvature/turns that a pore takes over its length. Thus, a microporous separator with optimized tortuosity will present a shorter path for ions to travel through the separator, thereby decreasing electrical resistance, without leading to electrical shorting. Microporous separators in accordance with such embodiments can have decreased thickness, increased pore size, more interconnected pores, and/or more open pores.

In accordance with at least certain selected embodiments, a microporous separator with increased porosity, or a separator with a different pore structure whose porosity is not significantly different from a known separator, and/or decreased thickness is provided. An ion will travel more rapidly though a microporous separator with optimized porosity, increased void volume, optimized tortuosity, and/or decreased thickness, thereby decreasing electrical resistance. Such decreased thickness may result in decreased overall weight of the battery separator, which in turn decreases the weight of the enhanced flooded battery in which the separator is used, which in turn decreases the weight of the overall vehicle in which the enhanced flooded battery is used. Such decreased thickness may alternatively result in increased space for the positive active material ("PAM") or the negative active material ("NAM") in the enhanced flooded battery in which the separator is used.

In accordance with at least certain selected embodiments, a microporous separator with increased wettability (in water or acid) is provided. The separator with increased wettability will be more accessible to the electrolyte ionic species, thus facilitating their transit across the separator and decreasing electrical resistance.

In accordance with at least one embodiment, a microporous separator with decreased final oil content is provided. Such a microporous separator will also facilitate lowered ER (electrical resistance) in an enhanced flooded battery or system.

The separator may contain improved fillers that have increased friability, and that may increase the porosity, pore size, internal pore surface area, wettability, and/or the surface area of the separator. In some embodiments, the improved fillers have high structural morphology and/or reduced particle size and/or a different amount of silanol groups than previously known fillers and/or are more hydroxylated than previously known fillers. The improved fillers may absorb more oil and/or may permit incorporation of a greater amount of processing oil during separator formation, without concurrent shrinkage or compression when the oil is removed after extrusion. The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (such as polar species, such as metals) that increase the ionic diffusion, and facilitate the flow of electrolyte and ions across the separator. Such also leads to decreased overall electrical resistance as such a separator is used in a flooded battery, such as an enhanced flooded battery.

The microporous separator further has a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In some instances, the improved battery with the improved separator with the improved pore morphology and/or fibril morphology may exhibit 20% lower, in some instances, 25% lower, in some instances, 30% lower electrical resistance, and in some instances, even more than a 30% drop in electrical resistance ("ER") (which may reduce battery internal resistance) while such a separator retains and maintains a balance of other key, desirable mechanical properties of lead acid battery separators. Further, in certain embodiments, the separators described herein have a novel and/or improved pore shape such that more electrolyte flows through or fills the pores and/or voids as compared to known separators.

In addition, the present disclosure provides improved enhanced flooded lead acid batteries having one or more improved battery separators for an enhanced flooded battery, which separator combines for the battery the desirable features of decreased acid stratification, lowered voltage drop (or an increase in voltage drop durability), and increased CCA, in some instances, more than 8%, or more than 9%, or in some embodiments, more than 10%, or more than 15%, increased CCA. Such an improved separator may result in an enhanced flooded battery whose performance matches or even exceeds the performance of an AGM battery. Such low electrical resistance separator may also be treated so as to result in an enhanced flooded lead acid battery having reduced water loss.

The separator may contain one or more performance enhancing additives, such as a surfactant, along with other additives or agents, residual oil, and fillers. Such performance enhancing additives can reduce separator oxidation and/or even further facilitate the transport of ions across the membrane contributing to the overall lowered electrical resistance for the enhanced flooded battery described herein.

The separator for a lead acid battery described herein may have a polyolefin microporous membrane, wherein the polyolefin microporous membrane has: a polymer, such as polyethylene, such as ultrahigh molecular weight polyethylene, particle-like filler, and processing plasticizer (optionally with one or more additional additives or agents). The polyolefin microporous membrane may have the particle-like filler in an amount of 40% or more by weight of the membrane. And the ultrahigh molecular weight polyethylene may have polymer in a shish-kebab formation has a plurality of extended chain crystals (the shish formations) and a plurality of folded chain crystals (the kebab formations), wherein the average repetition or periodicity of the kebab formations is from 1 nm to 150 nm, preferably, from 10 nm to 120 nm, and more preferably, from 20 nm to 100 nm (at least on portions of the rib side of the separator).

The average repetition or periodicity of the kebab formations is calculated in accordance with the following definition:

The surface of the polyolefin microporous membrane is observed using a scanning electron microscope ("SEM") after being subjected to metal vapor deposition, and then the image of the surface is taken at, for example 30,000 or 50,000-fold magnification at 1.0 kV accelerating voltage.

In the same visual area of the SEM image, at least three regions where shish-kebab formations are continuously extended in the length of at least 0.5 μm or longer are indicated. Then, the kebab periodicity of each indicated region is calculated.

The kebab periodicity is specified by Fourier transform of concentration profile (contrast profile) obtained by projecting in the vertical direction to the shish formation of the shish-kebab formation in each indicated region to calculate the average of the repetition periods.

The images are analyzed using general analysis tools, for example, MATLAB (R2013a).

Among the spectrum profiles obtained after the Fourier transform, spectrum detected in the short wavelength region are considered as noise. Such noise is mainly caused by deformation of contrast profile. The contrast profiles obtained for separators in accordance with the present invention appear to generate square-like waves (rather than sinusoidal waves). Further, when the contrast profile is a square-like wave, the profile after the Fourier transform becomes a Sine function and therefore generates plural peaks in the short wavelength region besides the main peak indicating the true kebab periodicity. Such peaks in the short wavelength region can be detected as noise.

In some embodiments, the separator for a lead acid battery described herein has a filler selected from the group consisting of silica, precipitated silica, fumed silica, and precipitated amorphous silica; wherein the molecular ratio of OH to Si groups within said filler, measured by $^{29}$Si-NMR, is within a range of from 21:100 to 35:100, in some embodiments, 23:100 to 31:100, in some embodiments, 25:100 to 29:100, and in certain preferred embodiments, 27:100 or higher.

Silanol groups change a silica structure from a crystalline structure to an amorphous structure, since the relatively stiff covalent bond network of Si—O has partially disappeared. The amorphous-like silicas such as $Si(—O—Si)_2(—OH)_2$ and $Si(—O—Si)_3(—OH)$ have plenty of distortions, which may function as various oil absorption points. Therefore oil absorbability becomes high when the amount of silanol groups (Si—OH) is increased for the silica. Additionally, the separator described herein may exhibit increased hydrophilicity and/or may have higher void volume and/or may have certain aggregates surrounded by large voids when it has a silica with a higher amount of silanol groups and/or hydroxyl groups than a silica used with a known lead acid battery separator.

The microporous separator further has a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In certain selected embodiments, a vehicle may be provided with a lead acid battery as generally described herein. The battery may further be provided with a separator as described herein. The vehicle may be an automobile, a truck, a motorcycle, an all-terrain vehicle, a forklift, a golf cart, a hybrid vehicle, a hybrid-electric vehicle battery, an electric vehicle, an idling-start-stop ("ISS") vehicle, an e-rickshaw, an e-bike, an e-bike battery, and combinations thereof.

In certain preferred embodiments, the present disclosure or invention provides a flexible battery separator whose components and physical attributes and features synergistically combine to address, in unexpected ways, previously unmet needs in the deep cycle battery industry, with an improved battery separator (a separator having a porous membrane of polymer, such as polyethylene, plus a certain amount of a performance enhancing additive and ribs) that meets or, in certain embodiments, exceeds the performance of the previously known flexible, which are currently used in many deep cycle battery applications. In particular, the inventive separators described herein are more robust, less fragile, less brittle, more stable over time (less susceptible to degradation) than separators traditionally used with deep cycle batteries. The flexible, performance enhancing additive-containing and rib possessing separators of the present invention combine the desired robust physical and mechanical properties of a polyethylene-based separator with the capabilities of a conventional separator, while also enhancing the performance of the battery system employing the same.

In accordance with at least selected embodiments, the present disclosure may address the above issues or needs. In accordance with at least certain objects, the present disclosure or invention may provide an improved separator and/or battery which overcomes the aforementioned problems, for instance by providing enhanced flooded batteries having reduced acid starvation, reduced acid stratification, reduced dendrite growth, reduced internal electrical resistance and increased cold cranking amps.

BRIEF DESCRIPTION OF THE FIGURES

FIG. 3A is a detailed view of an exemplary rib. FIG. 3B is a top-view of an exemplary separator as viewed along the machine direction of the separator. FIG. 3C is a side-view of an exemplary separator as viewed along the cross-machine direction of the separator.

FIG. 4A illustrates a charged state with a typical battery separator and FIG. 4B illustrates a discharged state with a typical battery separator. FIGS. 4C and 4D illustrate a discharged state with select embodiments of battery separators of the present invention.

DETAILED DESCRIPTION

Figure 1:
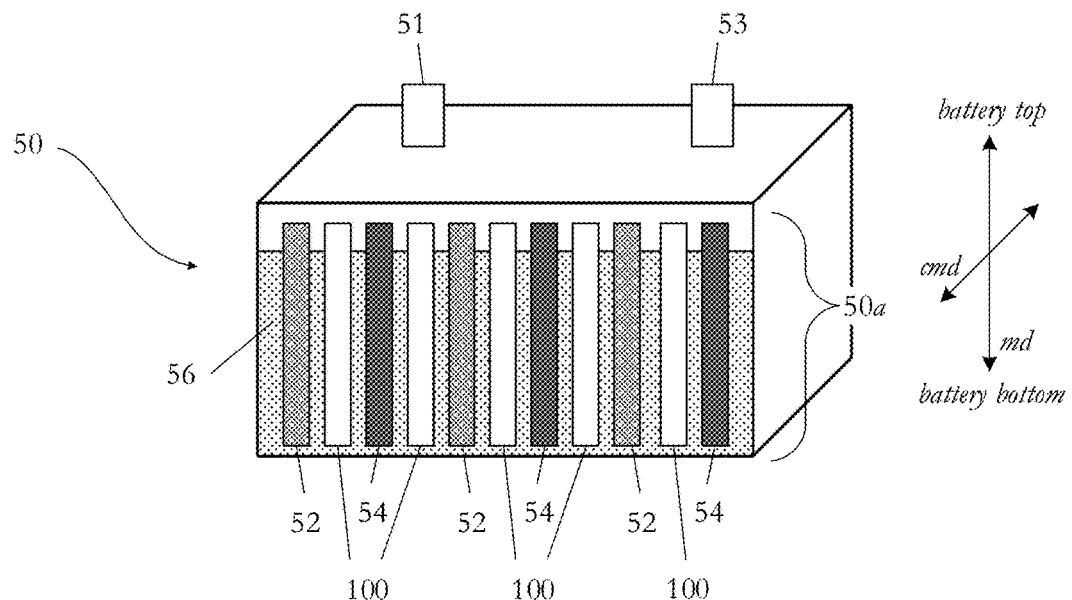
FIG. 1 illustrates a typical lead acid battery having an array of alternating positive electrodes and negative electrodes, and separators interleaved therebetween.

In accordance with at least select embodiments, objects, or aspects, the present disclosure or invention may address the above issues, problems or needs. In accordance with at least certain objects, aspects, or embodiments, the present disclosure or invention may provide an improved separator and/or battery which overcomes the aforementioned problems, for instance by providing batteries with separators that reduce acid starvation and/or mitigate the effects of acid starvation.

In accordance with at least select embodiments, the present disclosure or invention is directed to novel or improved separators, cells, batteries, systems, and/or methods of manufacture and/or use of such novel separators, cells, and/or batteries. In accordance with at least certain embodiments, the present disclosure or invention is directed to novel or improved battery separators for flat-plate batteries, tubular batteries, flooded lead acid batteries, enhanced flooded lead acid batteries ("EFBs"), deep-cycle batteries, VRLA batteries, gel batteries, absorptive glass mat ("AGM") batteries, inverter batteries, solar, wind power, or other renewable energy, or general energy storage batteries, vehicle batteries, starting-lighting-ignition ("SLI") vehicle batteries, idling-start-stop ("ISS") vehicle batteries, automobile batteries, truck batteries, motorcycle batteries, all-terrain vehicle batteries, forklift batteries, golf cart batteries, hybrid-electric vehicle batteries, electric vehicle batteries, e-rickshaw batteries, e-bike batteries, and/or improved methods of making and/or using such improved separators, cells, batteries, systems, and/or the like. In addition, disclosed herein are methods, systems, and battery separators for increasing, enhancing, or improving battery performance and life, increasing, enhancing, or improving acid availability at the positive electrode and the negative electrodes, reducing or mitigating battery failure, reducing or mitigating acid stratification, reducing or mitigating dendrite formation, increasing, enhancing, or improving oxidation stability, improving, maintaining, and/or lowering float current, improving end of charge current, decreasing the current and/or voltage needed to charge and/or fully charge a deep cycle battery, reducing internal electrical resistance, reducing antimony poisoning, increasing wettability, improving acid diffusion, improving uniformity in a lead acid battery, and/or improving cycle performance. In accordance with at least particular embodiments, the present disclosure or invention is directed to an improved separator wherein the novel separator includes novel and/or improved rib design, performance enhancing additives or coatings, improved fillers, negative cross ribs, and/or the like.

As can be seen in Eq. 2, the discharging reaction converts a portion of the lead (Pb), which may also present in the NAM, and the acid ($H_2SO_4$) into lead sulfate ($PbSO_4$), which is a larger molecule. As the lead sulfate is a larger molecule that the lead, it occupies a larger volume and, as will be discussed hereinafter, is believed to contribute to NAM swelling. Because the lead sulfate is formed during discharge, batteries operating in a partial state of charge (i.e., at least partially discharged) are more susceptible to NAM swelling. Such batteries include those operating in: hybrid vehicles; hybrid-electric vehicles; idling-start-stop ("ISS") vehicles; electric vehicles, such as forklifts, golf carts, e-rickshaws, e-trikes, and e-bikes; inverters; and renewable and/or alternative energy systems, such as solar power systems and wind power systems. Batteries in these applications may likely be deep cycle batteries, and/or operating at a partial state of charge and may experience negative active material swelling and acid starvation at the electrodes.

Battery

Referring now to FIG. 1, an exemplary lead acid battery 50 is provided with an electrode/separator array 50a that is provided with alternating positive electrodes 52 and negative electrodes 54, and a separator 100 disposed and interleaved between each positive electrode 52 and negative electrode 54. The electrode/separator array 50a is shown with leaf separators 100, however they may alternatively be formed as a positive envelope, negative envelope, hybrid envelopes, pockets, sleeves, wraps, and/or the like.

The electrodes 52, 54 and separators 100 are substantially submerged in a sulfuric acid ($H_2SO_4$) electrolyte 56. The positive electrodes 52 are in electrical communication with the positive terminal 51, and negative electrodes 54 are in electrical communication with the negative terminal 53.

The battery 50 is further provided with a positive terminal 51 that is in electrical communication with the positive electrodes 52, and a negative terminal 53 that is in electrical communication with the negative electrodes 54. The terminals 51, 53 are disposed at the top of the battery. The top and bottom of the battery are labeled in FIG. 1. FIG. 1 further labels a machine direction md arrow and a cross-machine direction cmd arrow, which correspond to the machine direction and cross-machine direction of the separators 100. The machine direction md runs from the top to the bottom of the battery 50, and the cross-machine direction cmd is substantially orthogonal to the machine direction md and substantially parallel with the separators 100.

Separator

Figure 2:
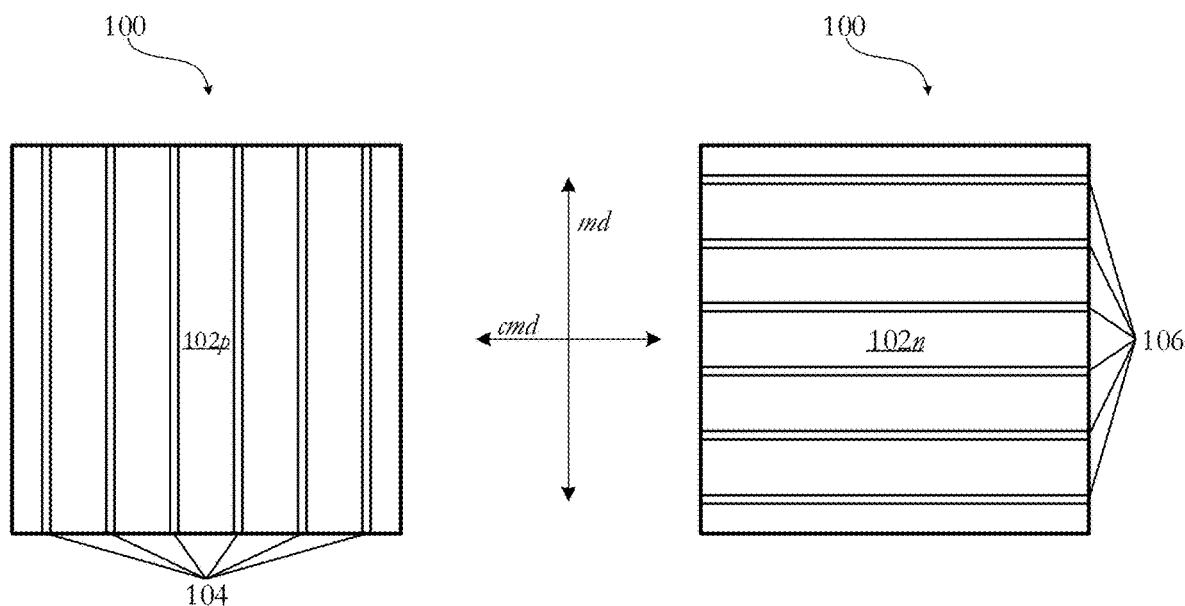
FIG. 2 depicts two surfaces of an exemplary separator with ribs longitudinally disposed in the machine direction on the left, and ribs laterally disposed in the cross-machine direction on the right.

Referring now to FIGS. 2 through 6E, an exemplary separator 100 may be provided with a porous membrane backweb 102 being a flat web having two major opposing surfaces 102p, 102n (not shown in FIG. 2). Exemplary porous membranes may be a microporous membrane having pores less than about 5 μm, preferably less than about 1 μm, a mesoporous membrane, or a macroporous membrane having pores greater than about 1 μm. The porous membrane may preferably have a pore size that is sub-micron up to 100 μm, and in certain embodiments between about 0.1 μm to about 10 μm. In certain embodiments, the porous membrane porosity described herein may be greater than approximately 50% to about 60%, and even up to approximately 65%. In certain select embodiments, the porous membrane may be flat or possess ribs that extend from one or more a surfaces 102p, 102n thereof.

With reference now to FIG. 2, the left side depicts an exemplary separator 100 shown with a porous membrane backweb 102 and an array of ribs 104 extending therefrom and substantially aligned in a longitudinal direction that is substantially aligned in a machine direction (shown as the vertical arrowed line as md) of the separator 100. On the right side of FIG. 2, the exemplary separator 100 is shown with a porous membrane backweb 102 and an array of ribs 106 extending therefrom and transversely aligned in a substantially lateral direction that is substantially aligned in a cross-machine direction (shown as the horizontal arrowed line as cmd) of the separator 100. Referring back to FIG. 1, the machine direction md is substantially aligned from the top to the bottom of the battery 50 and substantially parallel to the separators' 100 major surfaces, while the cross-machine direction cmd is substantially aligned substantially orthogonally to the machine direction, horizontally, and substantially parallel to the separators' 100 major surfaces. As shown in FIG. 1, the machine direction is shown as the arrowed line labeled md, and cross-machine direction is shown as the arrowed line labeled cmd.

Figure 3A:
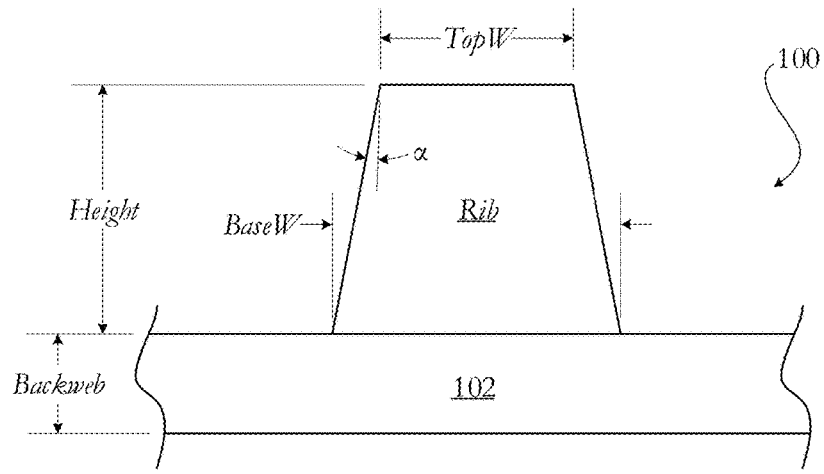
FIGS. 3A through 3C illustrate an exemplary battery separator showing the many variable and dimensions that physically define certain exemplary separators of the present invention.
Figure 3B:
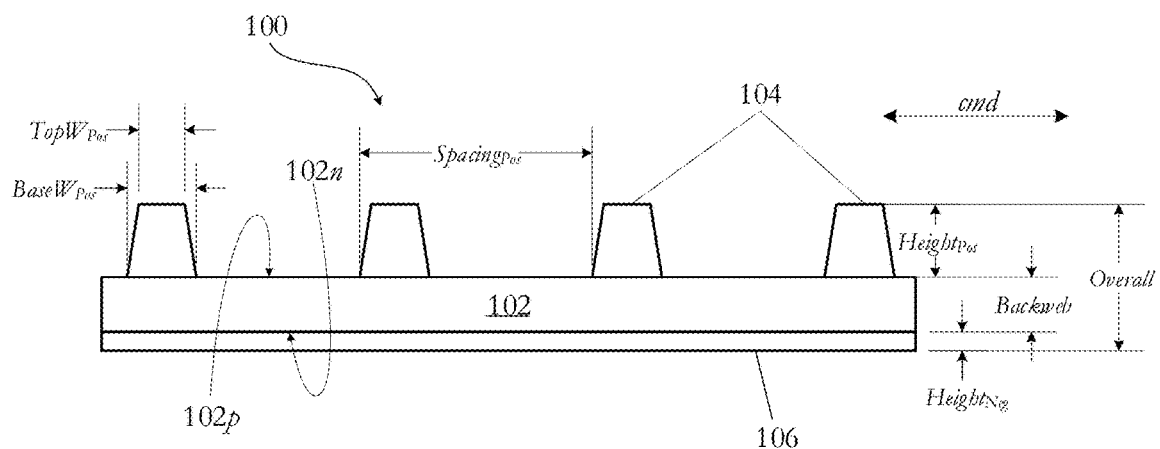
Figure 3C:
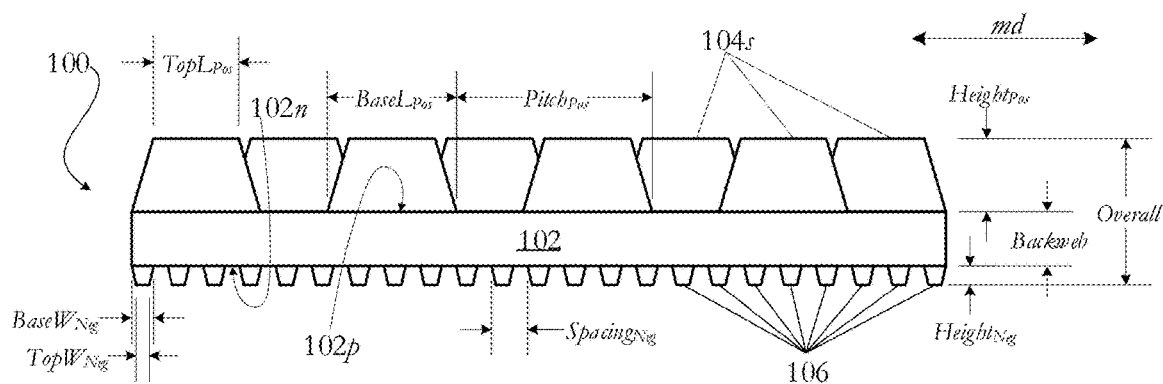

Referring now to FIGS. 3A to 3C, several dimensions are illustrated that define the physical characteristics of a non-limiting exemplary separator 100. A typical commercially available battery separator 100, such as some manufactured and sold by Daramic®, may be provided with a porous membrane backweb 102 having a positive surface 102p, and a negative surface 102n. The positive surface 102p typically faces a positive electrode when disposed in a typical lead acid battery, whereas the negative surface 102n typically faces a negative electrode when disposed in a typical lead acid battery. A series, array, or set of positive ribs 104 may extend from the positive surface 102p, while a series, array, or set of negative ribs 106 may extend from the negative surface 102n. The positive ribs 104 are sometimes referred to as major ribs as they are typically larger than the negative ribs 106, which are sometimes referred to as minor ribs.

FIG. 3A depicts a small sectional view of a typical separator 100 having a porous membrane backweb 102 with a major rib extending therefrom. FIG. 3A is an illustration viewed along the longitudinal direction of a single rib and details the dimensions of certain exemplary ribs and their relationship to a porous membrane backweb 102. Therefore FIG. 3A only shows a porous membrane 102 with a single rib extending from only one surface thereof, and is not intended to be a limiting example. As shown, the separator 100 is provided with a porous membrane backweb having a backweb thickness Backweb. A rib extends therefrom having a height Height, as measured from the backweb surface from which it extends to the top of the rib; a base width BaseW, as measured by the width of the rib's base in a dimension substantially orthogonal to the rib's length; a top width TopW, as measured by the width of the top of the rib in a dimension substantially orthogonal to the rib's length; and a draft angle α, which is measured as the angular offset of the rib side from a vertical reference.

With reference now to FIG. 3B, an exemplary embodiment of a separator 100 is shown as viewed along the machine direction of the separator 100. The separator 100 is provided with a porous membrane backweb 102 with a positive electrode facing surface 102p with positive ribs 104 extending therefrom and disposed substantially parallel to the machine direction of the separator 100, and a negative electrode facing surface 102n with solid negative ribs 106 extending therefrom and disposed substantially parallel to the cross-machine direction of the separator 100. There are four positive ribs 104 substantially extending in the machine direction, this number is merely exemplary and non-limiting. In reality, an exemplary separator would likely have many more positive ribs 104, however fewer are shown for the sake of clarity of the figure. For example, a separator may possess approximately 20, 30, 40, or more ribs across the cross-machine direction width. As an example, such cross-machine direction width may be approximately 120 mm in certain batteries, and approximately 160 mm in other certain batteries. FIG. 3B further illustrates various dimensions of a typical separator. The positive ribs 104 may be defined by a positive base width $BaseW_{Pos}$, as measured along the cross-machine direction and substantially orthogonal to the length of the rib; a top width $TopW_{Pos}$, as measured along the cross-machine direction and substantially orthogonal to the length of the rib; and a rib height $Height_{Pos}$, as measured from the positive facing surface 102p to the top of the positive rib 104. The positive ribs 104 are disposed across the width of the separator in a cross-machine direction by a rib spacing $Spacing_{Pos}$. As shown in the view provided by FIG. 3B, the negative ribs 106 are also defined by a rib height $Height_{Neg}$, as measured from the negative electrode facing surface 102n to the top of the negative rib 106. The separator 100 is defined by a backweb thickness Backweb, as measured by the distance between the positive electrode facing surface 102p and the negative electrode facing surface 102n; and an overall thickness Overall that is the sum of the positive rib height $Height_{Pos}$, the backweb thickness Backweb, and the negative rib height $Height_{Neg}$.

FIG. 3C illustrates an exemplary embodiment of a separator 100 that is substantially the same as that shown in FIG. 3B, but viewed along the cross-machine direction of the separator 100. As can be seen, the positive ribs 104 are broken into serrations 104s. However, the positive ribs may be solid, broken, angled, or curved in any fashion as will be described hereinafter. Each positive rib serration 104s is provided with a base length $BaseL_{Pos}$, as measured by the length of the base substantially along the machine direction of the separator and substantially along the length of the rib 104; and a top length $TopL_{Pos}$, as measured by the length of the top substantially along the machine direction of the separator and substantially along the length of the rib 104. In addition, the positive rib serrations 104s are spaced apart substantially along the length of the ribs 104 and substantially along the machine direction of the separator 100 at a pitch $Pitch_{Pos}$. As shown, the positive rib serrations 104s are offset from serrations of an adjacent rib 104, however the serrations 104s may alternatively be aligned in sync with adjacent serrations 104s. Similar to the positive ribs 104, the negative ribs 106 are provided with a base width $BaseW_{Neg}$, as measured substantially along the machine direction of the separator 100 and substantially orthogonal to the length of the negative ribs 106; a top width $TopW_{Neg}$, as measured substantially along the machine direction of the separator 100 and substantially orthogonal to the length of the negative ribs 106; and are further defined by a rib spacing $Spacing_{Neg}$, substantially along the machine direction of the separator 100 and substantially orthogonal to the length of the negative ribs 106. Though not shown in FIGS. 3A through 3C, a negative rib 106 may be broken into negative rib serrations 106s (shown in FIGS. 5D-5G) and spaced at a negative rib serration pitch $Pitch_{Neg}$ (shown in FIGS. 5D-5G).

Figure 4A:
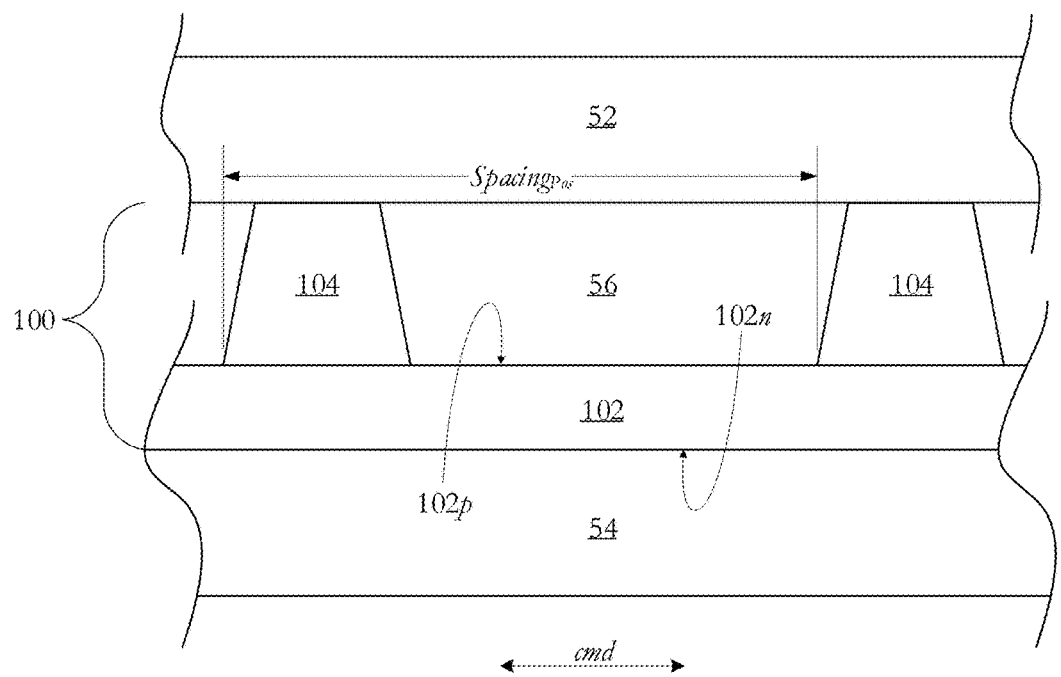
FIGS. 4A through 4D depict an exemplary battery separator situated between a positive and negative electrode as may be found in a typical lead acid battery.
Figure 4B:
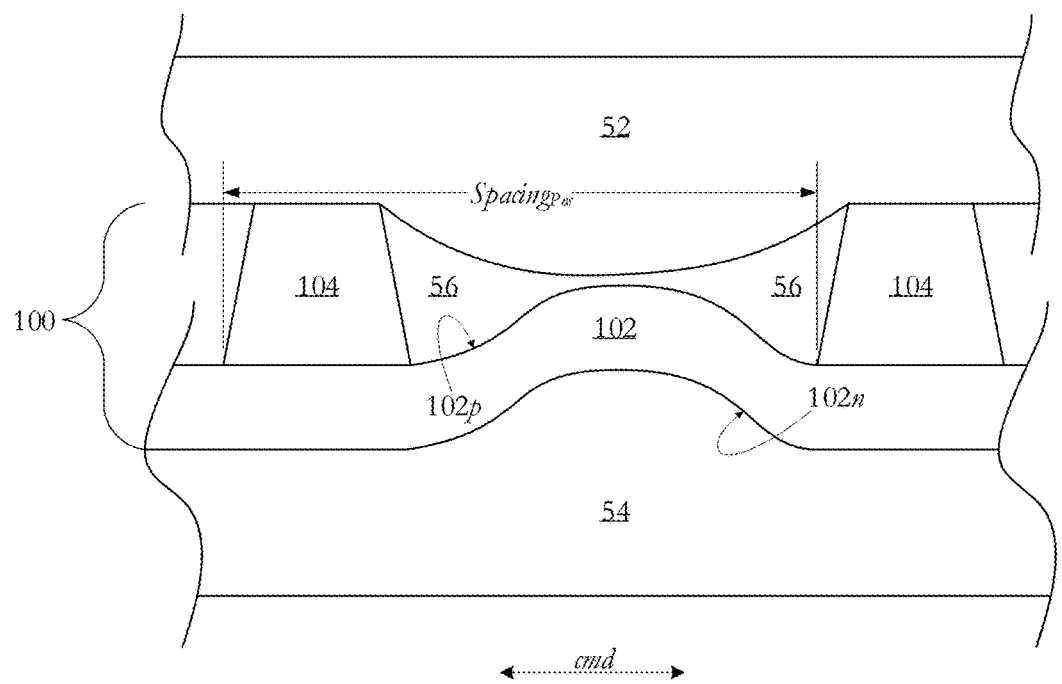

Referring now to FIGS. 4A and 4B, a typical commercially available separator 100 is shown disposed between two typical electrodes 52, 54 as they would be disposed in a typical flooded lead acid battery. In addition, both figures are viewed from the top of the battery and/or assembly looking along the machine direction of the separator. FIG. 4A shows the assembly in a charged state and FIG. 4B shows the assembly in a discharged state. FIGS. 4A and 4B schematically depict a positive electrode 52 and a negative electrode 54, a typical commercially available separator 100 disposed therebetween, with a sulfuric acid ($H_2SO_4$) electrolyte 56 submerging the entire assembly. It is appreciated that the electrodes are typical lead acid battery electrodes possessing active material, with the positive electrode being provided with PAM and the negative electrode being provided with NAM. The separator 100 is provided with a microporous backweb 102 with a positive electrode facing surface 102p and a negative facing surface 102n thereon. Positive ribs 104 are provided extending from the positive electrode facing surface 102p. While some, though not all, commercially available separators are provided with negative ribs, negative ribs are not shown in FIG. 4A or 4B for the sake of clarity. FIG. 4A depicts a charged state with the positive electrode 52, negative electrode 54, and separator 100 are all shown as being generally flat, with all of the surfaces being substantially planar.

FIG. 4B depicts a discharged state with the PAM and NAM in a swollen state. Without wishing to be bound by any particular theory, it is believed that swelling of the PAM and/or NAM may occur to the extent that it exerts pressure on the backweb of the separator. Thus starving both the positive and negative electrodes 52, 54 of electrolyte 56 (i.e., acid starvation). As can be seen, the positive electrode 52 and PAM extend toward the positive electrode facing surface 102p, while the negative electrode 54 and NAM extend into and deflect the porous membrane backweb 102 toward the positive electrode 52. This PAM and NAM swelling and membrane deflection effectively squeezes the electrolyte away from the electrodes and hinders the electrochemical reaction of the battery. This negatively affects the performance and life of the battery. While it is shown that the backweb contacts the positive electrode, it is not necessary for the backweb to contact the positive electrode in order to negatively affect the performance of the battery.

As discussed herein, current separators marketed, sold, and used in flooded lead acid batteries, particularly flooded lead acid batteries that operate or are intended to operate at a partial state of charge exhibit the above-described squeezing and displacement of acid, which eventually leads to an inoperable battery. Thus, there is a need for improved separators for flooded lead acid batteries, particularly flooded lead acid batteries that operate at a partial state of charge (e.g., those used in start/stop vehicles, electric vehicles, hybrid vehicles, power collection inverters, and/or the like), with improved acid availability at the electrodes in a partial state of charge.

Figure 4C:
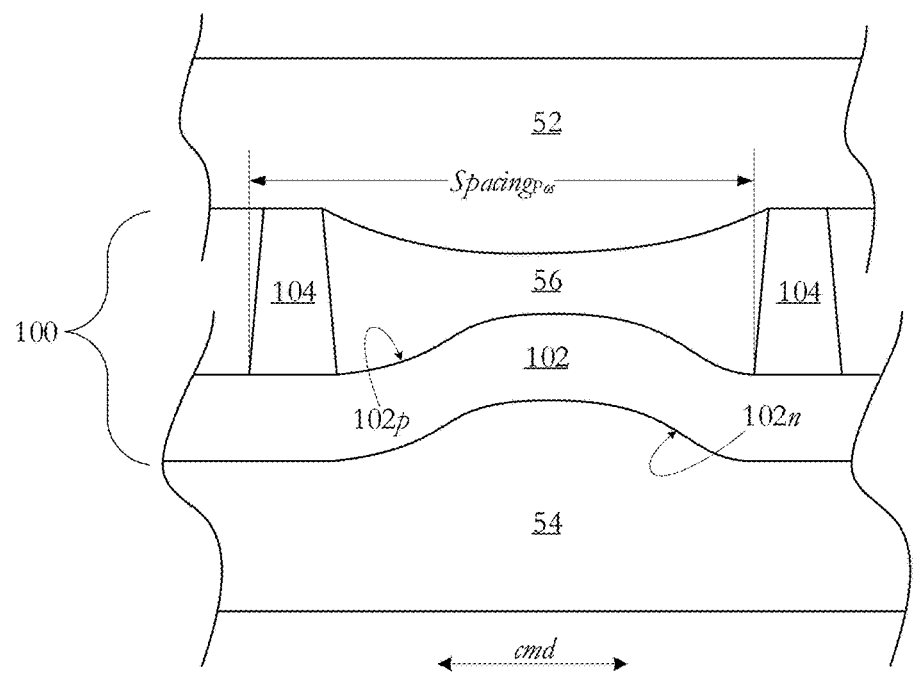
Figure 4D:
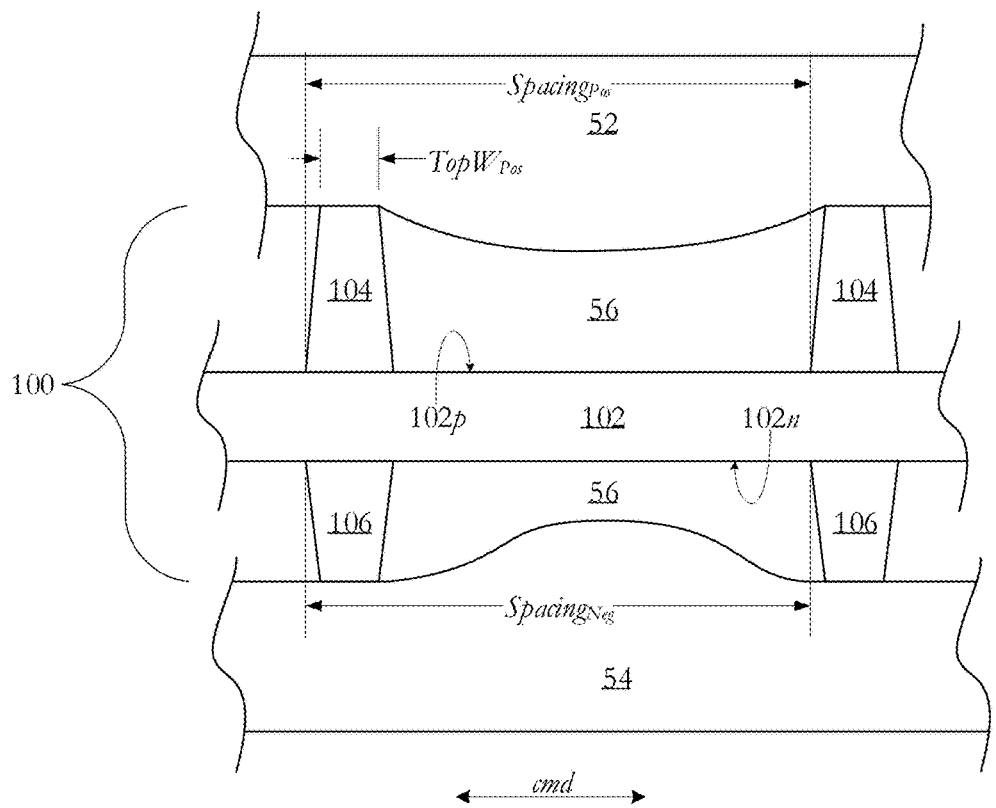

Referring now to FIGS. 4C and 4D, select embodiments of the present invention are schematically depicted between a positive electrode 52 and a negative electrode 54 as they would be disposed within a typical flooded lead acid battery, with each electrode being provided with active material (e.g., PAM and NAM). Furthermore, both figures are depictions of a discharged state and viewed from the top of the battery and/or assembly looking along the machine direction of the separator 100. With reference to FIG. 4C, the separator 100 is provided with a microporous backweb 102 with a positive electrode facing surface 102p and a negative facing surface 102n thereon. Positive ribs 104 are provided extending from the positive electrode facing surface 102p. While some, though not all, commercially available separators are provided with negative ribs, negative ribs are not shown in FIG. 4C for the sake of clarity. The positive ribs 100 of FIGS. 4C and 4D, as compared to the positive ribs 100 of FIGS. 4A and 4B, have a closer rib spacing Spacing$_{Pos}$ and a narrower rib top width TopW$_{Pos}$ (as defined herein and in FIGS. 3A through 3C). As shown in FIG. 4C, the PAM of the positive electrode 52 still swells and bulges and extends towards the positive electrode facing surface 102p, and the NAM of the of the negative electrode 54 still swells and bulges, deflecting the porous membrane backweb 102. However, the active material is better supported by the more closely spaced ribs and cannot swell enough to squeeze out as much electrolyte 56 as shown in FIG. 4B.

With reference now to FIG. 4D, an exemplary embodiment of the present invention provides a further improvement by providing negative ribs 104 with a height having a magnitude that more closely corresponds to the positive ribs 104 as compared to that typical battery separators. As can be seen, the PAM still swells in a discharged state as before, but is prevented from contacting the backweb 102 due to the closely spaced positive ribs 104. In addition, the NAM is prevented from deflecting the backweb 102 due to the height and spacing of the negative ribs 104. In order to do this without sacrificing the space between the electrodes and making the separator have an unreasonable overall thickness, the height of the positive ribs 104 are scaled to be approximately 100% to 300% the height of the negative ribs 106, such that the overall thickness does not increase as compared to that of a typical separator.

It is appreciated that FIGS. 4A through 4D are not drawn to scale, nor should they be considered scalable to one another. It is also appreciated that the negative ribs 106 may be disposed in a cross-machine direction cmd, and are simply only shown in the machine direction for the sake of clarity.

Figure 5A:
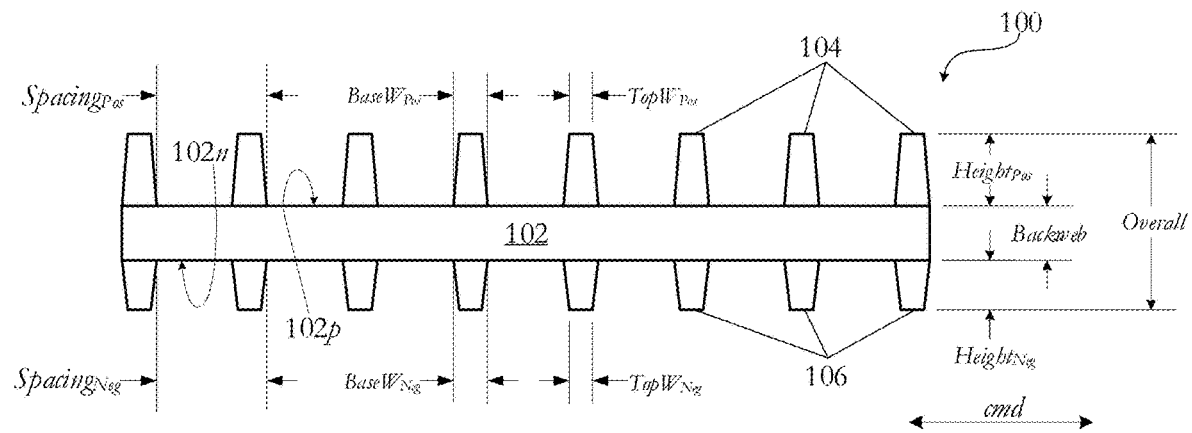
FIGS. 5A through 5H illustrate selected exemplary embodiments of the present invention.
Figure 5B:
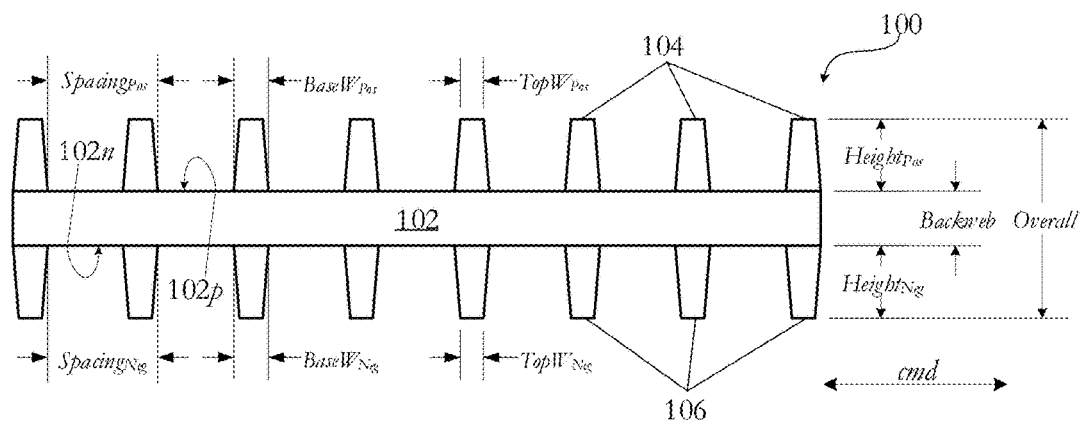
Figure 5C:
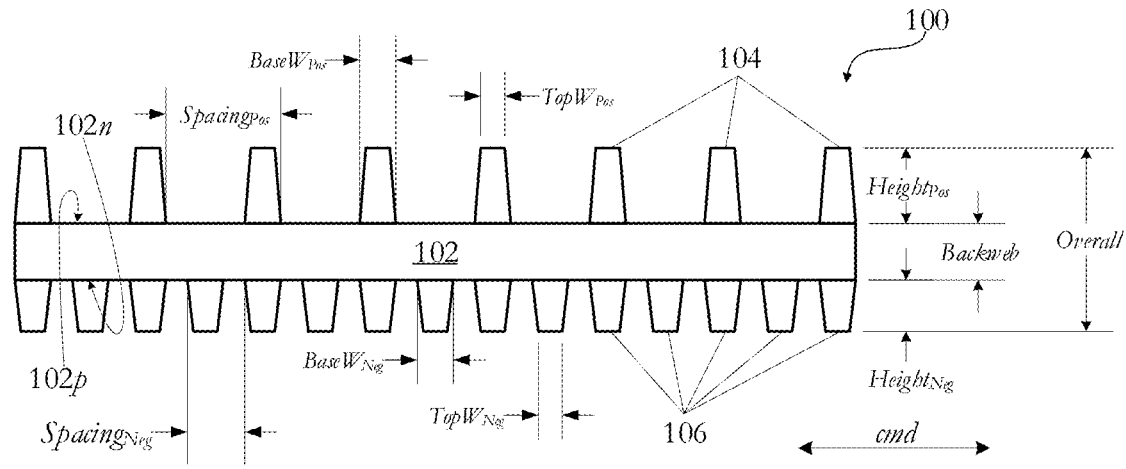
Figure 5D:
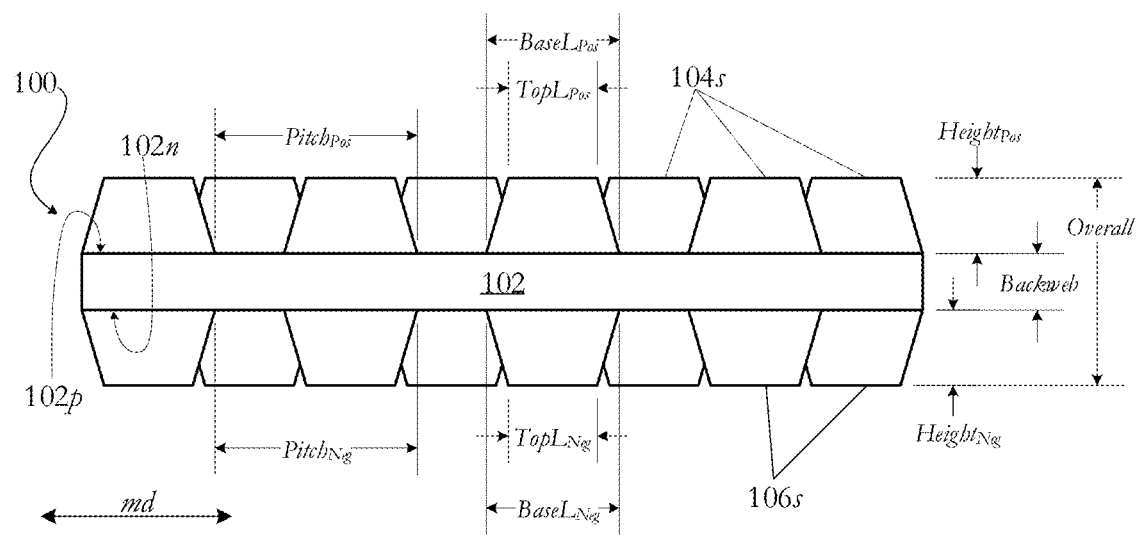
Figure 5E:
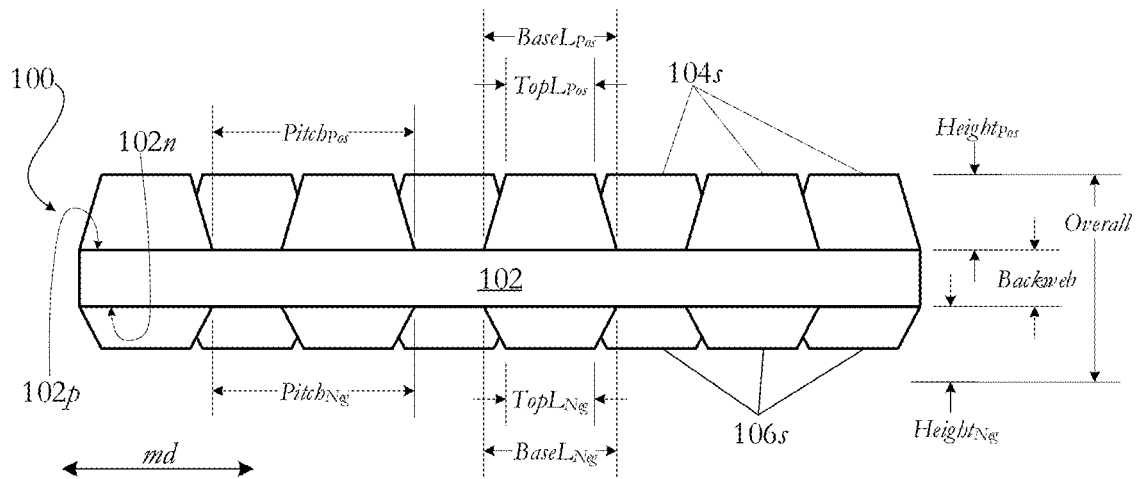
Figure 5F:
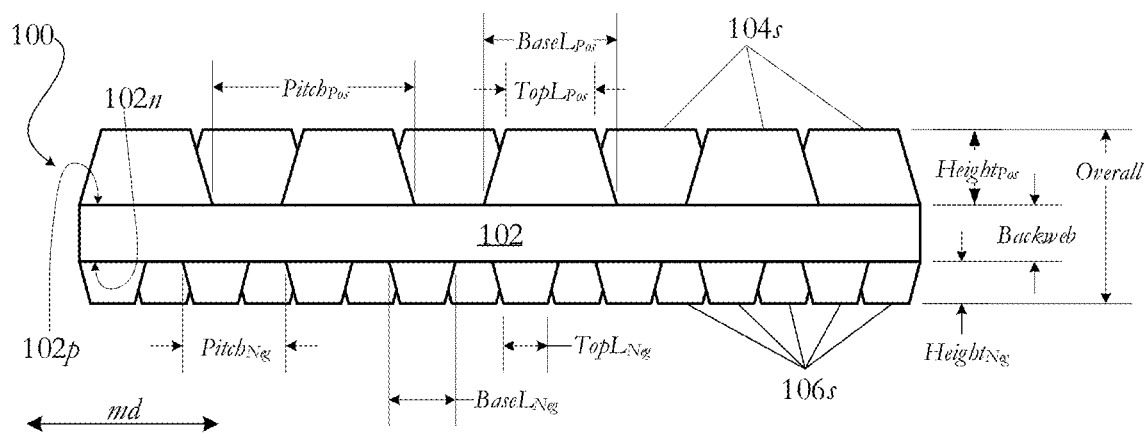
Figure 5G:
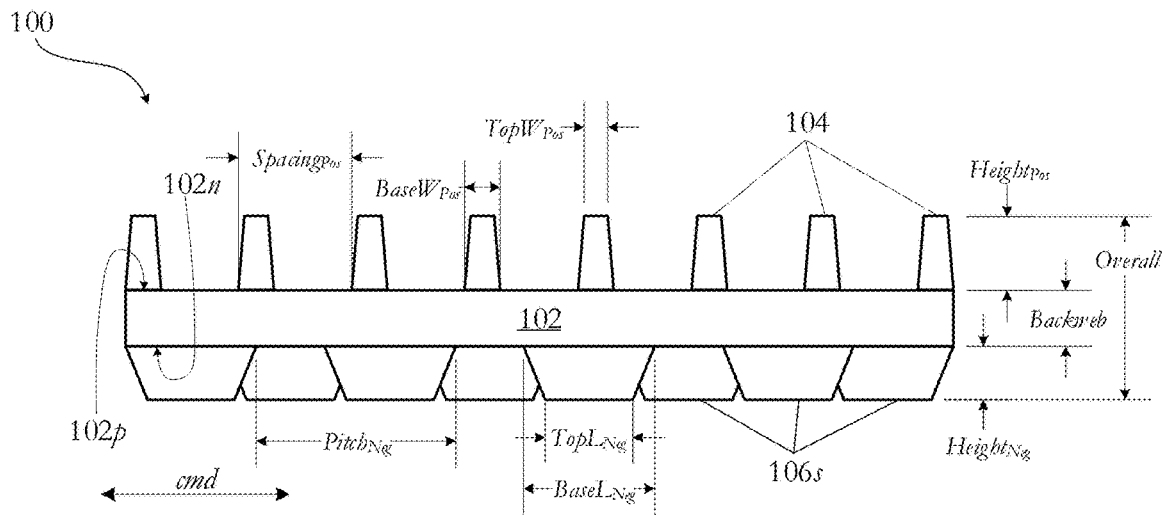
Figure 5H:
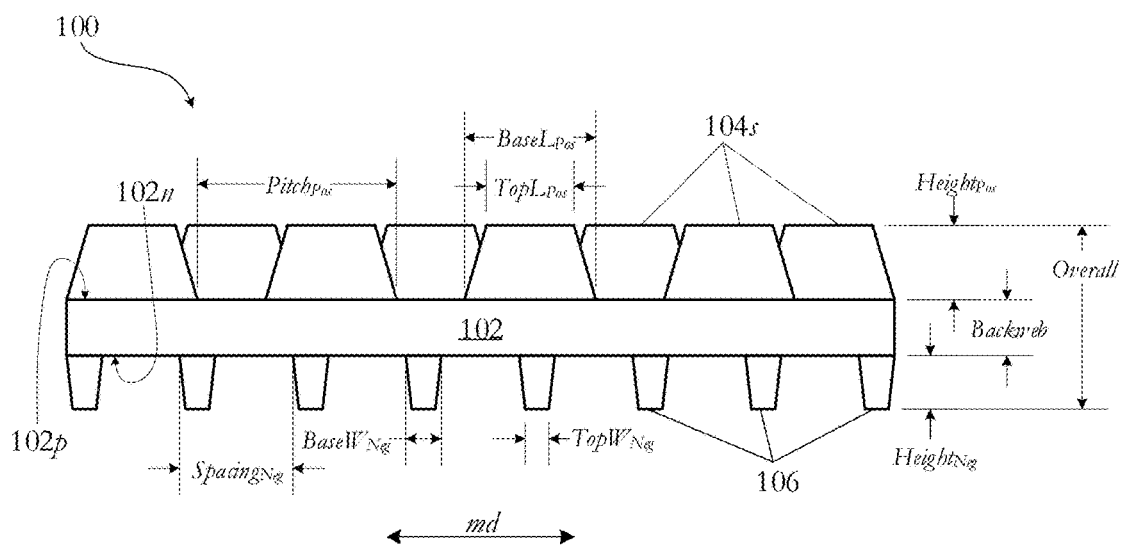

Various select exemplary embodiments of separators of the present invention are depicted in FIGS. 5A through 5H. FIGS. 5A through 5C depict exemplary separators 100 viewed along the machine direction showing both positive ribs 104 and negative ribs 106 substantially aligned along the machine direction with varying negative rib heights Height$_{Neg}$, and varying positive rib height to negative rib height ratios. FIGS. 5A and 5B depict exemplary separators 100 with both positive ribs 104 and negative ribs 106 having substantially the same rib spacing Spacing$_{Pos}$, Spacing$_{Neg}$. FIG. 5C depicts an exemplary separator 100 with the negative ribs 106 having a tighter rib spacing Spacing$_{Neg}$ than the positive rib spacing Spacing$_{Pos}$. FIGS. 5D through 5F depict exemplary separators 100 viewed along the cross-machine direction with varying negative rib heights Height$_{Neg}$, and varying positive rib height to negative rib height ratios. FIGS. 5D and 5E depict exemplary separators 100 with positive rib serrations 104s and negative rib serrations 106s are disposed at a substantially similar pitch Pitch$_{Pos}$, Pitch$_{Neg}$. FIG. 5F depicts an exemplary separator 100 with negative rib serrations 106s with a tighter pitch Pitch$_{Neg}$ than that of the positive rib serration pitch Pitch$_{Pos}$. FIGS. 5G and 5H depict positive ribs 104 disposed substantially aligned in the machine direction md and negative ribs 106 disposed substantially aligned in the cross-machine direction cmd. FIG. 5G is viewed along the machine direction of the separator 100. FIG. 5H depicts a separator 100 that is substantially similar to that of FIG. 5G, but viewed along the cross-machine direction. As shown, both positive ribs and negative ribs 104, 106 are broken into serrations 104s, 106s.

Figure 6A:
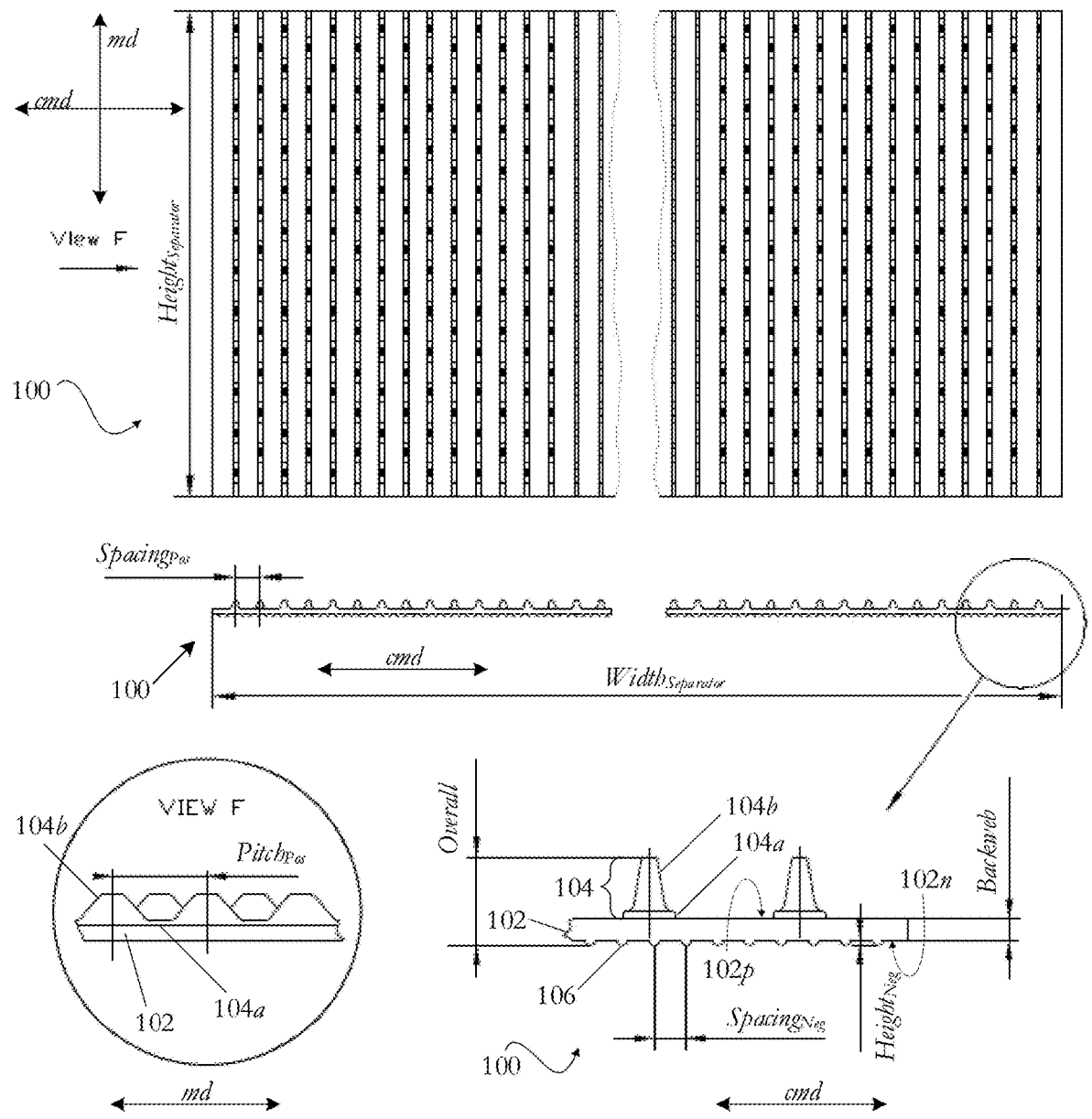
FIGS. 6A through 6E illustrates an exemplary embodiment of a rib profile for an exemplary embodiment of a separator of the present invention.
Figure 6B:
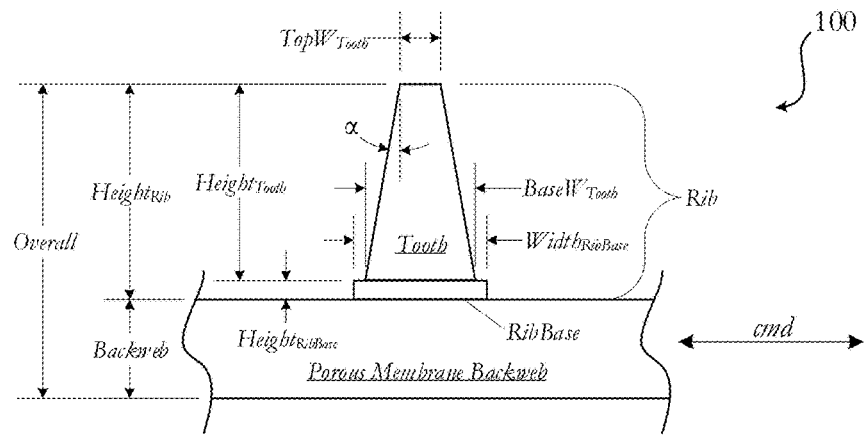
Figure 6C:
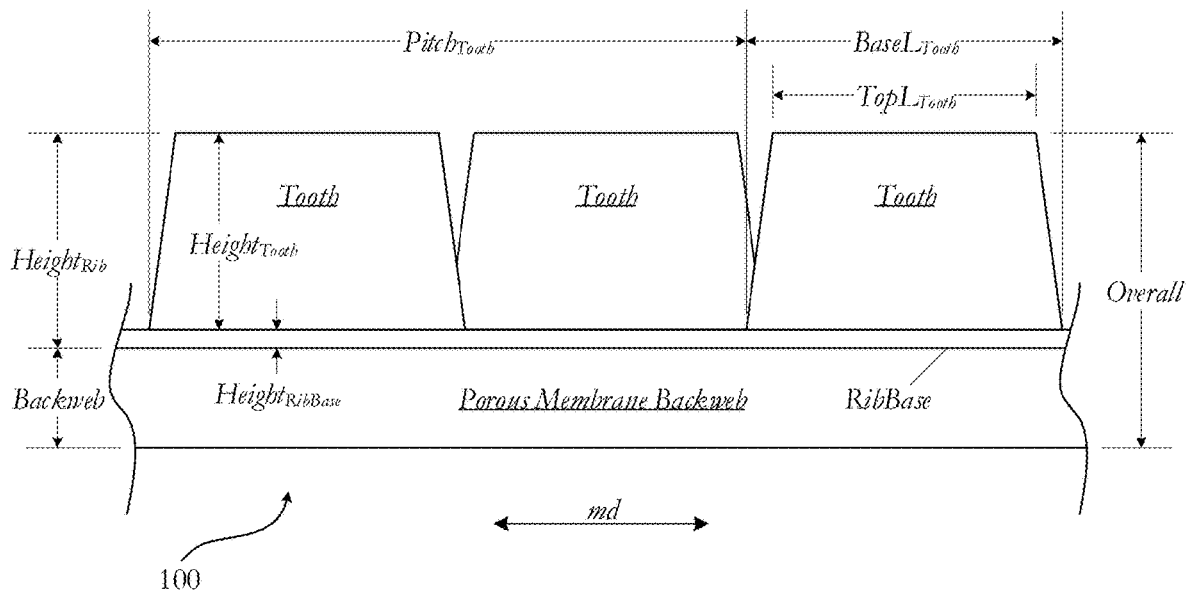
Figure 6D:
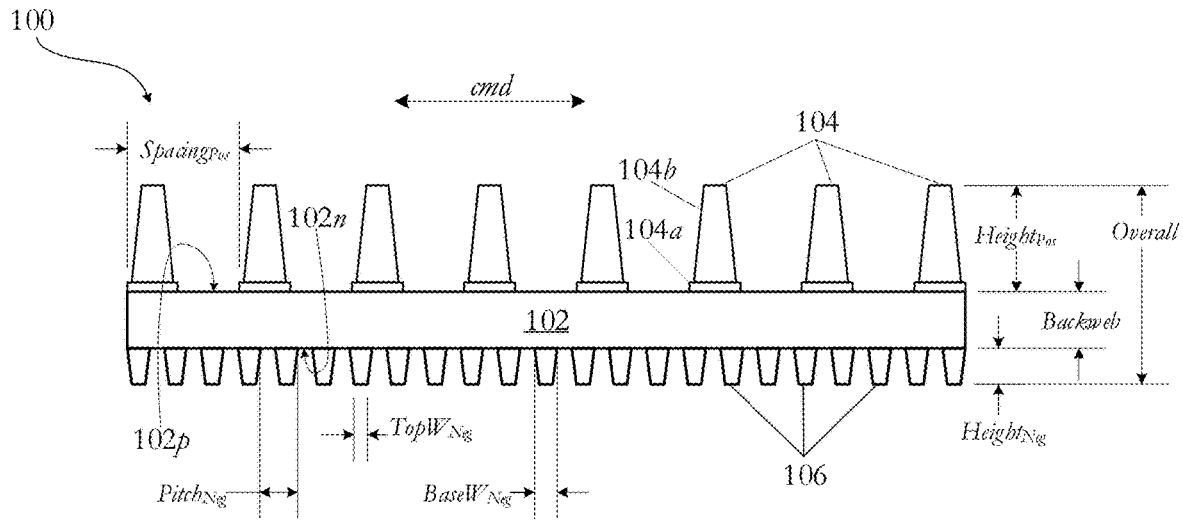
Figure 6E:
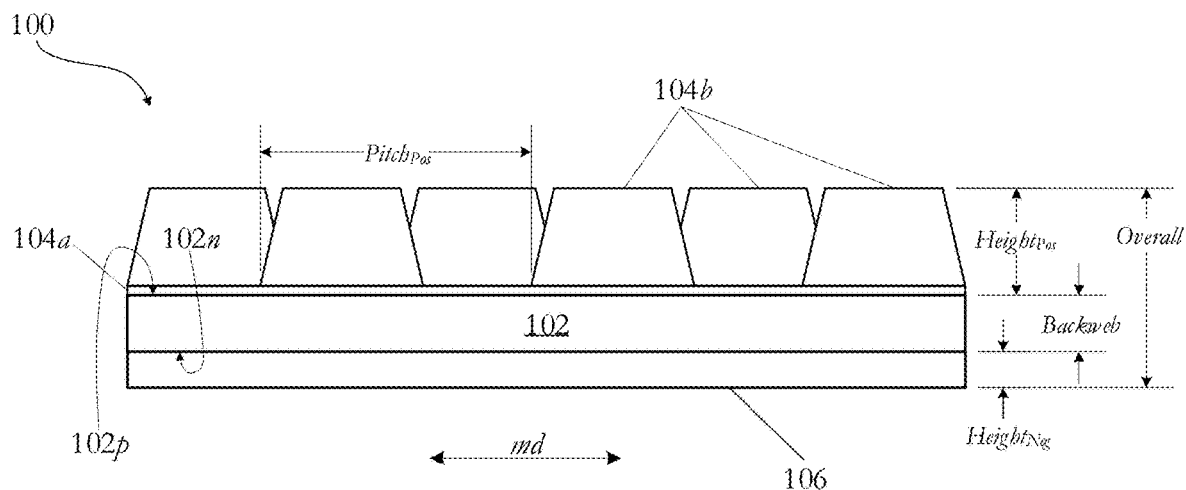

With reference now to FIGS. 6A through 6E, a select exemplary separator 100 is provided with a positive ribs 104 having a positive rib base 104a extending from the positive electrode facing surface 102p of the porous membrane backweb 102, and multiple positive rib teeth 104b extending therefrom. As shown in FIG. 6A, the separator 100 has a separator height Height$_{Sep}$ and a separator width Width$_{Sep}$. A typical automotive lead acid battery is provided with electrodes and separators with a width of approximately 160 mm wide. FIGS. 6B and 6C depict an exemplary separator 100 with ribs according to certain embodiments of the present invention. The rib is provided with a porous membrane backweb having a toothed rib extending therefrom. The rib is provided with a rib base extending from the porous membrane backweb and a tooth extending therefrom from the rib base. As disclosed hereinabove, the separator has an overall thickness Overall that is the sum of the backweb thickness Backweb, and the rib height Height$_{Rib}$. The rib height Height$_{Rib}$ is equal to the sum of the tooth height Height$_{Tooth}$ and the rib base height Height$_{RibBase}$. The rib is provide with a rib base width Width$_{RibBase}$, a tooth base width BaseW$_{Tooth}$, a tooth top width TopW$_{Tooth}$ and a draft angle α. The ribs are further provided with a rib spacing across the cross-machine direction cmd (Shown in FIGS. 6A, and 6D as Spacing$_{Pos}$ and Spacing$_{Neg}$). The exemplary separator is further provided with a tooth spacing pitch Pitch$_{Tooth}$ in the machine direction md, a tooth base length BaseL$_{Tooth}$, and a tooth top length TopL$_{Tooth}$. FIGS. 6D and 6E further detail an exemplary separator with positive ribs 104 and negative ribs 106 substantially aligned in the machine direction md. The negative ribs 106 are further shown as solid linear ribs, however the negative ribs 106 may also be serrated or toothed as similar to the positive ribs 104.

Typical lead acid battery separators used in automotive applications may have an exemplary overall thickness of 900 μm and have approximately 11 to 18 ribs or less that come in contact with both the positive and negative electrode. Without wishing to be bound by theory, the inventor has discovered that the greater the contact area (as measured by the percentage of contact area compared to the total area of the electrode), the more supported the active material will be and less likely to disengage from the grid. Therefore, contact area can be equated to supported area, see Table 1. In addition to increasing the supported area, the inventors have determined that it is beneficial to also appropriately distribute that supported area. Therefore, one particular goal of the present invention is to improve the contact/supported area of the electrode while minimizing the distance between adjacent supported areas.

To accomplish this goal, exemplary separators may possess approximately 20 to approximately 40 or more ribs that come in contact with an exemplary 160 cm wide electrode. For example, the separator may have about 25 or more ribs, about 30 or more ribs, about 35 or more ribs, about 40 or more ribs, and so on. This is much more than any typical automotive lead acid battery separator.

However, increasing the number of ribs also increases the mass of the separator and necessarily displaces the acidic electrolyte from between the electrodes, which will limit the degree of the energy storage reaction and decrease the potential for ionic conductance. In order to compensate for this increased mass, exemplary separators may be provided with much thinner ribs than are typical in lead acid battery separators (smaller top widths and base widths).

Typical polyethylene separators used in automotive lead acid batteries are manufactured with ribs having a generally trapezoidal shape, which is formed in a calender roll. This trapezoid is first defined with having a rib top width of approximately 530 µm. In order to process this rib and get it to release from the calender roll, there is an approximately 7° draft angle (a in FIGS. 3A and 6B). Therefore, conventional separators are typically manufactured with the notion that the taller the rib, the wider the rib base. To encourage smooth release from the calender roll, the corners are typically rounded.

In order to decrease the additional mass that comes with increasing the number of ribs, exemplary separators may be provided with ribs having a top width of approximately 450 µm or less, approximately 400 µm or less, approximately 350 µm or less, approximately 300 µm or less, or approximately 250 µm or less and still be processed with a draft angle of approximately 7°. Therefore, exemplary separators of the present invention can have twice as many ribs as that of a conventional separator and maintain the same mass as that conventional separator. In this way, the mass is the same as prior separators and also decreases the distance between unsupported areas. This brings a flooded lead acid battery closer to the performance of an AGM battery in a PSoC condition.

An additional enhancement to reduce mass is to segment or break the ribs up into serrations or teeth as generally shown and described in FIGS. 3A through 6E and their associated text. The extra mass lost in segmenting the ribs can be then added back with more ribs, thus bringing the supported portions yet closer. This will effectively reduce or keep the mass the same as compared to a separator with much fewer solid ribs.

Figure 7A:
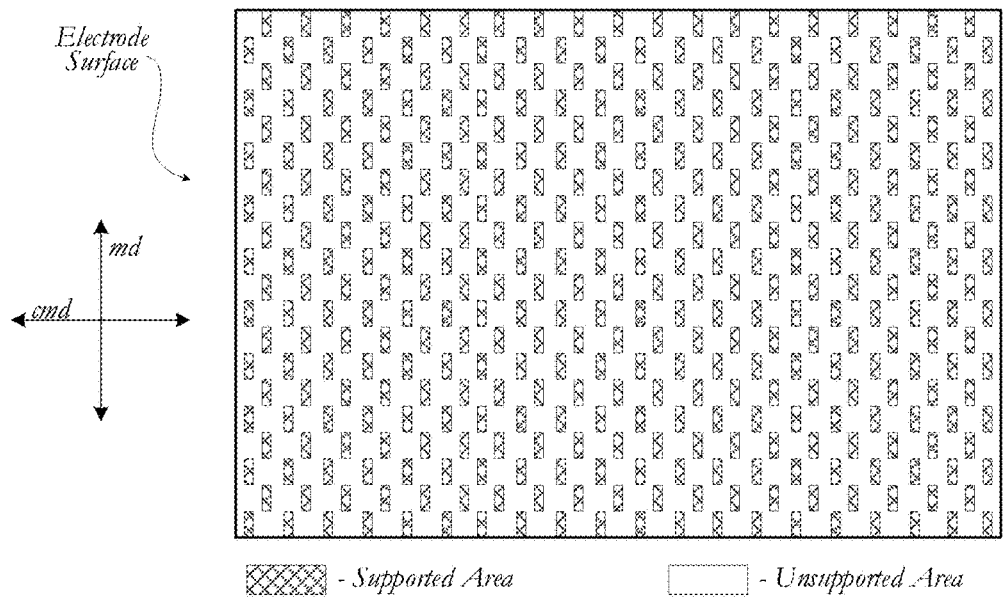
FIGS. 7A and 7B schematically depicts an electrode face with supported/contacted areas and unsupported areas with respect to an exemplary separator embodiment of the present invention.
Figure 7B:
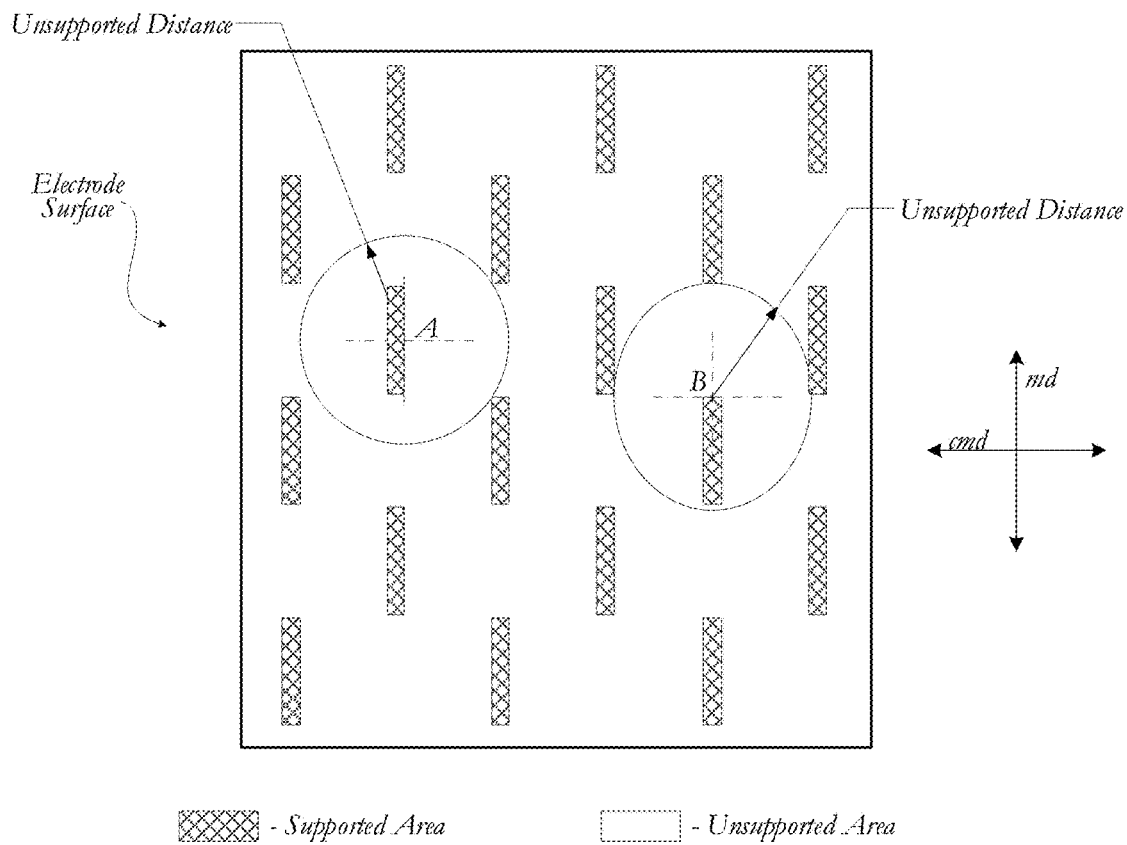

Referring now to FIGS. 7A and 7B, an electrode surface is shown having an unsupported surface area or portion, and a discontinuous supported surface area or portion (cross-hatched portions). A more detailed portion of FIG. 7A is depicted in FIG. 7B. Point A is shown as a point on the midpoint of an edge of a supported portion, and point B is shown as a point on an end of a supported section. Their respective encompassing circles define the unsupported distance from one supported portion to an adjacent supported portion. It is appreciated that FIGS. 7A and 7B are not drawn to scale.

With a standard electrode width of 160 cm, there can typically be 11 to 18 ribs spaced uniformly along the cross-machine direction of the separator, this yields a typical unsupported distance between adjacent supported portions is approximately 13 mm to 8 mm, respectively. By making the ribs narrow and segmenting them while keeping the same rib mass as a typical separator with solid ribs, the number of ribs on a 160 cm wide electrode could be increased to approximately 20 to about 40 or more ribs. This allows the unsupported distance between ribs to be approximately 3 mm to approximately 4 mm or less. For example, the unsupported distance may be as close as approximately 1.5 mm depending upon the pitch of the serrations or teeth and the spacing of the ribs.

Table 1, below, details various rib and separator dimensions for three separators. Control #1 possesses 11 ribs, control #2 possesses 19 ribs, and the exemplary embodiment is provided with 39 ribs. However, because the rib top width is less than half of that of the control separators, it can have more than double the ribs of control #2 and maintain the same supported area while having the lowest unsupported distance.

TABLE 1

| Separator | Number of Ribs | Rib Top Width (µm) | Rib Base Width (µm) | Rib Height (µm) | Single Rib Area (mm²) | Rib Spacing (mm) | Unsupported Distance (mm) | Supported Area (%) |
|---|---|---|---|---|---|---|---|---|
| Control #1 | 11 | 510 | 760 | 640 | 0.4032 | 11.55 | 11.04 | 3.74 |
| Control #2 | 19 | 510 | 760 | 640 | 0.4032 | 6.68 | 6.18 | 6.46 |
| Embodiment | 39 | 250 | 380 | 640 | 0.2016 | 3.34 | 3.09 | 6.46 |

Typical automotive battery separators are generally optimized primarily to provide a high burst of power to start the engine and then operate in a fully charged state. In this regard, the separator has minimum amount of ribs to maintain plate spacing while minimizing any extra number of ribs that would increase the ionic resistance and rob the battery of power. In a fully-charged or over-charged state, the automotive battery will generate oxidizing species at the positive electrode and reducing species at the negative electrode. If the porous membrane backweb of the separator came in contact with these oxidizing species, the chance of compromise due to oxidation increases with time. In the industry, this is often referred to as separator splitting or cracking and thus no longer functioning to separate physical contact between the positive and negative electrodes. To minimize the opportunity for separator cracking and splitting, the backweb is adjacent to the negative electrode and the ribs face the positive electrode.

In certain battery designs, the total plate spacings or separator overall thickness is in excess of 1.2 mm and may often require a small rib also on the surface facing the negative rib. The ratio of the positive rib height to the negative rib height is usually approximately 3 to approximately 5 or more. In other words, the positive ribs are about 300% to about 500% or greater taller than the negative ribs. When delivering power, the reaction time between lead in the electrodes and the sulfuric acid is only about 30 seconds or less. It is believed that as the electrodes are porous, the acid that is consumed in these reactions is already available in the pores. When the battery has to provide more energy, such as in a PSoC condition, then more acid must be available at the surface of the electrodes or it may become a limiting factor. Since the typical automotive separators that are currently available typically have no ribs or very small ribs facing the negative electrode, the inventor hypothesizes that acid availability at the negative plate will become a limitation with respect to power delivery.

Therefore, exemplary embodiments of the present invention provide a more equal balance of the sulfuric acid electrolyte to both of the positive electrode and the negative electrode. This may be accomplished by placing equal ribs on both the positive electrode facing surface of the porous membrane and the negative electrode facing surface of the porous membrane. Furthermore, this can be done on separators that are required to have an overall thickness below approximately 1.0 mm. to achieve this goal, exemplary embodiments may be provided with positive ribs with a rib height that is approximately 100%, approximately 200%, or even up to approximately 300% of the negative rib height. In other words, the positive rib height to negative rib height ratio may be up to about 1 to about 3. As shown in the figures and described the text herein, the negative ribs may be substantially aligned in the machine direction or the cross-machine direction.

There is a potential concern that as the height of the positive rib decreases, the separator backweb thickness comes closer to the positive electrode. One could imagine situations where the positive electrode could produce oxidizing species. Therefore to prevent the separator backweb from deflecting due to active material swelling and actually touching the positive electrode, we see the extra number of ribs as described herein as a useful separator configuration.

There is another point worth noting and that involves the difference between what are known as universal and panel profiles. To improve enveloping of battery plates with typical separators, the industry has developed a sealing area where the ribs are smaller than the ribs that face the positive plate. Whereas the major ribs facing the positive electrode may have a height of about 450 μm to about 1200 μm, the ribs in the sealing area are typically only 250 μm and less to ensure good mechanical sealing.

By decreasing the positive rib height and increase the negative rib height, exemplary separators may be provided as a universal profile as opposed to a distinctly panel profile. By definition, universal profiles have a uniform array of ribs across the entire separator/electrode width. In this case, the ribs can provide support to the very end of the electrode. This will have two distinct advantages. First, the added ribs at the edges of the electrodes will support the active material and keep it from shedding in cycling application. Second, these added ribs can prevent the positive electrode from touching the separator backweb and substrate.

With new methods of making grids such as punching process, the typical grid thickness has gone from about 1.0 mm to as low as about 0.8 mm or 0.6 mm. As the grid is thinner, there is a higher propensity for it to bow or curl in cycling application. As it bows, there can be a greater opportunity to contact the separator substrate of backweb. Having a universal profile with tight rib spacing may provide added protection against oxidation shorts.

Table 2, below, details various separator dimensions as discussed herein comparing two control separators that are typical commercially available separators and 10 embodiments of the present invention.

TABLE 2

| Separator | Overall Thickness (μm) | Backweb Thickness (μm) | Negative Rib Height (μm) | Positive Rib Height (μm) | Positive/Negative Rib Height Ratio |
|---|---|---|---|---|---|
| Control #1 | 1270 | 250 | 250 | 760 | 3.00 |
| Control #2 | 890 | 180 | 80 | 640 | 8.33 |
| Embodiment #1 | 890 | 250 | 150 | 480 | 3.17 |
| Embodiment #2 | 890 | 250 | 200 | 430 | 2.13 |
| Embodiment #3 | 890 | 250 | 250 | 380 | 1.50 |
| Embodiment #4 | 890 | 250 | 320 | 320 | 1.00 |
| Embodiment #5 | 890 | 250 | 380 | 250 | 0.67 |
| Embodiment #6 | 810 | 250 | 150 | 410 | 2.67 |
| Embodiment #7 | 810 | 250 | 200 | 360 | 1.75 |
| Embodiment #8 | 810 | 250 | 250 | 300 | 1.20 |
| Embodiment #9 | 810 | 250 | 320 | 240 | 0.76 |
| Embodiment #10 | 810 | 250 | 380 | 180 | 0.47 |

Ribs

Particular goals of the present invention include minimizing the effects of NAM swelling (e.g., acid starvation) while also taking advantage of any motion that the battery may be subject to maximize acid mixing to reduce the effects of acid stratification. Both of these are problems exhibited by batteries operating in a partial state of charge. The inventor has found that one way to minimize the effects of NAM swelling is to maximize the resiliency of the separator such as to reduce the likelihood that the NAM will deflect the porous backweb into the PAM. A particular method of increasing the separator resiliency is to increase the porous membrane backweb thickness. This however also increases the separator's electrical resistance (to name but one detriment of a thicker backweb) which negatively affects the performance of the battery. The inventor has discovered that increasing the contact points between the separator and the positive electrode acts to stiffen the backweb between contact points. Increasing the number of ribs to achieve this goal also increases the amount of contact area between the separator and positive electrode. Minimizing the contact area is believed to lower the electrical resistance of the separator as well as opening more surface area of the electrodes to the electrolyte for the electrochemical reactions that provide the functionality of the battery. It is also believed that the reduced contact area reduces the opportunities for dendrites to form through the separator and cause an electrical short. The issue of dendrite formation is discussed hereinafter. A further goal is to maximize electrolyte or acid mixing for batteries that are used in motion in order to minimize the effects of acid stratification. Furthermore, solid ribs do not facilitate the goal of acid mixing to reduce acid stratification.

The inventor has found that a separator may be provided with resilient means to resist or mitigate backweb deflection under the forces and pressures exerted by NAM swelling, which leads to acid starvation, by maximizing the number of contact points while simultaneously minimizing the contact area between the separator and the adjacent electrodes as a select exemplary preferred embodiment. The inventor has found another select exemplary embodiment may provide a separator with acid mixing means for reducing, mitigating, or reversing the effects of acid stratification by maximizing the number of discrete contact points between the separator and the adjacent electrodes. Another select exemplary embodiment may provide the separator with dendrite mitigation means to reduce or mitigate lead sulfate ($PbSO_4$) dendrite growth. The inventor has determined that such resilient means, acid mixing means, and dendrite mitigation means may be addressed, achieved, or at least partially addressed and/or achieved by the design of the rib structure. Accordingly, select embodiments described herein rely on rib structure in order to balance these parameters to achieve the desired goals, to provide resilient means, acid mixing means, and dendrite mitigation means, and/or to at least partially address and/or achieve balance of these parameters and/or the desired resilient means, acid mixing means, and/or dendrite mitigation means.

The ribs 104, 106 may be a uniform set, an alternating set, or a mix or combination of solid, discrete broken ribs, continuous, discontinuous, angled, linear, longitudinal ribs extending substantially in a machine direction ("MD") (i.e., running from top to bottom of the separator in the battery) of the separator, lateral ribs extending substantially in a cross-machine direction CMD of the separator, transverse ribs extending substantially in a cross-machine direction ("CMD") (i.e., in a lateral direction of the separator in the battery, orthogonal to the MD) of the separator, cross ribs extending substantially in a cross-machine direction of the separator, discrete teeth or toothed ribs, serrations, serrated ribs, battlements or battlemented ribs, curved or sinusoidal, disposed in a solid or broken zig-zag-like fashion, grooves, channels, textured areas, embossments, dimples, porous, non-porous, mini ribs or cross-mini ribs, and/or the like, and combinations thereof. Further, either set of the ribs 104, 106 may extend from or into the positive side, the negative side, or both sides.

Referring now to FIG. 6A, an exemplary separator is provided with positive ribs 104 substantially aligned in a machine direction ("MD") of the separator that are intended to contact a positive electrode in an exemplary battery. The separator is further provided with negative ribs 106 substantially aligned in a machine direction of the separator and substantially parallel to the positive ribs. The negative ribs are intended to contact a negative electrode in an exemplary battery. While the negative ribs in this illustrated example are substantially aligned in a machine direction of the separator, they may alternatively be substantially aligned in the cross-machine direction, typically known as negative cross-ribs.

With continued reference to FIG. 6A, select embodiments of the inventive separator are provided with an array of positive ribs. The positive ribs are provided with a base portion 104a that may extend the length of the separator in the machine direction. Spaced teeth, discontinuous peaks, or other protrusions 104b may then extend from the surface of that base portion, such that the teeth 104b are raised above the underlying surface of the porous membrane backweb. Furthermore, the base portion may be wider than the teeth themselves. The positive ribs run substantially parallel to one another at a typical spacing of approximately 2.5 mm to approximately 6.0 mm, with a typical spacing of approximately 3.5 mm. The height of the positive ribs (combined teeth and base portion) as measured from the surface of then porous membrane backweb may be approximately 10 µm to approximately 2.0 mm, with a typical height of approximately 0.5 mm. Exemplary rib teeth of adjacent ribs may be substantially in line with one another. However as pictured in FIG. 35, exemplary teeth may be offset from one another from one rib to an adjacent rib, either entirely or partially out of phase from an adjacent rib. As shown, the teeth are entirely out of phase from one rib to an adjacent rib. The positive rib teeth may be spaced at a pitch in the machine direction of the separator of approximately 3.0 mm to approximately 6.0 mm, with a typical spacing of approximately 4.5 mm.

As shown in FIG. 6A, negative ribs are depicted as being substantially parallel to the machine direction of the separator. However, they may alternatively be substantially parallel to a cross machine direction. The depicted exemplary negative ribs are shown as being solid and substantially straight. However, they may alternatively be toothed in a generally similar manner as the positive ribs shown in FIG. 6A. The negative ribs may be spaced at a pitch of approximately 10 µm to approximately 10.0 mm, with a preferred pitch between approximately 700 µm and approximately 800 µm, with a more preferred nominal pitch of approximately 740 µm. The height of the negative ribs as measured from the surface of the backweb may be approximately 10 µm to approximately 2.0 mm.

It should be noted that the positive ribs may alternatively be placed in an exemplary battery such that they contact the negative electrode. Likewise, the negative ribs may alternatively be placed in an exemplary battery such that they contact the positive electrode.

Table 3, below, details the rib count and the percentage of surface contact area for four separators (one exemplary inventive separator and three control separators) that are 162 mm by 162 mm (262 cm²). As shown, the exemplary inventive separator has 43 toothed ribs uniformly spaced across the width of the separator in the cross-machine direction. The teeth of the positive ribs on the exemplary inventive separator contacts 3.8% of the 262 cm² on the positive electrode. The details of the control separators are further detailed in Table 3. It is appreciated that control separators #1, #2, and #3 are typical of commercially available separators presently used flooded lead acid batteries generally and presently available on the market.

TABLE 3

| Separator | Ribs (No. (configuration)) | Contact area (% of total area) |
| --- | --- | --- |
| Inventive Separator | 43 (toothed ribs) | 3.8% |
| Control #1 | 22 (solid ribs) | 4.8% |
| Control #2 | 18 (solid ribs) | 3.9% |
| Control #3 | 11 (solid ribs) | 2.9% |

As stated, the inventor found that maximizing the number of contact points while simultaneously minimizing the contact area achieves the goal of increasing separator resiliency while keeping electrical resistance under control. Furthermore, the toothed design helps facilitate acid mixing by utilizing any motion to which a battery may be subjected. The teeth of the separator ribs may be approximately 2.5 mm to approximately 6.0 mm apart from the closest adjacent tooth. The inventor has found that a preferred, non-limiting, distance is approximately 4.2 mm between adjacent teeth. In addition, the teeth being offset from adjacent rows being completely out of phase helps to facilitate acid mixing. The inventor has also found that the base portion helps to stiffen the backweb enough to provide resilience to the NAM swelling.

It is appreciated that while the exemplary inventive ribs are shown and described as being positive ribs, they may nonetheless be provided on the negative side of the separator, and the illustrated and described negative ribs may be provided on the positive side of the separator.

The positive or negative ribs may additionally be any form or combination of solid ribs, discrete broken ribs, continuous ribs, discontinuous ribs, angled ribs, linear ribs, longitudinal ribs extending substantially in a machine direction of said porous membrane, lateral ribs extending substantially in a cross-machine direction of said porous membrane, transverse ribs extending substantially in said cross-machine direction of the separator, discrete teeth, toothed ribs, serrations, serrated ribs, battlements, battlemented ribs, curved ribs, sinusoidal ribs, disposed in a continuous zig-zag-sawtooth-like fashion, disposed in a broken discontinuous zig-zag-sawtooth-like fashion, grooves, channels, textured areas, embossments, dimples, columns, mini columns, porous, non-porous, mini ribs, cross-mini ribs, and combinations thereof.

The positive or negative ribs may additionally be any form or combination of being defined by an angle that is neither parallel nor orthogonal relative to an edge of the separator. Furthermore, that angle may vary throughout the teeth or rows of the ribs. The angled rib pattern may be a possibly preferred Daramic® RipTide™ acid mixing rib profile that can help reduce or eliminate acid stratification in certain batteries. Moreover, the angle may be defined as being relative to a machine direction of the porous membrane and the angle may between approximately greater than zero degrees (0°) and approximately less than 180 degrees (180°), and approximately greater than 180 degrees (180°) and approximately less than 360 degrees (360°).

The ribs may extend uniformly across the width of the separator, from lateral edge to lateral edge. This is known as a universal profile. Alternatively, the separator may have side panels adjacent to the lateral edges with minor ribs disposed in the side panel. These minor ribs may be more closely spaced and smaller than the primary ribs. For instance, the minor ribs may be 25% to 50% of the height of the primary ribs. The side panels may alternatively be flat. The side panels may assist in sealing an edge of the separator to another edge of the separator as done when enveloping the separator, which is discussed hereinbelow.

In select exemplary embodiments, at least a portion of the negative ribs may preferably have a height of approximately 5% to approximately 100% of the height of the positive ribs. In some exemplary embodiments, the negative rib height may be approximately 5%, 10%, 15%, 20%, 25%, 30%, 35%, 40%, 45%, 50%, 55%, 60%, 65%, 70%, 75%, 80%, 95%, or 100% compared to the positive rib height. In other exemplary embodiments, the negative rib height may no greater than approximately 100%, 95%, 90%, 85%, 80%, 75%, 70%, 65%, 60%, 55%, 50%, 45%, 40%, 35%, 30%, 25%, 20%, 15%, 10%, or 5% compared to the positive rib height.

In some select embodiments, at least a portion of the porous membrane may have negative ribs that are longitudinal or transverse or cross-ribs. The negative ribs may be parallel to the top edge of the separator, or may be disposed at an angle thereto. For instance, the negative ribs may be oriented approximately 0°, 5°, 15°, 25°, 30°, 45°, 60°, 70°, 80°, or 90° relative to the top edge. The cross-ribs may be oriented approximately 0° to approximately 30°, approximately 30° to approximately 45°, approximately 45° to approximately 60°, approximately 30° to approximately 60°, approximately 30° to approximately 90°, or approximately 60° to approximately 90° relative to the top edge.

Certain exemplary embodiments may possess a base portion. If present, it may have an average base height of from approximately 5 μm to approximately 200 μm. For example, the average base height may be greater than or equal to approximately 5 μm, 10 μm, 20 μm, 30 μm, 40 μm, 50 μm, 100 μm, or 200 μm. Further, if present it may have an average base width that is from approximately 0.0 μm to approximately 50 μm wider than the tooth width. For example, the average base width may be greater than or equal to approximately 0.0 μm, 5 μm, 10 μm, 20 μm, 30 μm, 40 μm, or 50 μm wider than the tooth width.

Certain exemplary embodiments may possess teeth or toothed ribs. If present, they may have an average tip length of from approximately 50 μm to approximately 1.0 mm. For example, the average tip length may be greater than or equal to approximately 50 μm, 100 μm, 200 μm, 300 μm, 400 μm, 500 μm, 600 μm, 700 μm, 800 μm, 900 μm, or 1.0 mm. Alternatively, they may be no greater than or equal to 1.0 mm, 900 μm, 800 μm, 700 μm, 600 μm, 500 μm, 400 μm, 300 μm, 200 μm, 100 μm, or 50 μm.

At least a portion of the teeth or toothed ribs may have an average tooth base length of from approximately 50 μm to approximately 1.0 mm. For example, the average tooth base length may be approximately 50 μm, 100 μm, 200 μm, 300 μm, 400 μm, 500 μm, 600 μm, 700 μm, 800 μm, 900 μm, or 1.0 mm. Alternatively, they may be no greater than or equal to approximately 1.0 mm, 900 μm, 800 μm, 700 μm, 600 μm, 500 μm, 400 μm, 300 μm, 200 μm, 100 μm, or 50 μm.

At least a portion of the teeth or toothed ribs may have an average height (combined base portion height and teeth height) of from approximately 50 μm to approximately 1.0 mm. For example, the average height may be approximately 50 μm, 100 μm, 200 μm, 300 μm, 400 μm, 500 μm, 600 μm, 700 μm, 800 μm, 900 μm, or 1.0 mm. Alternatively, they may be no greater than or equal to approximately 1.0 mm, 900 μm, 800 μm, 700 μm, 600 μm, 500 μm, 400 μm, 300 μm, 200 μm, 100 μm, or 50 μm.

At least a portion of the teeth or toothed ribs may have an average center-to-center pitch within a column in the machine direction of from approximately 100 μm to approximately 50 mm. For example, the average center-tocenter pitch may be greater than or equal to approximately 50 μm, 100 μm, 200 μm, 300 μm, 400 μm, 500 μm, 600 μm, 700 μm, 800 μm, 900 μm, or 1.0 mm, and in similar increments up to 50 mm. Alternatively, they may be no greater than or equal to approximately 50 μm, 100 μm, 200 μm, 300 μm, 400 μm, 500 μm, 600 μm, 700 μm, 800 μm, 900 μm, or 1.0 mm, and in similar increments up to 50 mm. In addition, adjacent columns of teeth or toothed ribs may be identically disposed at the same position in a machine direction or offset. In an offset configuration, adjacent teeth or toothed ribs are disposed at different positions in the machine direction.

At least a portion of the teeth or toothed ribs may have an average height to base width ratio of from approximately 0.1:1.0 to approximately 500:1.0. For example, the average height to base width ratio may be approximately 0.1:1.0, 25:1.0, 50:1.0, 100:1.0, 150:1.0, 200:1.0, 250:1.0, 300:1.0, 350:1, 450:1.0, or 500:1.0. Alternatively, the average height to base width ratio may be no greater than or equal to approximately 500:1.0, 450:1.0, 400:1.0, 350:1.0, 300:1.0, 250:1.0, 200:1.0, 150:1.0, 100:1.0, 50:1.0, 25:1.0, or 0.1:1.0.

At least a portion of the teeth or toothed ribs can have average base width to tip width ratio of from approximately 1,000:1.0 to approximately 0.1:1.0. For example, the average base width to tip width ratio may be approximately 0.1:1.0, 1.0:1.0, 2:1.0, 3:1.0, 4:1.0, 5:1.0, 6:1.0, 7:1.0, 8:1.0, 9:1.0, 10:1.0, 15:1.0, 20:1.0, 25:1.0, 50:1.0, 100:1.0, 150:1.0, 200:1.0, 250:1.0, 300:1.0, 350:1.0, 450:1.0, 500:1.0, 550:1.0, 600:1.0, 650:1.0, 700:1.0, 750:1.0, 800:1.0, 850:1.0, 900:1.0, 950:1.0, or 1,000:1.0. Alternatively, the average base width to tip width ratio may be no greater than approximately 1,000:1.0, 950:1.0, 900:1.0, 850:1.0, 800:1.0, 750:1.0, 700:1.0, 650:1.0, 600:1.0, 550:1.0, 500:1.0, 450:1.0, 400:1.0, 350:1.0, 300:1.0, 250:1.0, 200:1.0, 150:1.0, 100:1.0, 50:1.0, 25:1.0, 20:1.0, 15:1.0, 10:1.0, 9:1.0, 8:1.0, 7:1.0, 6:1.0, 5:1.0, 4:1.0, 3:1.0, 2:1.0, 1.0:1.0, or 0.1:1.0.

Testing of Separators

Figure 8:
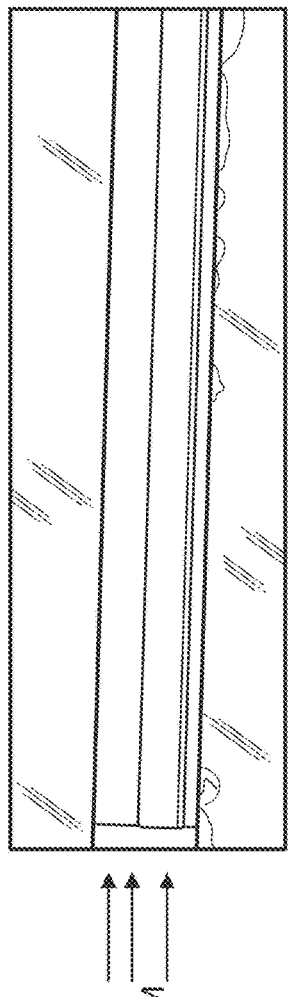
FIGS. 8 and 9 are illustrations of a test set up for mimicking NAM swelling to evaluate separator resilience.
Figure 9:
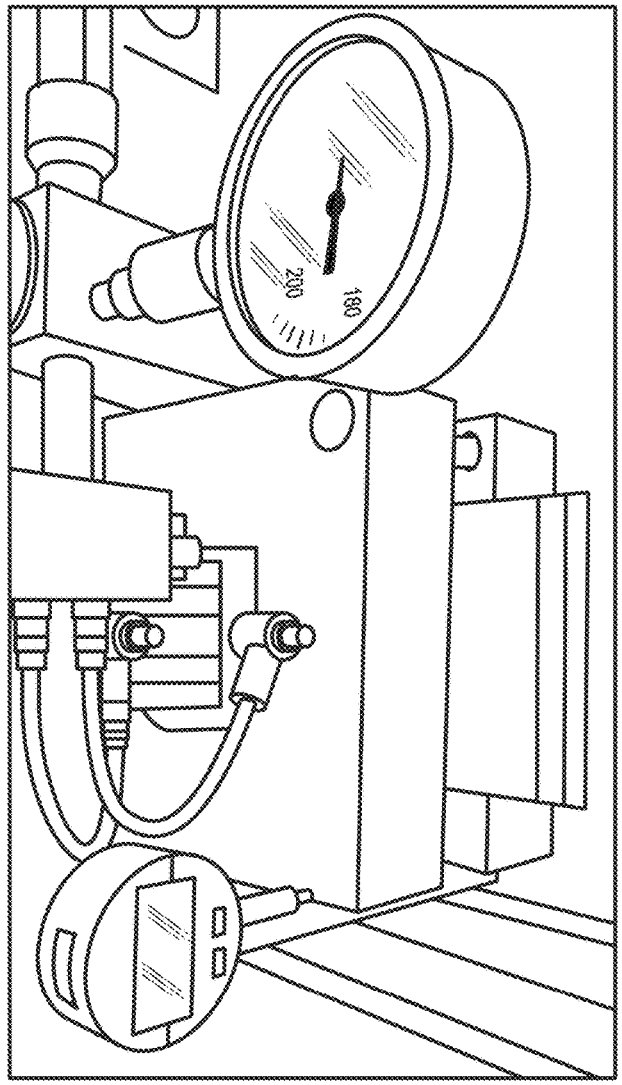

Referring now to FIGS. 8 and 9, clamping test equipment is shown for a compression test for simulating NAM swelling in order to evaluate separator resilience. As shown, a structure is formed of the following components: 1) a foam backing with a solid backing to simulate NAM swelling or expansion; 2) a separator with the negative ribs contacting the foam backing; and 3) a solid plastic plate in contact with the positive ribs and coated with red paint. The compression tests were performed as follows:

1) the separator, two solid plastic plates, and the foam backing are all cut or otherwise formed into 5 inch (12.7 cm) by 5 inch (12.7 cm) square pieces;
2) a paint applicator is formed as follows:
a) tape a felt sheet to a plastic square;
b) using a 3 mL eye dropper, mix 9 mL of red paint and 3 mL of water in a rectangular dish; and
c) put the paint applicator felt-sided down into the dish and leave it there until application;
3) Mark all sections with an arrow to ensure that all parts are added in the same order and the same direction. The stacked cell is provided, in order of bottom to top:
a) a first solid plastic plate (paint will be applied here),
b) a separator (with the positive ribs in contact with the first solid plastic plate),
c) a foam backing that is approximately 7.6 mm thick, and
d) a second solid plastic plate;
4) apply the proper air pressure in order to apply the desired pressure on the foam backing, as tested pressures of approximately 11 kPa, approximately 16.5 kPa, approximately 22 kPa, and approximately 27.5 kPa were applied to the stack to simulate NAM swelling;
5) apply the paint to the first solid piece of plastic by placing the first solid piece of plastic on a solid sturdy surface facing up; remove the paint applicator out of the paint and drag it across the top of the dish to remove some of the paint; place the paint applicator on the top surface of the solid piece of plastic and move it parallel to the surface of the first solid piece of plastic across the plastic in a first direction, and then move the paint applicator in a second direction perpendicular to the first direction; while ensuring that the coating of paint is even and with as few bubbles as possible;
6) add the separator with the positive ribs contacting the painted surface and the rest of the pieces in the above order and place in the compression apparatus before the paint has a chance to substantially dry;
7) engage the clamping apparatus to clamp the stack at the desired pressure and keep the stack clamped for one minute;
8) release the compression and remove the stack from the apparatus; remove the separator off the first solid plastic piece and set it aside to dry;
9) clean any remaining paint off the first plastic piece with water and paper towels for the next test; and
10) measure the thickness of the foam backing after each test to ensure that the integrity of the foam backing is still intact; replace the foam if it does not return to its original thickness after repeated use.

Pressure was applied equally on the stack as shown in FIG. 9. Specifically, pressures of 11 kPa, 16.5 kPa, 22 kPa, and 27.5 kPa were applied in different tests of a given separator sample. In this test, the ribs of the separator will be in contact with the solid plate with red paint in the structure (i.e., before any pressure is applied to the structure) so there will necessarily be red paint on the tips of the rib. However, transfer of red paint to the back web of the separator indicates deformation of the back web towards the solid plate coated with red paint. The results of this compression test are detailed in Table 4, and photographically shown in FIG. 10. It is appreciated that the photographs are of representative portions of the separators and not the entire separator.

Referring to Table 4, below, the performance in the presence of NAM swelling (i.e., acid availability) is shown for samples of one exemplary inventive separator and samples of three control separators. The separator samples are the same as previously presented in Table 3. It is appreciated that new separator samples were used for each test at the various pressures. All separators are made with the same composition of polyethylene, silica, and residual unextracted oil. All separators are further provided with an average backweb thickness of approximately 250 μm, and a total thickness of between approximately 800 μm and approximately 1.0 mm.

TABLE 4

| | NAM Swelling Performance (% paint coverage on backweb and rating) | | | |
|---|---|---|---|---|
| Separator | 11 kPa | 16.5 kPa | 22 kPa | 27.5 kPa |
| Inventive Separator | Excellent | Excellent | Excellent | Excellent |
| Control #1 | Excellent | Fair | Fair | Poor |

TABLE 4-continued

| | NAM Swelling Performance (% paint coverage on backweb and rating) | | | |
|---|---|---|---|---|
| Separator | 11 kPa | 16.5 kPa | 22 kPa | 27.5 kPa |
| Control #2 | Poor | Poor | Fail | Fail |
| Control #3 | Fail | Fail | Fail | Fail |

Figure 10:
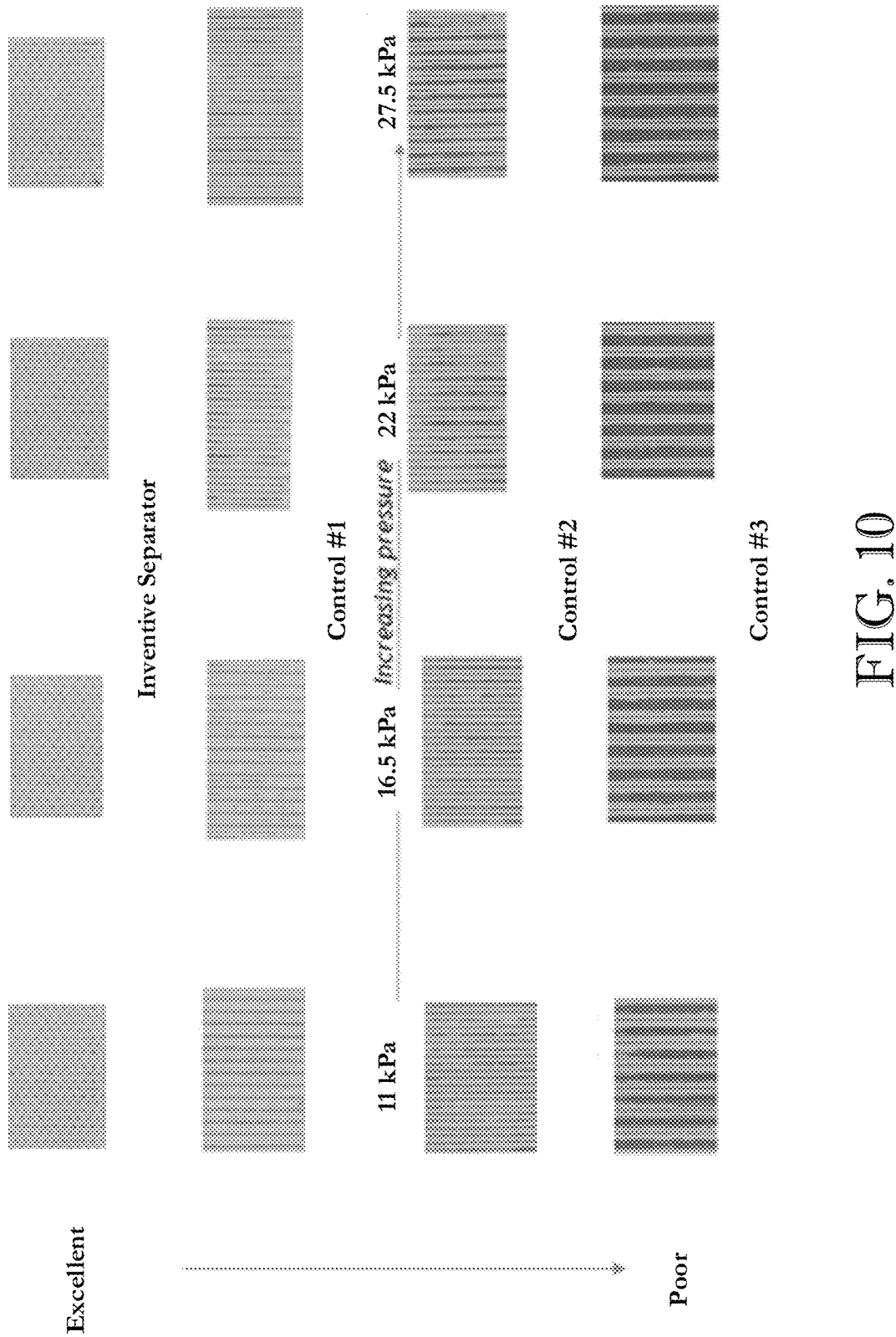
FIG. 10 is a photographic evaluation for separator resilience.

The photographical results shown in FIG. 10 reveal that at all applied pressures, red paint was transferred to 0% of the backweb surface of the inventive separator samples and paint was transferred only to the tips of the ribs. At an applied pressure of 11 kPa, red paint was transferred to 0% of the backweb surface of control separator #1; approximately 20% of the backweb surface of control separator #2; and to 50% of the backweb surface of control separator #3.

These test results show that acid availability under compression is not affected when separators according to the present invention are used. The same is shown for control separator #1 under low pressure. However, acid availability under compression is affected when control separators #2 and #3 are used. The control separator samples are generally representative of typical separators presently and commercially available on the market for flooded lead acid batteries that operate or are intended to operate at a partial state of charge.

Figure 11:
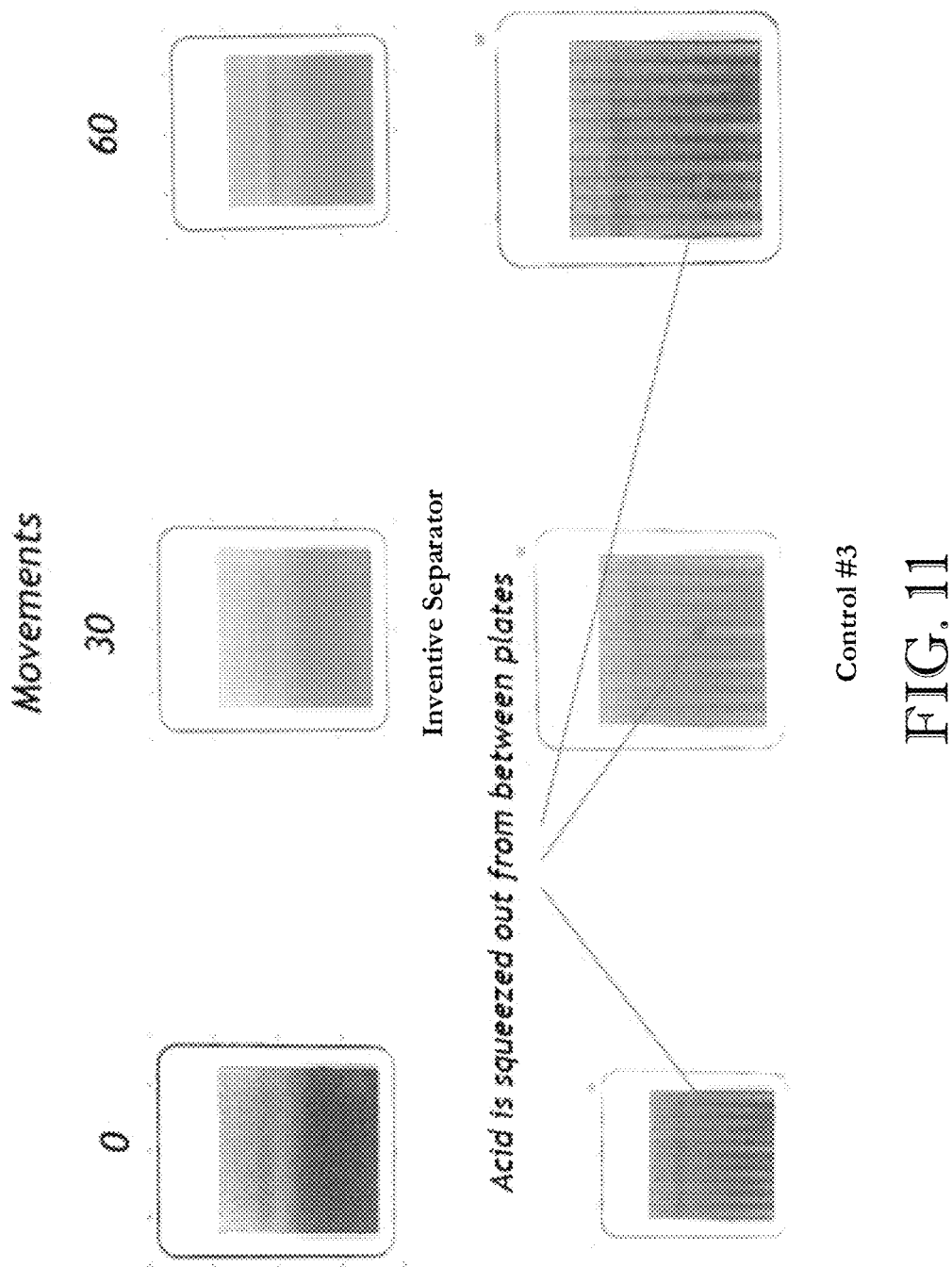
FIG. 11 is a photographic evaluation for separator acid mixing.

To determine the effectiveness for minimizing the effects of acid stratification, the inventive separator was subjected to a motion test. For this test, a structure having a foam backing with a separator formed on either side of the foam backing is assembled. The foam is placed on a negative side of both of the separators (opposite the ribs) to simulate negative active material swelling. The structure was then placed in a motion device. Sulfuric acid and water were added to the device. Methyl orange was added to sulfuric acid to make the acid red and clear water on top creating a stratified cell. The acid had a specific gravity of 1.28. The structure was then subjected to 0, 30 and 60 movements to simulate the motion of a start/stop car. FIG. 11 shows photographical evidence of this motion test for an inventive separator sample and a sample of control separator #3. As shown, acid remained available for the inventive separator throughout these motions with some mixing. For control separator #3, most of the acid was displaced and squeezed out from between the ribs and no acid mixing was observed.

Backweb Thickness

In some embodiments, the porous separator membrane can have a backweb thickness from approximately 50 μm to approximately 1.0 mm. for example, the backweb thickness may be may be approximately 50 μm, 100 μm, 200 μm, 300 μm, 400 μm, 500 μm, 600 μm, 700 μm, 800 μm, 900 μm, or 1.0 mm. In other exemplary embodiments, the backweb thickness $T_{BACK}$ may be no greater than approximately 1.0 mm, 900 μm, 800 μm, 700 μm, 600 μm, 500 μm, 400 μm, 300 μm, 200 μm, 100 μm, or 50 μm. Though in certain embodiments, a very thin flat backweb thickness of 50 μm or thinner is provided, for example, between approximately 10 μm to approximately 50 μm thick.

The total thickness of exemplary separators (backweb thickness and the heights of positive and negative ribs) typically range from approximately 250 μm to approximately 4.0 mm. The total thickness of separators used in automotive start/stop batteries are typically approximately 250 μm to approximately 1.0 mm. The total thickness of separators used in industrial traction-type start/stop batteries are typically approximately 1.0 mm to approximately 4.0 mm.

Form/Envelope

The separator 100 may be provided as a flat sheet, a leaf or leaves, a wrap, a sleeve, or as an envelope or pocket separator. An exemplary envelope separator may envelope a positive electrode ("positive enveloping separator"), such that the separator has two interior sides facing the positive electrode and two exterior sides facing adjacent negative electrodes. Alternatively, another exemplary envelope separator may envelope a negative electrode ("negative enveloping separator"), such that the separator has two interior sides facing the negative electrode and two exterior sides facing adjacent positive electrodes. In such enveloped separators, the bottom edge 103 may be a folded or a sealed crease edge. Further, the lateral edges 105a, 105b may be continuously or intermittently sealed seam edges. The edges may be bonded or sealed by adhesive, heat, ultrasonic welding, and/or the like, or any combination thereof.

Certain exemplary separators may be processed to form hybrid envelopes. The hybrid envelope may be provided by forming one or more slits or openings before, during or after, folding the separator sheet in half and bonding edges of the separator sheet together so as to form an envelope. The length of the openings may be at least ⅟50th, ⅟25th, ⅟20th, ⅟15th, ⅟10th, ⅛th, ⅕th, ¼th, or ⅓rd the length of the entire edge. The length of the openings may be ⅟50th to ⅓rd, ⅟25th to ⅓rd, ⅟20th to ⅓rd, ⅟20th to ¼th, ⅟15th to ¼th, ⅟15th to ⅕th or ⅟10th to ⅕th the length of the entire edge. The hybrid envelope can have 1-5, 1-4, 2-4, 2-3 or 2 openings, which may or may not be equally disposed along the length of the bottom edge. It is preferred that no opening is in the corner of the envelope. The slits may be cut after the separator has been folded and sealed to give an envelope, or the slits may be formed prior to shaping the porous membrane into the envelope.

Some other exemplary embodiments of separator assembly configurations include: the ribs 104 facing a positive electrode; the ribs 104 facing a negative electrode; a negative or positive electrode envelope; a negative or positive electrode sleeve, a negative or positive electrode hybrid envelope; both electrodes may be enveloped or sleeved, and any combination thereof.

Composition

In certain embodiments, the improved separator may include one or more porous membranes that may be made of: a natural or synthetic base material; a processing plasticizer; a filler; natural or synthetic rubber(s) or latex, and one or more other additives and/or coatings, one or more associated mats, one or more associated AGMs, may be pieces, sleeves, pockets, envelopes (negative and/or positive envelopes), and/or the like.

Base Materials

In certain embodiments, exemplary natural or synthetic base materials may include: polymers; thermoplastic polymers; phenolic resins; natural or synthetic rubbers; synthetic wood pulp; lignins; glass fibers; synthetic fibers; cellulosic fibers; and any combination thereof. In certain preferable embodiments, an exemplary separator may be a porous membrane made from thermoplastic polymers. Exemplary thermoplastic polymers may, in principle, include all acid-resistant thermoplastic materials suitable for use in lead acid batteries. In certain preferred embodiments, exemplary thermoplastic polymers may include polyvinyls and polyolefins. In certain embodiments, the polyvinyls may include, for example, polyvinyl chloride ("PVC"). In certain preferred embodiments, the polyolefins may include, for example, polyethylene, polypropylene, ethylene-butene copolymer, and any combination thereof, but preferably polyethylene. In certain embodiments, exemplary natural or synthetic rubbers may include, for example, latex, uncross-linked or cross-linked rubbers, crumb or ground rubber, and any combination thereof.

In addition, it has been observed that when antimony (Sb) is present in the NAM and/or negative electrode, NAM swelling is reduced. Accordingly, there may be an antimony coating on the separator or antimony additive in the separator composition.

Polyolefins

In certain embodiments, the porous membrane layer preferably includes a polyolefin, specifically polyethylene. Preferably, the polyethylene is high molecular weight polyethylene ("HMWPE"), (e.g., polyethylene having a molecular weight of at least 600,000). Even more preferably, the polyethylene is ultra-high molecular weight polyethylene ("UHMWPE"). Exemplary UHMWPE may have a molecular weight of at least 1,000,000, in particular more than 4,000,000, and most preferably 5,000,000 to 8,000,000 as measured by viscosimetry and calculated by Margolie's equation. Further, exemplary UHMWPE may possess a standard load melt index of substantially zero (0) as measured as specified in ASTM D 1238 (Condition E) using a standard load of 2,160 g. Moreover, exemplary UHMWPE may have a viscosity number of not less than 600 ml/g, preferably not less than 1,000 ml/g, more preferably not less than 2,000 ml/g, and most preferably not less than 3,000 ml/g, as determined in a solution of 0.02 g of polyolefin in 100 g of decalin at 130° C.

Rubber

The novel separator disclosed herein may contain latex and/or rubber. As used herein, rubber shall describe, rubber, latex, natural rubber, synthetic rubber, cross-linked or uncross-linked rubbers, cured or uncured rubber, crumb or ground rubber, or mixtures thereof. Exemplary natural rubbers may include one or more blends of polyisoprenes, which are commercially available from a variety of suppliers. Exemplary synthetic rubbers include methyl rubber, polybutadiene, chloropene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber and silicone rubber and copolymer rubbers, such as styrene/butadiene rubbers, acrylonitrile/butadiene rubbers, ethylene/propylene rubbers ("EPM" and "EPDM") and ethylene/vinyl acetate rubbers. The rubber may be a cross-linked rubber or an uncross-linked rubber; in certain preferred embodiments, the rubber is uncross-linked rubber. In certain embodiments, the rubber may be a blend of cross-linked and uncross-linked rubber.

Plasticizer

In certain embodiments, exemplary processing plasticizers may include processing oil, petroleum oil, paraffin-based mineral oil, mineral oil, and any combination thereof.

Fillers

The separator can contain a filler having a high structural morphology. Exemplary fillers can include: silica, dry finely divided silica; precipitated silica; amorphous silica; friable silica; highly friable silica; alumina; talc; fish meal; fish bone meal; carbon; carbon black; and the like, and combinations thereof. In certain preferred embodiments, the filler is one or more silicas. High structural morphology refers to increased surface area. The filler can have a high surface area, for instance, greater than 100 m2/g, 110 m2/g, 120 m2/g, 130 m2/g, 140 m2/g, 150 m2/g, 160 m2/g, 170 m2/g, 180 m2/g, 190 m2/g, 200 m2/g, 210 m2/g, 220 m2/g, 230 m2/g, 240 m2/g, or 250 m2/g. In some embodiments, the filler (e.g., silica) can have a surface area from 100-300 m2/g, 125-275 m2/g, 150-250 m2/g, or preferably 170-220 m2/g. Surface area can be assessed using TriStar 3000™ for multipoint BET nitrogen surface area. High structural morphology permits the filler to hold more oil during the manufacturing process. For instance, a filler with high structural morphology has a high level of oil absorption, for instance, greater than about 150 ml/100 g, 175 ml/100 g, 200 ml/100 g, 225 ml/100 g, 250 ml/100 g, 275 ml/100 g, 300 ml/100 g, 325 ml/100 g, or 350 ml/100 g. In some embodiments the filler (e.g., silica) can have an oil absorption from 200-500 ml/100 g, 200-400 ml/100 g, 225-375 ml/100 g, 225-350 ml/100 g, 225-325 ml/100 g, preferably 250-300 ml/100 g. In some instances, a silica filler is used having an oil absorption of 266 ml/100 g. Such a silica filler has a moisture content of 5.1%, a BET surface area of 178 m2/g, an average particle size of 23 μm, a sieve residue 230 mesh value of 0.1%, and a bulk density of 135 g/L.

Silica with relatively high levels of oil absorption and relatively high levels of affinity for the plasticizer (e.g., mineral oil) becomes desirably dispersible in the mixture of polyolefin (e.g., polyethylene) and the plasticizer when forming an exemplary lead acid battery separator of the type shown herein. In the past, some separators have experienced the detriment of poor dispersibility caused by silica aggregation when large amounts of silica are used to make such separators or membranes. In at least certain of the inventive separators shown and described herein, the polyolefin, such as polyethylene, forms a shish-kebab structure, since there are few silica aggregations or agglomerates that inhibit the molecular motion of the polyolefin at the time of cooling the molten polyolefin. All of this contributes to improved ion permeability through the resulting separator membrane, and the formation of the shish-kebab structure or morphology means that mechanical strength is maintained or even improved while a lower overall ER separator is produced.

In some select embodiments, the filler (e.g., silica) has an average particle size no greater than 25 μm, in some instances, no greater than 22 μm, 20 μm, 18 μm, 15 μm, or 10 μm. In some instances, the average particle size of the filler particles is about 15 μm to about 25 μm. The particle size of the silica filler and/or the surface area of the silica filler contributes to the oil absorption of the silica filler. Silica particles in the final product or separator may fall within the sizes described above. However, the initial silica used as raw material may come as one or more agglomerates and/or aggregates and may have sizes around 200 μm or more.

In some preferred embodiments, the silica used to make the inventive separators has an increased amount of or number of surface silanol groups (surface hydroxyl groups) compared with silica fillers used previously to make lead acid battery separators. For example, the silica fillers that may be used with certain preferred embodiments herein may be those silica fillers having at least 10%, at least 15%, at least 20%, at least 25%, at least 30%, or at least 35% more silanol and/or hydroxyl surface groups compared with known silica fillers used to make known polyolefin lead acid battery separators.

The ratio (Si—OH)/Si of silanol groups (Si—OH) to elemental silicon (Si) can be measured, for example, as follows.

1. Freeze-crush a polyolefin porous membrane (where certain inventive membranes contain a certain variety of oilabsorbing silica according to the present invention), and prepare the powder-like sample for the solid-state nuclear magnetic resonance spectroscopy ($^{29}$Si—NMR).

2. Perform the $^{29}$Si-NMR to the powder-like sample, and observe the spectrums including the Si spectrum strength which is directly bonding to a hydroxyl group (Spectrum: $Q_2$ and $Q_3$) and the Si spectrum strength which is only directly bonding to an oxygen atom (Spectrum: $Q_4$), wherein the molecular structure of each NMR peak spectrum can be delineated as follows:

$Q_2$: $(SiO)_2$—Si*—$(OH)_2$: having two hydroxyl groups
$Q_3$: $(SiO)_3$—Si*—(OH): having one hydroxyl group
$Q_4$: $(SiO)_4$—Si*: All Si bondings are SiO
Where Si* is proved element by NMR observation.

3. The conditions for $^{29}$Si-NMR used for observation are as follows:

Instrument: Bruker BioSpin Avance 500
Resonance Frequency: 99.36 MHz
Sample amount: 250 mg
NMR Tube: 7 mφ
Observing Method: DD/MAS
Pulse Width: 45°
Repetition time: 100 sec
Scans: 800
Magic Angle Spinning: 5,000 Hz
Chemical Shift Reference: Silicone Rubber as −22.43 ppm 4. Numerically, separate peaks of the spectrum, and calculate the area ratio of each peak belonging to $Q_2$, $Q_3$, and $Q_4$. After that, based on the ratios, calculate the molar ratio of hydroxyl groups (—OH) bonding directly to Si. The conditions for the numerical peak separation is conducted in the following manner:

Fitting region: −80 to −130 ppm
Initial peak top: −93 ppm for $Q_2$, −101 ppm for $Q_3$, −111 ppm for $Q_4$, respectively.
Initial full width half maximum: 400 Hz for $Q_2$, 350 Hz for $Q_3$, 450 Hz for $Q_4$, respectively.
Gaussian function ratio: 80% at initial and 70 to 100% while fitting.

5. The peak area ratios (Total is 100) of $Q_2$, $Q_3$, and $Q_4$ are calculated based on the each peak obtained by fitting. The NMR peak area corresponded to the molecular number of each silicate bonding structure (thus, for the $Q_4$ NMR peak, four Si—O—Si bonds are present within that silicate structure; for the $Q_3$ NMR peak, three Si—O—Si bonds are present within that silicate structure while one Si—OH bond is present; and for the $Q_2$ NMR peak, two Si—O—Si bonds are present within that silicate structure while two Si—OH bonds are present). Therefore each number of the hydroxyl group (—OH) of $Q_2$, $Q_3$, and $Q_4$ is multiplied by two (2) one (1), and zero (0), respectively. These three results are summed. The summed value displays the mole ratio of hydroxyl groups (—OH) directly bonding to Si.

In certain embodiments, the silica may have a molecular ratio of OH to Si groups, measured by $^{29}$Si-NMR, that may be within a range of approximately 21:100 to 35:100, in some preferred embodiments approximately 23:100 to approximately 31:100, in certain preferred embodiments, approximately 25:100 to approximately 29:100, and in other preferred embodiments at least approximately 27:100 or greater.

In some select embodiments, use of the fillers described above permits the use of a greater proportion of processing oil during the extrusion step. As the porous structure in the separator is formed, in part, by removal of the oil after the extrusion, higher initial absorbed amounts of oil results in higher porosity or higher void volume. While processing oil is an integral component of the extrusion step, oil is a non-conducting component of the separator. Residual oil in the separator protects the separator from oxidation when in contact with the positive electrode. The precise amount of oil in the processing step may be controlled in the manufacture of conventional separators. Generally speaking, conventional separators are manufactured using 50-70% processing oil, in some embodiments, 55-65%, in some embodiments, 60-65%, and in some embodiments, about 62% by weight processing oil. Reducing oil below about 59% is known to cause burning due to increased friction against the extruder components. However, increasing oil much above the prescribed amount may cause shrinking during the drying stage, leading to dimensional instability. Although previous attempts to increase oil content resulted in pore shrinkage or condensation during the oil removal, separators prepared as disclosed herein exhibit minimal, if any, shrinkage and condensation during oil removal. Thus, porosity can be increased without compromising pore size and dimensional stability, thereby decreasing electrical resistance.

In certain select embodiments, the use of the filler described above allows for a reduced final oil concentration in the finished separator. Since oil is a non-conductor, reducing oil content can increase the ionic conductivity of the separator and assist in lowering the ER of the separator. As such, separators having reduced final oil contents can have increased efficiency. In certain select embodiments are provided separators having a final processing oil content (by weight) less than 20%, for example, between about 14% and 20%, and in some particular embodiments, less than 19%, 18%, 17%, 16%, 15%, 14%, 13%, 12%, 11%, 10%, 9%, 8%, 7%, 6%, or 5%.

The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (e.g., polar species, such as metals) that facilitate the flow of electrolyte and ions across the separator. Such also leads to decreased overall electrical resistance as such a separator is used in a flooded battery, such as an enhanced flooded battery.

In certain embodiments, a separator may contain a performance-enhancing additive in the form of a conductive element or a nucleation additive and/or coating. The conductive element or nucleation additive may preferably be stable in the battery electrolyte, and may further be dispersed within the electrolyte.

Exemplary forms of conductive elements and/or coatings may be or contain carbon, such as carbon, conductive carbon, graphite, artificial graphite, activated carbon, carbon paper, acetylene black, carbon black, high surface area carbon black, graphene, high surface area graphene, keitjen black, carbon fibers, carbon filaments, carbon nanotubes, open-cell carbon foam, a carbon mat, carbon felt, carbon Buckminsterfullerene (Bucky Balls), an aqueous carbon suspension, flake graphite, oxidized carbon, and combinations thereof. In addition to these many forms of carbon, the nucleation additive and/or coating may also include or contain barium sulfate ($BaSO_4$) either alone or in combination with carbon. One exemplary form of carbon is PBX®-135, manufactured by Cabot Corporation of Boston, MA, USA. One exemplary preferred form of carbon is PBX®-51 manufactured by Cabot Corporation of Boston, MA, USA. The inventors theorize that the greater the surface area of the carbon, the greater the dynamic charge acceptance in the battery. For example, PBX®-51 has a specific surface area of at least approximately 1,300 $m^2/g$ to approximately 1,500 $m^2/g$, and keitjen black has a surface area of at least approximately 1,250 $m^2/g$.

The nucleation coating may be applied to a finished separator by such means as a slurry coating, slot die coating, spray coating, curtain coating, ink jet printing, screen printing, or by vacuum deposition or chemical vapor deposition ("CVD"). In addition, the additive and/or coating may be provided as carbon paper, either woven or nonwoven, and disposed between and in intimate contact with the separator and electrode(s).

The nucleation additive and/or coating may be within the separator, or on one or both electrode facing surfaces of the separator. Typically, a coating or layer of the nucleation additive may only be on the negative electrode facing surface. However, it may be on the positive electrode facing surface, or on both surfaces.

In certain embodiments, the nucleation additive may be added to the extrusion mix of base materials and extruded with the separator, or co-extruded as a layer on the separator. When included in the extrusion mix, the nucleation additive may replace some of the silica filler by as much as 5% to 75% by weight. For example, the nucleation additive may be approximately 5%, 10%, 15%, 20%, 25%, 30%, 35%, 40%, 45%, 50%, 55%, 60%, 65%, 70%, or approximately 75% by weight. In other exemplary embodiments, the nucleation additive may be no greater than approximately 75%, 70%, 65%, 60%, 55%, 50%, 45%, 40%, 35%, 30%, 25%, 20%, 15%, 10%, or approximately 5% weight.

Friability

In certain select embodiments, the filler can be an alumina, talc, silica, or a combination thereof. In some embodiments, the filler can be a precipitated silica, and in some embodiments, the precipitated silica is amorphous silica. In some embodiments, it is preferred to use aggregates and/or agglomerates of silica which allow for a fine dispersion of filler throughout the separator, thereby decreasing tortuosity and electrical resistance. In certain preferred embodiments, the filler (e.g., silica) is characterized by a high level of friability. Good friability enhances the dispersion of the filler throughout the polymer during extrusion of the porous membrane, enhancing porosity and thus overall ionic conductivity through the separator.

The use of a filler having one or more of the above characteristics enables the production of a separator having a higher final porosity. The separators disclosed herein can have a final porosity greater than 60%, 61%, 62%, 63%, 64%, 65%, 66%, 67%, 68%, 69%, or 70%. Porosity may be measured using gas adsorption methods. Porosity can be measured by BS-TE-2060.

In some select embodiments, the porous separator can have a greater proportion of larger pores while maintaining the average pore size no greater than about 1 µm, 0.9 µm, 0.8 µm, 0.7 µm, 0.6 µm, 0.5 µm, or 0.1 µm.

In accordance with at least one embodiment, the separator is made up of polyethylene, such as an ultrahigh molecular weight polyethylene ("UHMWPE"), mixed with a processing oil and filler as well as any desired additive. In accordance with at least one other embodiment, the separator is made up of an ultrahigh molecular weight polyethylene (UHMWPE) mixed with a processing oil and talc. In accordance with at least one other embodiment, the separator is made up of UHMWPE mixed with a processing oil and silica, for instance, precipitated silica, for instance, amorphous precipitated silica. The additive can then be applied to the separator via one or more of the techniques described above.

Besides reducing electrical resistance and increasing cold cranking amps, preferred separators are also designed to bring other benefits. With regard to assembly, the separators are more easily passed through processing equipment, and therefore more efficiently manufactured. To prevent shorts during high speed assembly and later in life, the separators have superior puncture strength and oxidation resistance when compared to standard PE separators. Combined with reduced electrical resistance and increased cold cranking amps, battery manufacturers are likely to find improved and sustained electrical performance in their batteries with these new separators.

Additives/Surfactants

In certain embodiments, exemplary separators may contain one or more performance enhancing additives added to the separator or porous membrane. The performance enhancing additive may be surfactants, wetting agents, colorants, antistatic additives, an antimony suppressing additive, UV-protection additives, antioxidants, and/or the like, and any combination thereof. In certain embodiments, the additive surfactants may be ionic, cationic, anionic, or non-ionic surfactants.

In certain embodiments described herein, a reduced amount of anionic or non-ionic surfactant is added to the inventive porous membrane or separator. Because of the lower amount of surfactant, a desirable feature may include lowered total organic carbons ("TOCs") and/or lowered volatile organic compounds ("VOCs").

Certain suitable surfactants are non-ionic while other suitable surfactants are anionic. The additive may be a single surfactant or a mixture of two or more surfactants, for instance two or more anionic surfactants, two or more non-ionic surfactants, or at least one ionic surfactant and at least one non-ionic surfactant. Certain suitable surfactants may have HLB values less than 6, preferably less than 3. The use of these certain suitable surfactants in conjunction with the inventive separators described herein can lead to even further improved separators that, when used in a lead acid battery, lead to reduced water loss, reduced antimony poisoning, improved cycling, reduced float current, reduced float potential, and/or the like, or any combination thereof for that lead acid batteries. Suitable surfactants include surfactants such as salts of alkyl sulfates; alkylarylsulfonate salts; alkylphenol-alkylene oxide addition products; soaps; alkyl-naphthalene-sulfonate salts; one or more sulfo-succinates, such as an anionic sulfo-succinate; dialkyl esters of sulfo-succinate salts; amino compounds (primary, secondary, tertiary amines, or quaternary amines); block copolymers of ethylene oxide and propylene oxide; various polyethylene oxides; and salts of mono and dialkyl phosphate esters. The additive can include a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments, the additive may be represented by a compound of Formula (I)

$$R(OR^1)_n(COOM_{1/x}^{x+})_m \quad (I)$$

in which:
R is a linear or non-aromatic hydrocarbon radical with 10 to 4200 carbon atoms, preferably 13 to 4200, which may be interrupted by oxygen atoms;
$R^1=H$, $-(CH_2)_k COOM_{1/x}^{x+}$, or $-(CH_2)_k-SO_3M_{1/x}^{x+}$, preferably H, where k=1 or 2;
M is an alkali metal or alkaline-earth metal ion, $H^+$ or $NH_4^+$, where not all the variables M simultaneously have the meaning $H^+$;
n=0 or 1;
m=0 or an integer from 10 to 1400; and
x=1 or 2.

The ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals may be interrupted by oxygen atoms (i.e., contain one or more ether groups).

R is preferably a straight-chain or branched aliphatic hydrocarbon radical which may be interrupted by oxygen atoms. Saturated, uncross-linked hydrocarbon radicals are quite particularly preferred. However, as noted above, R may, in certain embodiments, be aromatic ring-containing.

Through the use of the compounds of Formula (I) for the production of battery separators, they may be effectively protected against oxidative destruction.
Battery separators are preferred which contain a compound according to Formula (I) in which:
R is a hydrocarbon radical with 10 to 180, preferably 12 to 75 and quite particularly preferably 14 to 40 carbon atoms, which may be interrupted by 1 to 60, preferably 1 to 20 and quite particularly preferably 1 to 8 oxygen atoms, particularly preferably a hydrocarbon radical of formula $R^2-[(OC_2H_4)_p(OC_3H_6)_q]-$, in which:
$R^2$ is an alkyl radical with 10 to 30 carbon atoms, preferably 12 to 25, particularly preferably 14 to 20 carbon atoms, wherein $R^2$ can be linear or non-linear such as containing an aromatic ring;
P is an integer from 0 to 30, preferably 0 to 10, particularly preferably 0 to 4; and
q is an integer from 0 to 30, preferably 0 to 10, particularly preferably 0 to 4;
compounds being particularly preferred in which the sum of p and q is 0 to 10, in particular 0 to 4;
n=1; and
m=0.
Formula $R^2-[(OC_2H_4)_p(OC_3H_6)_q]-$ is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)_2$ and/or $OCH_2CH_2CH_3$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which:
R is an alkane radical with 20 to 4200, preferably 50 to 750 and quite particularly preferably 80 to 225 carbon atoms;
M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$;
n=0;
m is an integer from 10 to 1400; and
x=1 or 2.
Salt Additives In certain embodiments, suitable additives may include, in particular, polyacrylic acids, polymethacrylic acids and acrylic acid-methacrylic acid copolymers, whose acid groups are at least partly neutralized, such as by preferably 40%, and particularly preferably by 80%. The percentage refers to the number of acid groups. Quite particularly preferred are poly(meth)acrylic acids which are present entirely in the salt form. Suitable salts include Li, Na, K, Rb, Be, Mg, Ca, Sr, Zn, and ammonium ($NR_4$, wherein R is either hydrogen or a carbon functional group). Poly(meth)acrylic acids may include polyacrylic acids, polymethacrylic acids, and acrylic acid-methacrylic acid copolymers. Poly(meth)acrylic acids are preferred and in particular polyacrylic acids with an average molar mass $M_w$ of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40% by weight and preferably at least 80% by weight (meth)acrylic acid monomer; the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable. In addition, a coating and/or additive to enhance the separator may include, for example, a metal alkoxide, wherein the metal may be, by way of example only (not intended to be limiting), Zn, Na, or Al, by way of example only, sodium ethoxide.

In some embodiments, the porous polyolefin porous membrane may include a coating on one or both sides of such layer. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss.

Ratios

In certain select embodiments, the membrane may be prepared by combining, by weight, about 5-15% polymer, in some instances, about 10% polymer (e.g., polyethylene), about 10-75% filler (e.g., silica), in some instances, about 30% filler, and about 10-85% processing oil, in some instances, about 60% processing oil. In other embodiments, the filler content is reduced, and the oil content is higher, for instance, greater than about 61%, 62%, 63%, 64%, 65%, 66%, 67%, 68%, 69% or 70% by weight. The filler:polymer ratio (by weight) may be about (or may be between about these specific ranges) such as 2:1, 2.5:1, 3:1, 3.5:1, 4.0:1. 4.5:1, 5.0:1, 5.5:1 or 6:1. The filler:polymer ratio (by weight) may be from about 1.5:1 to about 6:1, in some instances, 2:1 to 6:1, from about 2:1 to 5:1, from about 2:1 to 4:1, and in some instances, from about 2:1 to about 3:1. The amounts of the filler, the oil, and polymer are all balanced for runnability and desirable separator properties, such as electrical resistance, basis weight, puncture resistance, bending stiffness, oxidation resistance, porosity, physical strength, tortuosity, and the like.

In accordance with at least one embodiment, the porous membrane can include an UHMWPE mixed with a processing oil and precipitated silica. In accordance with at least one embodiment, the porous membrane can include an UHMWPE mixed with a processing oil, additive and precipitated silica. The mixture may also include minor amounts of other additives or agents as is common in the separator arts (e.g., surfactants, wetting agents, colorants, antistatic additives, antioxidants, and/or the like, and any combination thereof). In certain instances, the porous polymer layer may be a homogeneous mixture of 8 to 100% by volume of polyolefin, 0 to 40% by volume of a plasticizer and 0 to 92% by volume of inert filler material. The preferred plasticizer is petroleum oil. Since the plasticizer is the component which is easiest to remove, by solvent extraction and drying, from the polymer-filler-plasticizer composition, it is useful in imparting porosity to the battery separator.

In certain embodiments, the porous membrane disclosed herein may contain latex and/or rubber, which may be a natural rubber, synthetic rubber, or a mixture thereof. Natural rubbers may include one or more blends of polyisoprenes, which are commercially available from a variety of suppliers. Exemplary synthetic rubbers include methyl rubber, polybutadiene, chloropene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber and silicone rubber and copolymer rubbers, such as styrene/butadiene rubbers, acrylonitrile/butadiene rubbers, ethylene/propylene rubbers (EPM and EPDM) and ethylene/vinyl acetate rubbers. The rubber may be a cross-linked rubber or an uncross-linked rubber; in certain preferred embodiments, the rubber is uncross-linked rubber. In certain embodiments, the rubber may be a blend of cross-linked and uncross-linked rubber. The rubber may be present in the separator in an amount that is at least about 1%, 2%, 3%, 4%, 5%, 6%, 7%, 8%, 9%, or 10% by weight relative to the final separator weight (the weight of the polyolefin separator sheet or layer containing rubber and/or latex). In certain embodiments, the rubber may be present in an amount from approximately 1-6%, approximately 3-6% by weight, approximately 3% by weight, and approximately 6% by weight. The porous membrane may have a filler to polymer and rubber (filler:polymer and rubber) weight ratio of approximately 2.6:1.0. The amounts of the rubber, filler, oil, and polymer are all balanced for runnability and desirable separator properties, such as electrical resistance, basis weight, puncture resistance, bending stiffness, oxidation resistance, porosity, physical strength, tortuosity, and the like.

A porous membrane made in accordance with the present invention, is provided with a polyethylene and a filler (e.g., silica) typically has a residual oil content; in some embodiments, such residual oil content is from about 0.5% up to about 40% of the total weight of the separator membrane (in some instances, about 10-40% of the total weight of the separator membrane, and in some instances, about 20-40% of that total weight). In certain select embodiments herein, some to all of the residual oil content in the separator may be replaced by the addition of more of a performance enhancing additive, such as a surfactant, such as a surfactant with a hydrophilic-lipophilic balance ("HLB") less than 6, or such as a nonionic surfactant. For example, a performance enhancing additive such as a surfactant, such as a nonionic surfactant, may have up to 0.5% all the way up to all of the amount of the residual oil content (e.g., all the way up to 20% or 30% or even 40%) of the total weight of the porous separator membrane, thereby partially or completely replacing the residual oil in the separator membrane.

Manufacture

In some embodiments, an exemplary porous membrane may be made by mixing the constituent parts in an extruder. For example, about 30% by weight filler with about 10% by weight UHMWPE, and about 60% processing oil may be mixed in an extruder. The exemplary porous membrane may be made by passing the constituent parts through a heated extruder, passing the extrudate generated by the extruder through a die and into a nip formed by two heated presses or calender stack or rolls to form a continuous web. A substantial amount of the processing oil from the web may be extracted by use of a solvent, thereby followed with removing the solvent by drying. The web may then be cut into lanes of predetermined width, and then wound onto rolls.

Additionally, the presses or calender rolls may be engraved with various groove patterns to impart ribs, grooves, textured areas, embossments, and/or the like as substantially described herein.

Manufacture with Rubber

In some embodiments, an exemplary porous membrane may be made by mixing the constituent parts in an extruder. For example, about 5-15% by weight polymer (e.g., polyethylene), about 10-75% by weight filler (e.g., silica), about 1-50% by weight rubber and/or latex, and about 10-85% processing oil may be mixed in an extruder. The exemplary porous membrane may be made by passing the constituent parts through a heated extruder, passing the extrudate generated by the extruder through a die and into a nip formed by two heated presses or calender stack or rolls to form a continuous web. A substantial amount of the processing oil from the web may be extracted by use of a solvent. The web may then be dried and slit into lanes of predetermined width, and then wound onto rolls. Additionally, the presses or calender rolls may be engraved with various groove patterns to impart ribs, grooves, textured areas, embossments, and/or the like as substantially described herein. The amounts of the rubber, filler, oil, and polymer are all balanced for runnability and desirable separator properties, such as electrical resistance, basis weight, puncture resistance, bending stiffness, oxidation resistance, porosity, physical strength, tortuosity, and the like.

In addition to being added to the constituent parts of the extruder, certain embodiments combine the rubber to the porous membrane after extrusion. For example, the rubber may be coated onto one or both sides, preferably on the side facing the negative electrode, with a liquid slurry having the rubber and/or latex, optionally, silica, and water, and then dried such that a film of this material is formed upon the surface of an exemplary porous membrane. For better wettability of this layer, known wetting agents may be added to the slurry for use in lead acid batteries. In certain embodiments, the slurry can also contain one or more performance enhancing additives as described herein. After drying, a porous layer and/or film forms on the surface of the separator, which adheres very well to the porous membrane and increases electrical resistance only insignificantly, if at all. After the rubber is added, it may be further compressed using either a machine press or calender stack or roll. Other possible methods to apply the rubber and/or latex are to apply a rubber and/or latex slurry by dip coat, roller coat, spray coat, or curtain coat one or more surfaces of the separator, or any combination thereof. These processes may occur before or after the processing oil has been extracted, or before or after it is slit into lanes.

A further embodiment of the present invention involves depositing rubber onto the membrane by impregnation and drying.

Manufacture with Performance Enhancing Additives

In certain embodiments, performance enhancing additives or agents (e.g., surfactants, wetting agents, colorants, antistatic additives, antioxidants, and/or the like, and any combination thereof) may also be mixed together with the other constituent parts within the extruder. A porous membrane according to the present disclosure may then be extruded into the shape of a sheet or web, and finished in substantially the same way as described above.

In certain embodiments, and in addition or alternative to adding into the extruder, the additive or additives may, for example, be applied to the separator porous membrane when it is finished (e.g., after extracting a bulk of the processing oil, and before or after the introduction of the rubber). According to certain preferred embodiments, the additive or a solution (e.g., an aqueous solution) of the additive is applied to one or more surfaces of the separator. This variant is suitable in particular for the application of non-thermostable additives and additives which are soluble in the solvent used for the extraction of processing oil. Particularly suitable as solvents for the additives according to the invention are low-molecular-weight alcohols, such as methanol and ethanol, as well as mixtures of these alcohols with water. The application can take place on the side facing the negative electrode, the side facing the positive electrode, or on both sides of the separator. The application may also take place during the extraction of the pore forming agent (e.g., the processing oil) while in a solvent bath. In certain select embodiments, some portion of a performance enhancing additive, such as a surfactant coating or a performance enhancing additive added to the extruder before the separator is made (or both) may combine with the antimony in the battery system and may inactivate it and/or form a compound with it and/or cause it to drop down into the mud rest of the battery and/or prevent it from depositing onto the negative electrode. The surfactant or additive may also be added to the electrolyte, the glass mat, the battery case, pasting paper, pasting mat, and/or the like, or combinations thereof.

In certain embodiments, the additive (e.g., a non-ionic surfactant, an anionic surfactant, or mixtures thereof) may be present at a density or add-on level of at least 0.5 $g/m^2$, 1.0 $g/m^2$, 1.5 $g/m^2$, 2.0 $g/m^2$, 2.5 $g/m^2$, 3.0 $g/m^2$, 3.5 $g/m^2$, 4.0 $g/m^2$, 4.5 $g/m^2$, 5.0 $g/m^2$, 5.5 $g/m^2$, 6.0 $g/m^2$, 6.5 $g/m^2$, 7.0 $g/m^2$, 7.5 $g/m^2$, 8.0 $g/m^2$, 8.5 $g/m^2$, 9.0 $g/m^2$, 9.5 $g/m^2$ or 10.0 $g/m^2$ or even up to about 25.0 $g/m^2$. The additive may be present on the separator at a density or add-on level between 0.5-15 $g/m^2$, 0.5-10 $g/m^2$, 1.0-10.0 $g/m^2$, 1.5-10.0 $g/m^2$, 2.0-10.0 $g/m^2$, 2.5-10.0 $g/m^2$, 3.0-10.0 $g/m^2$, 3.5-10.0 $g/m^2$, 4.0-10.0 $g/m^2$, 4.5-10.0 $g/m^2$, 5.0-10.0 $g/m^2$, 5.5-10.0 $g/m^2$, 6.0-10.0 $g/m^2$, 6.5-10.0 $g/m^2$, 7.0-10.0 $g/m^2$, 7.5-10.0 $g/m^2$, 4.5-7.5 $g/m^2$, 5.0-10.5 $g/m^2$, 5.0-11.0 $g/m^2$, 5.0-12.0 $g/m^2$, 5.0-15.0 $g/m^2$, 5.0-16.0 $g/m^2$, 5.0-17.0 $g/m^2$, 5.0-18.0 $g/m^2$, 5.0-19.0 $g/m^2$, 5.0-20.0 $g/m^2$, 5.0-21.0 $g/m^2$, 5.0-22.0 $g/m^2$, 5.0-23.0 $g/m^2$, 5.0-24.0 $g/m^2$, or 5.0-25.0 $g/m^2$.

The application may also take place by dipping the battery separator in the additive or a solution of the additive (solvent bath addition) and removing the solvent if necessary (e.g., by drying). In this way the application of the additive may be combined, for example, with the extraction often applied during membrane production. Other preferred methods are to spray the surface with additive, dip coat, roller coat, or curtain coat the one or more additives on the surface of separator.

In certain embodiments described herein, a reduced amount of ionic, cationic, anionic, or non-ionic surfactant is added to the inventive separator. In such instances, a desirable feature may include lowered total organic carbons and/or lowered volatile organic compounds (because of the lower amount of surfactant) may produce a desirable inventive separator according to such embodiment.

Combined with a Fibrous Mat

Certain embodiments of this invention use scrims and laminates. To provide spacing at either the negative or positive electrodes, scrims or laminates could be used instead. Therefore one embodiment could be a flat sheet PE separator combined with two layers that face both the positive and negative electrode.

In certain embodiments, exemplary separators according to the present disclosure may be combined with another layer (laminated or otherwise), such as a fibrous layer or fibrous mat having enhanced wicking properties and/or enhanced wetting or holding of electrolyte properties. The fibrous mat may be woven, nonwoven, fleeces, mesh, net, single layered, multi-layered (where each layer may have the same, similar or different characteristics than the other layers), composed of glass fibers, or synthetic fibers, fleeces or fabrics made from synthetic fibers or mixtures with glass and synthetic fibers or paper, or any combination thereof.

In certain embodiments, the fibrous mat (laminated or otherwise) may be used as a carrier for additional materials. The addition material may include, for example, rubber and/or latex, optionally silica, water, and/or one or more performance enhancing additive, such as various additives described herein, or any combination thereof. By way of example, the additional material may be delivered in the form of a slurry that may then be coated onto one or more surfaces of the fibrous mat to form a film, or soaked and impregnated into the fibrous mat.

When the fibrous layer is present, it is preferred that the porous membrane has a larger surface area than the fibrous layers. Thus, when combining the porous membrane and the fibrous layers, the fibrous layers do not completely cover the porous layer. It is preferred that at least two opposing edge regions of the membrane layer remain uncovered to provide edges for heat sealing which facilitates the optional formation of pockets or envelopes and/or the like. Such a fibrous mat may have a thickness that is at least 100 µm, in some embodiments, at least about 200 µm, at least about 250 µm, at least about 300 µm, at least about 400 µm, at least about 500 µm, at least about 600 µm, at least about 700 µm, at least about 800 µm, at least about 900 µm, at least about 1 mm, at least about 2 mm, and so forth. The subsequent laminated separator may be cut into pieces. In certain embodiments, the fibrous mat is laminated to a ribbed surface of the porous membrane porous membrane. In certain embodiments, handling and/or assembly advantages are provided to the battery maker with the improved separator described herein, as it may be supplied in roll form and/or cut piece form. And as mentioned previously, the improved separator may be a standalone separator sheet or layer without the addition of one or more fibrous mats or the like.

If the fibrous mat is laminated to the porous membrane, they may be bonded together by adhesive, heat, ultrasonic welding, compression, and/or the like, or any combination thereof. And, the fibrous mat may be a PAM or NAM retention mat.

Conclusions

In accordance with at least selected embodiments, the present disclosure or invention is directed to separators, particularly separators for flooded lead acid batteries, gel batteries, VRLA batteries, AGM batteries, and/or the like, wherein the separators are capable of improving acid availability at the electrodes, reducing or mitigating acid starvation; reducing or mitigating acid stratification; reducing or mitigating dendrite growth; and having reduced electrical resistance and/or capable of increasing cold cranking amps. In addition, disclosed herein are methods, systems, and battery separators for enhancing battery life; improving acid availability at the electrodes; reducing or mitigating acid starvation; reducing or mitigating acid stratification; reducing to mitigating dendrite growth; reducing the effects of oxidation; reducing water loss; reducing internal resistance; increasing wettability; improving acid diffusion; improving cold cranking amps, improving uniformity, and any combination thereof in at least enhanced flooded lead acid batteries. In accordance with at least particular embodiments, the present disclosure or invention is directed to an improved separator for flooded lead acid batteries, enhanced flooded lead acid batteries, gel batteries, VRLA batteries, AGM batteries, and/or the like wherein the separator includes an improved and novel rib design, and improved separator resiliency.

In accordance with at least particular embodiments, the present disclosure or invention is directed to an improved separator for flooded lead acid batteries, enhanced flooded lead acid batteries, gel batteries, VRLA batteries, AGM batteries, and/or the like wherein the separator includes performance enhancing additives or coatings, increased oxidation resistance, optimized porosity, optimized void volume, carbon, barium sulfate, amorphous silica, higher oil absorption silica, higher silanol group silica, silica with an OH to Si ratio of 21:100 to 35:100, a shish-kebab structure or morphology, a polyolefin microporous membrane containing particle-like filler in an amount of 40% or more by weight of the membrane and polymer, such as ultrahigh molecular weight polyethylene ("UHMWPE"), having shish-kebab formations with extended chain crystal (shish formation) and folded chain crystal (kebab formation) and the average repetition periodicity of the kebab formation from 1 nm to 150 nm, decreased sheet thickness, optimized tortuosity, reduced thickness, reduced oil content, increased wettability, increased acid diffusion, and/or the like, and any combination thereof.

In accordance with at least selected embodiments, the present disclosure or invention may address the above issues or needs and/or may provide novel or improved separators and/or enhanced flooded batteries. In accordance with at least selected embodiments, the present disclosure or invention is directed to novel or improved separators, battery separators, enhanced flooded battery separators, gel battery separators, AGM battery separators, batteries, cells, and/or methods of manufacture and/or use of such separators, battery separators, enhanced flooded battery separators, gel battery separators, AGM battery separators, cells, and/or batteries. In accordance with at least certain embodiments, the present disclosure or invention is directed to novel or improved battery separators, resilient separators, balanced separators, flooded lead acid battery separators, or enhanced flooded battery separators, gel battery separators, AGM battery separators, separators for automobile applications, for idle-start-stop ("ISS") batteries, for batteries with high power requirements, such as uninterrupted power supply ("UPS") or valve regulated lead acid ("VRLA"), and/or for batteries with high CCA requirements, and/or improved methods of making and/or using such improved separators, cells, batteries, systems, and/or the like. In accordance with at least certain embodiments, the present disclosure or invention is directed to an improved separator for enhanced flooded batteries, VRLA batteries, gel batteries, AGM batteries, and/or improved methods of using such batteries having such improved separators. In addition, disclosed herein are methods, systems and battery separators for enhancing battery performance and life, reducing acid stratification, reducing internal electrical resistance, increasing cold cranking amps, and/or improving uniformity in at least enhanced flooded batteries. In accordance with at least particular embodiments, the present disclosure or invention is directed to an improved separator for enhanced flooded batteries, VRLA batteries, gel batteries, and/or AGM separators, wherein the separator includes decreased electrical resistance, performance enhancing additives or coatings, improved fillers, increased porosity, optimized tortuosity, reduced thickness, reduced oil content, increased wettability, increased acid diffusion, and/or the like.

In accordance with at least select embodiments, the present disclosure or invention is directed to novel or improved separators for lead acid batteries, such as flooded lead acid batteries, and in particular enhanced flooded lead acid batteries ("EFBs"), and various other lead acid batteries, such as VRLA batteries, gel batteries and absorptive glass mat ("AGM") batteries. In accordance with at least select embodiments, the present disclosure or invention is directed to novel or improved separators, battery separators, resilient separators, balanced separators, EFB separators, gel battery separators, AGM battery separators, batteries, cells, systems, methods involving the same, vehicles using the same, methods of manufacturing the same, the use of the same, and combinations thereof. In addition, disclosed herein are methods, systems, and battery separators for enhancing battery life and reducing battery failure by reducing battery electrode acid starvation.

In accordance with at least selected embodiments, the present disclosure or invention is directed to novel or improved separators, battery separators, enhanced flooded battery separators, batteries, cells, and/or methods of manufacture and/or use of such separators, battery separators, enhanced flooded battery separators, gel battery separators, AGM battery separators, cells, batteries, systems, methods, and/or vehicles using the same. In accordance with at least certain embodiments, the present disclosure or invention is directed to novel or improved battery separators, flooded lead acid battery separators, enhanced flooded lead acid battery separators, gel battery separators, or AGM battery separators, such as those useful for deep-cycling and/or partial state of charge ("PSoC") applications. Such applications may include such non-limiting examples as: electric motive machine applications, such as fork lifts and golf carts (sometimes referred to as golf cars), e-rickshaws, e-bikes, e-trikes, and/or the like; automobile applications such as starting lighting ignition ("SLI") batteries, such as those used for internal combustion engine vehicles; idle-start-stop ("ISS") vehicle batteries; hybrid vehicle applications, hybrid-electric vehicle applications; batteries with high power requirements, such as uninterrupted power supply ("UPS") or valve regulated lead acid ("VRLA"), and/or for batteries with high CCA requirements; inverters; and energy storage systems, such as those found in renewable and/or alternative energy systems, such as solar and wind power collection systems.

In accordance with at least a first aspect of certain selected embodiments, a lead acid battery separator is provided with a porous membrane having a polymer and a filler. The porous membrane is provided with at least a first surface with at least a first plurality of ribs extending from the first surface. The first plurality of ribs are provided with a first plurality of teeth or discontinuous peaks or protrusions, where each of the first plurality of teeth or discontinuous peaks or protrusions are in such proximity to one another to provide resiliency to the separator. Such resiliency may refer to the separators ability to resist deflecting while under pressure resulting from NAM swelling, and even PAM swelling. Such proximity may be at least approximately 1.5 mm from one tooth, peak, or protrusion to another. The separator may be further provided with a continuous base portion with the first plurality of teeth or discontinuous peaks or protrusions extending from the base portion.

In certain embodiments, the separator may be provided with a continuous base portion with the first plurality of teeth or discontinuous peaks or protrusions extending from the base portion. The base portion may be wider than the width of the teeth or discontinuous peaks or protrusions. In addition, the base portion may extend continuously between each of the teeth or discontinuous peaks or protrusions.

In certain select embodiments, a lead acid battery separator is provided with a porous membrane having a backweb with a first surface, a second surface, and a backweb thickness defined as the distance between the first surface and the second surface. A first array of ribs may be provided extending from the first surface, and a second array of ribs may be provided extending from the second surface. The first array of ribs having a first height, and the second array of ribs having a second height; whereby the first height is no more than about 300% of the second height, no more than about 200% of the second height, and/or no more than about 100% of the second height, and/or similar ratios. Furthermore in certain aspects, the total separator thickness is no more than approximately 1.5 mm.

In certain aspects of the present invention, the lead acid battery separator may be provided with either of the first array of ribs, the second array of ribs, or both the first array of ribs and the second array of ribs being provided with a top rib width no greater than approximately 500 µm, no greater than approximately 400 µm, no greater than approximately 300 µm, no greater than approximately 200 µm, and/or no greater than approximately 100 µm, and/or similar magnitudes.

In certain select aspects of the present invention, either or both of the first array of ribs are chosen from the group consisting of solid ribs, discrete broken ribs, continuous ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, discrete teeth or toothed ribs, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In accordance with at least select embodiments of the present invention, a lead acid battery is provided with a first electrode and a second electrode. At least a portion of a separator is disposed between the first electrode and the second electrode. The separator is provided with a porous membrane backweb, wherein the backweb is provided with a first surface with a first array of ribs extending therefrom, wherein the first surface faces the first electrode. The separator may be provided with at least 20 ribs in contact with the first electrode, whereby each of the 20 ribs are provided with a first rib top width that is no greater than approximately 500 µm, no greater than approximately 400 µm, no greater than approximately 300 µm, no greater than approximately 200 µm, and/or no greater than approximately 100 µm, and/or similar magnitudes. In certain aspects, the first array of ribs may be provided with at least approximately 20 ribs, at least approximately 30 ribs, at least approximately 40 ribs, and/or more, and/or similar magnitudes on a separator width of approximately 120 mm, approximately 160 mm, and/or the like. The first electrode may be a positive electrode or a negative electrode.

In select aspects, the first array of ribs may have a series of discontinuous peaks with each discontinuous peak being in complete contact with the first electrode, thus creating a discontinuous supported area of the first electrode that encompasses a plurality of supported portions of the first electrode, and an unsupported portion of the first electrode; wherein a distance between adjacent supported portions of the plurality of supported portions of the first electrode is no more than approximately 6.0 mm, no more than approximately 5.0 mm, no more than approximately 4.0 mm, no more than approximately 3.0 mm, no more than approximately 2.0 mm, and/or no more than approximately 1.0 mm, and/or similar magnitudes.

In select aspects, the lead acid battery has a second surface facing the second electrode and having a second array of ribs extending therefrom. The first array of ribs have a height that is approximately 300% of the height of the second array of ribs, or 200%, or 100%, and/or less. Whereby the first array of ribs are positive ribs and the second array of ribs are negative ribs. In addition, the overall separator thickness may be no more than about 1.5 mm.

In certain aspects, the second array of ribs are provided with a second rib top width that is no greater than approximately 500 µm, no greater than approximately 400 µm, no greater than approximately 300 µm, no greater than approximately 200 µm, no greater than approximately 100 µm.

In certain select exemplary aspects, the inventive separator may be provided with a nucleation additive. That nucleation additive may be conductive, and be one of either carbon or barium sulfate ($BaSO_4$). Exemplary carbon additives may be carbon, conductive carbon, graphite, artificial graphite, activated carbon, carbon paper, acetylene black, carbon black, high surface area carbon black, graphene, high surface area graphene, keitjen black, carbon fibers, carbon filaments, carbon nanotubes, open-cell carbon foam, a carbon mat, carbon felt, carbon Buckminsterfullerene ("Bucky Balls"), an aqueous carbon suspension, flake graphite, oxidized carbon, and combinations thereof. The conductive element or nucleation additive may have a specific surface area of at least approximately 1,250 m²/g to approximately 1,750 m²/g, or more. The nucleation additive or conductive element may be an additive within the separator, or an additive on a surface of the separator. The conductive element or nucleation additive may be applied to a surface of a separator, scrim, and/or mat by a method selected from the group consisting of; roller coating, chemical vapor deposition, co-extrusion, a controlled burn to char said surface, a controlled burn to char said surface via plasma exposure, a controlled burn to char said surface via UV exposure, toner printing, ink-jet printing, flexography printing, lithography printing, slurry coating, spraying an aqueous carbon suspension, impregnation, and combinations thereof.

In select embodiments, a lead acid battery may be provided with a separator having positive ribs and/or negative ribs that may be solid ribs, discrete broken ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, discrete teeth or toothed ribs, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof.

In select embodiments, a lead acid battery is provided and may be one of a flat-plate battery, a flooded lead acid battery, an enhanced flooded lead acid battery ("EFB"), a valve regulated lead acid ("VRLA") battery, a deep-cycle battery, a gel battery, an absorptive glass mat ("AGM") battery, a tubular battery, an inverter battery, a vehicle battery, a starting-lighting-ignition ("SLI") vehicle battery, an idling-start-stop ("ISS") vehicle battery, an automobile battery, a truck battery, a motorcycle battery, an all-terrain vehicle battery, a forklift battery, a golf cart battery, a hybrid-electric vehicle ("HEV") battery, an electric vehicle battery, an e-rickshaw battery, an energy storage system battery, a storage battery, and an e-bike battery.

In certain select embodiments of the present invention, a vehicle battery is provided as one of an automobile battery, a truck battery, a motorcycle battery, an all-terrain vehicle battery, a starting-lighting-ignition ("SLI") vehicle battery, an idling-start-stop ("ISS") vehicle battery, a forklift battery, a golf cart battery, a hybrid-electric vehicle ("HEV") battery, an electric vehicle battery, an e-rickshaw battery, and an e-bike battery.

In certain select embodiments of the present invention, a vehicle is provided as one of an automobile, a truck, a motorcycle, an all-terrain vehicle, an idling-start-stop ("ISS") vehicle, a forklift, a golf cart, a hybrid-electric vehicle ("HEV"), an electric vehicle, a light electric vehicle, an e-rickshaw, an e-scooter, e-trike, and an e-bike In accordance with at least certain select embodiments, the separator may be provided with ribs that are one or more of the following: solid ribs, discrete broken ribs, continuous ribs, discontinuous ribs, discontinuous peaks, discontinuous protrusions, angled ribs, linear ribs, longitudinal ribs extending substantially in a machine direction of the porous membrane, lateral ribs extending substantially in a cross-machine direction of the porous membrane, transverse ribs extending substantially in the cross-machine direction of the separator, teeth, toothed ribs, serrations, serrated ribs, battlements, battlemented ribs, curved ribs, sinusoidal ribs, disposed in a continuous zig-zag-sawtooth-like fashion, disposed in a broken discontinuous zig-zag-sawtooth-like fashion, grooves, channels, textured areas, embossments, dimples, columns, mini columns, porous, non-porous, mini ribs, cross-mini ribs, and combinations thereof.

At least a portion of the first plurality of ribs may be defined by an angle that may be neither parallel nor orthogonal relative to an edge of the separator. Furthermore, the angle may be defined as an angle relative to a machine direction of the porous membrane and the angle may be one of the following: between greater than zero degrees (0°) and less than 180 degrees (180°), and greater than 180 degrees (180°) and less than 360 degrees (360°). In certain aspects of disclosed embodiments, the angle may vary throughout the plurality of ribs.

In certain select aspects of the present invention, the first plurality of ribs may have a cross-machine direction spacing pitch of approximately 1.5 mm to approximately 10 mm, and the plurality of teeth or discontinuous peaks or protrusions may have a machine direction spacing pitch of approximately 1.5 mm to approximately 10 mm.

In certain select embodiments, the separator may be provided with a second plurality of ribs extending from a second surface of the porous membrane. The second plurality of ribs may be one or more of the following: solid ribs, discrete broken ribs, continuous ribs, discontinuous ribs, discontinuous peaks, discontinuous protrusions, angled ribs, linear ribs, longitudinal ribs extending substantially in a machine direction of the porous membrane, lateral ribs extending substantially in a cross-machine direction of the porous membrane, transverse ribs extending substantially in the cross-machine direction of the separator, teeth, toothed ribs, battlements, battlemented ribs, curved ribs, sinusoidal ribs, disposed in a continuous zig-zag-sawtooth-like fashion, disposed in a broken discontinuous zig-zag-sawtooth-like fashion, grooves, channels, textured areas, embossments, dimples, columns, mini columns, porous, non-porous, mini ribs, cross-mini ribs, and combinations thereof.

At least a portion of the second plurality of ribs may be defined by an angle that may be neither parallel nor orthogonal relative to an edge of the separator. Furthermore, the angle may be defined as an angle relative to a machine direction of the porous membrane and the angle may be one of the following: between greater than zero degrees (0°) and less than 180 degrees (180°), and greater than 180 degrees (180°) and less than 360 degrees (360°). In certain aspects of disclosed embodiments, the angle may vary throughout the plurality of ribs.

The second plurality of ribs have a cross-machine or machine direction spacing pitch of approximately 1.5 mm to approximately 10 mm.

The first surface may be provided with one or more ribs that are of a different height than the first plurality of ribs disposed adjacent to an edge of the lead acid battery separator. Likewise, the second surface may be provided with one or more ribs that are of a different height than the second plurality of ribs disposed adjacent to an edge of the lead acid battery separator.

In select embodiments, the polymer may be one of the following: a polymer, polyolefin, polyethylene, polypropylene, ultra-high molecular weight polyethylene ("UHMWPE"), phenolic resin, polyvinyl chloride ("PVC"), rubber, synthetic wood pulp ("SWP"), lignins, glass fibers, synthetic fibers, cellulosic fibers, and combinations thereof.

A fibrous mat may be provided. The mat may be one of the following: glass fibers, synthetic fibers, silica, at least one performance enhancing additive, latex, natural rubber, synthetic rubber, and combinations thereof, and may be nonwoven, woven, mesh, fleece, net, paper, pasting paper, AGM, and/or the like, and combinations thereof.

In addition, the separator may be a cut-piece, a leaf, a pocket, a sleeve, a wrap, a Z wrap, an envelope, and a hybrid envelope.

According to at least certain select exemplary embodiments, a separator may be provided with resilient means for mitigating separator deflection.

In accordance with at least certain select embodiments, a lead acid battery is provided with a positive electrode, and a negative electrode provided with swollen negative active material. A separator is provided with at least a portion of the separator being disposed between the positive electrode and the negative electrode. An electrolyte is provided that substantially submerges at least a portion of the positive electrode, at least a portion of the negative electrode, and at least a portion of the separator. In at least certain select embodiments, the separator may have a porous membrane made of at least a polymer and a filler. A first plurality of ribs may extend from a surface of the porous membrane. The ribs may be arranged such as to prevent acid starvation in the presence of NAM or PAM swelling. The lead acid battery may operate in any one or more of the following conditions: in motion, stationary, in a backup power application, in a cycling applications, in a partial state of charge, and any combination thereof.

The ribs may be provided with a plurality of teeth, or discontinuous peaks or protrusions. Each tooth, or discontinuous peak or protrusion may be at least approximately 1.5 mm from another of the plurality of discontinuous peaks. A continuous base portion may be provided, with the plurality of teeth, or discontinuous peaks or protrusions extending therefrom.

The first plurality of ribs may further be provided so as to enhance acid mixing in a battery, particularly during movement of the battery. The separator may be disposed parallel to a start and stop motion of the battery. The separator may be provided with a mat adjacent to the positive electrode, the negative electrode, or the separator. The mat may be at least partially made of glass fibers, synthetic fibers, silica, at least one performance enhancing additive, latex, natural rubber, synthetic rubber, and any combination thereof. The mat may be nonwoven, woven, mesh, fleece, net, and combinations thereof.

In at least certain select embodiments of the present invention, the lead acid battery may be a flat-plate battery, a flooded lead acid battery, an enhanced flooded lead acid battery ("EFB"), a valve regulated lead acid ("VRLA") battery, a deep-cycle battery, a gel battery, an absorptive glass mat ("AGM") battery, a tubular battery, an inverter battery, a vehicle battery, a starting-lighting-ignition ("SLI") vehicle battery, an idling-start-stop ("ISS") vehicle battery, an automobile battery, a truck battery, a motorcycle battery, an all-terrain vehicle battery, a forklift battery, a golf cart battery, a hybrid-electric vehicle battery, an electric vehicle battery, an e-rickshaw battery, or an e-bike battery, or any combination thereof.

In certain embodiments, the battery may operate at a depth of discharge of between approximately 1% and approximately 99%.

In accordance with at least one embodiment, a microporous separator with optimized tortuosity is provided. Tortuosity refers to the degree of curvature/turns that a pore takes over its length. Thus, a microporous separator with optimized tortuosity will present a shorter path for ions to travel through the separator, thereby decreasing electrical resistance, without leading to electrical shorting. Microporous separators in accordance with such embodiments can have decreased thickness, increased pore size, more interconnected pores, and/or more open pores.

In accordance with at least certain selected embodiments, a microporous separator with increased porosity, or a separator with a different pore structure whose porosity is not significantly different from a known separator, and/or decreased thickness is provided. An ion will travel more rapidly though a microporous separator with optimized porosity, increased void volume, optimized tortuosity, and/or decreased thickness, thereby decreasing electrical resistance. Such decreased thickness may result in decreased overall weight of the battery separator, which in turn decreases the weight of the enhanced flooded battery in which the separator is used, which in turn decreases the weight of the overall vehicle in which the enhanced flooded battery is used. Such decreased thickness may alternatively result in increased space for the positive active material ("PAM") or the negative active material ("NAM") in the enhanced flooded battery in which the separator is used.

In accordance with at least certain selected embodiments, a microporous separator with increased wettability (in water or acid) is provided. The separator with increased wettability will be more accessible to the electrolyte ionic species, thus facilitating their transit across the separator and decreasing electrical resistance.

In accordance with at least one embodiment, a microporous separator with decreased final oil content is provided. Such a microporous separator will also facilitate lowered ER (electrical resistance) in an enhanced flooded battery or system.

The separator may contain improved fillers that have increased friability, and that may increase the porosity, pore size, internal pore surface area, wettability, and/or the surface area of the separator. In some embodiments, the improved fillers have high structural morphology and/or reduced particle size and/or a different amount of silanol groups than previously known fillers and/or are more hydroxylated than previously known fillers. The improved fillers may absorb more oil and/or may permit incorporation of a greater amount of processing oil during separator formation, without concurrent shrinkage or compression when the oil is removed after extrusion. The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (such as polar species, such as metals) that increase the ionic diffusion, and facilitate the flow of electrolyte and ions across the separator. Such also leads to decreased overall electrical resistance as such a separator is used in a flooded battery, such as an enhanced flooded battery.

The microporous separator further has a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In some instances, the improved battery with the improved separator with the improved pore morphology and/or fibril morphology may exhibit 20% lower, in some instances, 25% lower, in some instances, 30% lower electrical resistance, and in some instances, even more than a 30% drop in electrical resistance ("ER") (which may reduce battery internal resistance) while such a separator retains and maintains a balance of other key, desirable mechanical properties of lead acid battery separators. Further, in certain embodiments, the separators described herein have a novel and/or improved pore shape such that more electrolyte flows through or fills the pores and/or voids as compared to known separators.

In addition, the present disclosure provides improved enhanced flooded lead acid batteries having one or more improved battery separators for an enhanced flooded battery, which separator combines for the battery the desirable features of decreased acid stratification, lowered voltage drop (or an increase in voltage drop durability), and increased CCA, in some instances, more than 8%, or more than 9%, or in some embodiments, more than 10%, or more than 15%, increased CCA. Such an improved separator may result in an enhanced flooded battery whose performance matches or even exceeds the performance of an AGM battery. Such low electrical resistance separator may be also treated to result in an enhanced flooded lead acid battery having reduced water loss.

The separator may contain one or more performance enhancing additives, such as a surfactant, along with other additives or agents, residual oil, and fillers. Such performance enhancing additives can reduce separator oxidation and/or even further facilitate the transport of ions across the membrane contributing to the overall lowered electrical resistance for the enhanced flooded battery described herein.

The separator for a lead acid battery described herein may have a polyolefin microporous membrane, wherein the polyolefin microporous membrane has: a polymer, such as polyethylene, such as ultrahigh molecular weight polyethylene, particle-like filler, and processing plasticizer (optionally with one or more additional additives or agents). The polyolefin microporous membrane may have the particle-like filler in an amount of 40% or more by weight of the membrane. And the ultrahigh molecular weight polyethylene may have polymer in a shish-kebab formation has a plurality of extended chain crystals (the shish formations) and a plurality of folded chain crystals (the kebab formations), wherein the average repetition or periodicity of the kebab formations is from 1 nm to 150 nm, preferably, from 10 nm to 120 nm, and more preferably, from 20 nm to 100 nm (at least on portions of the rib side of the separator).

The average repetition or periodicity of the kebab formations is calculated in accordance with the following definition:
  The surface of the polyolefin microporous membrane is observed using a scanning electron microscope ("SEM") after being subjected to metal vapor deposition, and then the image of the surface is taken at, for example 30,000 or 50,000-fold magnification at 1.0 kV accelerating voltage.
  In the same visual area of the SEM image, at least three regions where shish-kebab formations are continuously extended in the length of at least 0.5 µm or longer are indicated. Then, the kebab periodicity of each indicated region is calculated.
  The kebab periodicity is specified by Fourier transform of concentration profile (contrast profile) obtained by projecting in the vertical direction to the shish formation of the shish-kebab formation in each indicated region to calculate the average of the repetition periods.
  The images are analyzed using general analysis tools, for example, MATLAB (R2013a).
  Among the spectrum profiles obtained after the Fourier transform, spectrum detected in the short wavelength region are considered as noise. Such noise is mainly caused by deformation of contrast profile. The contrast profiles obtained for separators in accordance with the present invention appear to generate square-like waves (rather than sinusoidal waves). Further, when the contrast profile is a square-like wave, the profile after the Fourier transform becomes a Sine function and therefore generates plural peaks in the short wavelength region besides the main peak indicating the true kebab periodicity. Such peaks in the short wavelength region can be detected as noise.

In some embodiments, the separator for a lead acid battery described herein has a filler selected from the group consisting of silica, precipitated silica, fumed silica, and precipitated amorphous silica; wherein the molecular ratio of OH to Si groups within said filler, measured by $^{29}$Si-NMR, is within a range of from 21:100 to 35:100, in some embodiments, 23:100 to 31:100, in some embodiments, 25:100 to 29:100, and in certain preferred embodiments, 27:100 or higher.

Silanol groups change a silica structure from a crystalline structure to an amorphous structure, since the relatively stiff covalent bond network of Si—O has partially disappeared. The amorphous-like silicas such as Si(—O—Si)$_2$(—OH)$_2$ and Si(—O—Si)$_3$(—OH) have plenty of distortions, which may function as various oil absorption points. Therefore oil absorbability becomes high when the amount of silanol groups (Si—OH) is increased for the silica. Additionally, the separator described herein may exhibit increased hydrophilicity and/or may have higher void volume and/or may have certain aggregates surrounded by large voids when it has a silica with a higher amount of silanol groups and/or hydroxyl groups than a silica used with a known lead acid battery separator.

The microporous separator further has a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In certain selected embodiments, a vehicle may be provided with a lead acid battery as generally described herein. The battery may further be provided with a separator as described herein. The vehicle may be an automobile, a truck, a motorcycle, an all-terrain vehicle, a forklift, a golf cart, a hybrid vehicle, a hybrid-electric vehicle battery, an electric vehicle, an idling-start-stop ("ISS") vehicle, an e-rickshaw, an e-bike, an e-bike battery, and combinations thereof.

In certain preferred embodiments, the present disclosure or invention provides a flexible battery separator whose components and physical attributes and features synergistically combine to address, in unexpected ways, previously unmet needs in the deep cycle battery industry, with an improved battery separator (a separator having a porous membrane of polymer, such as polyethylene, plus a certain amount of a performance enhancing additive and ribs) that meets or, in certain embodiments, exceeds the performance of the previously known flexible, which are currently used in many deep cycle battery applications. In particular, the inventive separators described herein are more robust, less fragile, less brittle, more stable over time (less susceptible to degradation) than separators traditionally used with deep cycle batteries. The flexible, performance enhancing additive-containing and rib possessing separators of the present invention combine the desired robust physical and mechanical properties of a polyethylene-based separator with the capabilities of a conventional separator, while also enhancing the performance of the battery system employing the same.

In accordance with at least select embodiments, aspects or objects, disclosed herein or provided are novel or improved separators, battery separators, enhanced flooded battery separators, batteries, cells, and/or methods of manufacture and/or use of such separators, battery separators, enhanced flooded battery separators, cells, and/or batteries. In accordance with at least certain embodiments, the present disclosure or invention is directed to novel or improved battery separators for flooded batteries, enhanced flooded lead acid batteries, gel batteries, VRLA batteries, AGM batteries, and/or the like. In addition, there is disclosed herein methods, systems, and battery separators having improved acid availability at the electrodes, reduced or mitigated acid starvation, a reduced ER, improved puncture strength, improved separator CMD stiffness, improved oxidation resistance, reduced separator thickness, reduced basis weight, and any combination thereof. In accordance with at least particular embodiments, the present disclosure or invention is directed to an improved separator for flooded batteries, enhanced flooded lead acid batteries, gel batteries, VRLA batteries, AGM batteries, and/or the like wherein the separator has improved acid availability at the electrodes, reduced or mitigated acid starvation, a reduced ER, improved puncture strength, improved separator CMD stiffness, improved oxidation resistance, reduced separator thickness, reduced basis weight, or any combination thereof.

In accordance with at least certain embodiments, separators are provided that include or exhibit improved acid availability, reduced or mitigated acid starvation, a reduced ER, improved puncture strength, improved separator CMD stiffness, improved oxidation resistance, reduced separator thickness, reduced basis weight, and any combination thereof. In accordance with at least certain embodiments, separators are provided in battery applications for flat-plate batteries, tubular batteries, vehicle SLI, and HEV ISS applications, deep cycle applications, golf car or golf cart and e-rickshaw batteries, batteries operating in a partial state of charge ("PSOC"), inverter batteries; and storage batteries for renewable energy sources, and any combination thereof.

In accordance with at least select embodiments, the present disclosure or invention is directed to novel or improved separators for lead acid batteries, such as flooded lead acid batteries, and in particular enhanced flooded lead acid batteries ("EFBs"), and various other lead acid batteries, such as gel batteries, VRLA batteries, and absorptive glass mat ("AGM") batteries. In accordance with at least select embodiments, the present disclosure or invention is directed to novel or improved separators, battery separators, resilient separators, balanced separators, EFB separators, batteries, cells, systems, methods involving the same, vehicles using the same, methods of manufacturing the same, the use of the same, and combinations thereof. In addition, disclosed herein are methods, systems, and battery separators for enhancing battery life and reducing battery failure by reducing battery electrode acid starvation.

In accordance with at least selected embodiments, the present disclosure or invention is directed to novel or improved separators, battery separators, enhanced flooded battery separators, batteries, cells, and/or methods of manufacture and/or use of such separators, battery separators, enhanced flooded battery separators, cells, batteries, systems, methods, and/or vehicles using the same. In accordance with at least certain embodiments, the present disclosure or invention is directed to novel or improved battery separators, resilient separators, balanced separators, flooded lead acid battery separators, or enhanced flooded lead acid battery separators such as those useful for deep-cycling and/or partial state of charge ("PSoC") applications. Such applications may include such non-limiting examples as: electric motive machine applications, such as fork lifts and golf carts (sometimes referred to as golf cars), e-rickshaws, e-bikes, e-trikes, and/or the like; automobile applications such as starting lighting ignition ("SLI") batteries, such as those used for internal combustion engine vehicles; idle-start-stop ("ISS") vehicle batteries; hybrid vehicle applications, hybrid-electric vehicle applications; batteries with high power requirements, such as uninterrupted power supply ("UPS") or valve regulated lead acid ("VRLA"), and/or for batteries with high CCA requirements; inverters; and energy storage systems, such as those found in renewable and/or alternative energy systems, such as solar and wind power collection systems.

In accordance with at least selected embodiments, the present disclosure or invention is directed to separators, particularly separators for flooded lead acid batteries capable of reducing or mitigating acid starvation; reducing or mitigating acid stratification; reducing or mitigating dendrite growth; and having reduced electrical resistance and/or capable of increasing cold cranking amps. In addition, disclosed herein are methods, systems, and battery separators for enhancing battery life; improving acid availability at the electrodes; reducing or mitigating acid starvation; reducing or mitigating acid stratification; reducing to mitigating dendrite growth; reducing the effects of oxidation; reducing water loss; reducing internal resistance; increasing wettability; improving acid diffusion; improving cold cranking amps, improving uniformity, and any combination thereof in at least enhanced flooded lead acid batteries. In accordance with at least particular embodiments, the present disclosure or invention is directed to an improved separator for enhanced flooded lead acid batteries wherein the separator includes an improved and novel rib design, and improved separator resiliency.

In accordance with at least selected embodiments, the present disclosure or invention is directed to separators, resilient separators, balanced separators, particularly separators for flooded lead acid batteries, enhanced flooded lead acid batteries, gel batteries, VRLA batteries, AGM batteries, and/or the like capable of improving acid availability at the electrodes, reducing or mitigating acid starvation; reducing or mitigating acid stratification; reducing or mitigating dendrite growth; having reduced electrical resistance and/or capable of increasing cold cranking amps; having reduced electrical resistance and/or negative cross ribs; having low water loss, reduced electrical resistance and/or negative cross ribs; having dendrite blocking or prevention performance, characteristics and/or structures; having acid mixing prevention performance, characteristics and/or structures; having enhanced negative cross ribs; having glass mat on the positive and/or negative side of a PE membrane, piece, sleeve, fold, pocket, envelope, and/or the like; having the glass mat laminated to the PE membrane; and/or combinations or sub-combinations thereof.

In accordance with at least select embodiments, the present disclosure or invention is directed to novel or improved separators for lead acid batteries, such as flooded lead acid batteries, and in particular enhanced flooded lead acid batteries ("EFBs"), and various other lead acid batteries, such as VRLA batteries, gel batteries, and absorptive glass mat ("AGM") batteries. In accordance with at least select embodiments, the present disclosure or invention is directed to novel or improved separators, battery separators, resilient separators, balanced separators, EFB separators, separator membranes, batteries, cells, systems, methods involving the same, vehicles or devices using the same, methods of manufacturing the same, the use of the same, and combinations thereof. In addition, disclosed herein are methods, systems, and battery separators for enhancing battery life and reducing battery failure by reducing battery electrode acid starvation.

In accordance with at least certain embodiments, the present disclosure or invention is directed to novel or improved battery separators, resilient separators, balanced separators, flooded lead acid battery separators, enhanced flooded lead acid battery separators, gel battery separators, AGM battery separators, and/or the like, and combinations thereof.

In accordance with at least certain embodiments, and in addition to the exemplary separators discussed above, such separators may be used or useful in a variety of applications. Such exemplary applications may include: deep-cycling and/or partial state of charge ("PSoC") applications; electric motive machine applications, such as fork lifts and golf carts (sometimes referred to as golf cars), e-rickshaws, e-bikes, e-trikes, and/or the like; automobile applications such as starting lighting ignition ("SLI") batteries, such as those used for internal combustion engine vehicles; idle-start-stop ("ISS") vehicle applications; hybrid vehicle applications; hybrid-electric vehicle applications; batteries with high power requirements, such as uninterrupted power supply ("UPS"), or valve regulated lead acid ("VRLA") batteries, and/or for batteries with high CCA requirements; inverters; and energy storage systems, such as those found in renewable and/or alternative energy systems, such as solar and wind power collection systems; any battery in motion; any stationary battery; and/or the like; and combinations thereof.

In accordance with at least certain embodiments, and in addition to the exemplary separators and applications discussed above, such separators and applications may be used or useful in accomplishing a variety of capabilities. Such exemplary capabilities may include: increasing, enhancing, or improving battery life; increasing, enhancing, or improving acid availability to both the positive and negative electrodes; reducing or mitigating acid starvation; reducing or mitigating acid stratification; increasing, enhancing, or improving charge acceptance; reducing or mitigating the effects of oxidation; reducing or mitigating water loss; increasing, enhancing, or improving wettability; improving, enhancing, or improving acid diffusion; reducing or mitigating dendrite growth; having reduced electrical resistance; increasing, enhancing, or improving cold cranking amps; and/or the like; and combinations thereof.

In accordance with at least certain embodiments, and in addition to the exemplary separators, applications, and capabilities discussed above, such separators, applications, and capabilities may be used or useful in a variety of methods, and/or systems. Such methods and/or systems may include: increasing, enhancing, or improving battery life; increasing, enhancing, or improving acid availability to both the positive and negative electrodes; reducing or mitigating acid starvation; reducing or mitigating acid stratification; increasing, enhancing, or improving charge acceptance; reducing or mitigating the effects of oxidation; reducing or mitigating water loss; increasing, enhancing, or improving wettability; improving, enhancing, or improving acid diffusion; reducing or mitigating dendrite growth; having reduced electrical resistance; increasing, enhancing, or improving cold cranking amps; and/or the like; and combinations thereof.

In accordance with at least particular embodiments, the present disclosure or invention is directed to improved battery separators that may include an improved and novel rib design, and improved separator resiliency. In accordance with at least particular embodiments, the present disclosure or invention is directed to an improved separator for enhanced flooded lead acid batteries wherein the separator includes performance enhancing additives or coatings, carbon additives, nucleation additives, increased oxidation resistance, optimized porosity, increased void volume, amorphous silica, higher oil absorption silica, higher silanol group silica, silica with an OH to Si ratio of 21:100 to 35:100, a shish-kebab structure or morphology, a polyolefin microporous membrane containing particle-like filler in an amount of 40% or more by weight of the membrane and polymer, such as ultrahigh molecular weight polyethylene ("UHMWPE"), having shish-kebab formations with extended chain crystal (shish formation) and folded chain crystal (kebab formation) and the average repetition periodicity of the kebab formation from 1 nm to 150 nm, decreased sheet thickness, optimized tortuosity, reduced thickness, reduced oil content, increased wettability, increased acid diffusion, and/or the like, and combinations thereof.

Disclosed, shown, provided, or claimed herein are exemplary embodiments, objects or aspects of improved separators for lead acid batteries, improved lead acid batteries incorporating the improved separators, and vehicles, devices, or systems incorporating the same (as well as related methods of manufacture, use, or the like). A lead acid battery separator is provided with a porous membrane with a plurality of ribs extending from a surface thereon. The plurality of ribs preferably includes both positive ribs and negative ribs having similar heights. The ribs are preferably provided with a plurality of discontinuous peaks arranged such as to provide resilient support for the porous membrane in order to resist forces exerted by active material swelling and thus mitigate the effects of acid starvation associated with such swelling, and increasing the acid availability at the electrodes. A lead acid battery is further provided that incorporates the provided or preferred separator. Such a lead acid battery may be a flooded lead acid battery, an enhanced flooded lead acid battery, a gel battery, an AGM battery, and may operated or may be provided as operating in a partial state of charge. Systems incorporating such a lead acid battery are also provided, such as a vehicle, device or any other energy storage system, such as associated with solar or wind energy collection, smart grid, or the like. Other exemplary embodiments, aspects or objects are provided such as having any one or more of the following: increased or improved acid availability, reduced or mitigated acid starvation, and other improvements.

The described novel, improved, or preferred structures, uses, devices, and/or the like provide solutions to the prior issues, problems, or needs related to, for example, but not limited to, reduced battery life, operating in a PSoC, low acid availability, acid starvation, acid stratification, oxidation, charge acceptance, water loss, wettability, fill time, acid diffusion, dendrite growth, dendrite shorts, separator resilience, plate or grid destruction, NAM swelling, PAM swelling, NAM loss, PAM loss, reduced electrical resistance, cold cranking amps, compressed cells, and/or the like.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" may be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

The invention claimed is:

1. A lead acid battery separator comprising:
a porous membrane including a nucleation additive and having a backweb with a first surface, a second surface, and a backweb thickness defined as the distance between said first surface and said second surface;
a first array of ribs extending from said first surface, and a second array of ribs extending from said second surface;
said first array of ribs having a first height, and said second array of ribs having a second height;
wherein the backweb does not show deformation at compression pressures up to 27.5 kPa;
wherein said first height is no more than 300%, no more than 200%, or no more than 100% of said second height;
wherein each of said ribs has a rib base width and a rib top width, the rib top width less than the rib base width, and the rib top width no greater than 450 µm; and
wherein the nucleation additive is conductive and has a specific surface area of at least 1,250 m²/g, and
wherein a number and size of the ribs in the first array of ribs is configured to a contact 3.8% of a surface area of a positive electrode when the separator is used in a battery.

2. The lead acid battery separator of claim 1 further comprising:
a total thickness that is equal to the sum of the backweb thickness, the first rib height, and the second rib height; wherein said total thickness is no more than 1.5 mm.

3. The lead acid battery separator of claim 1, wherein either of
said first array of ribs, said second array of ribs, or both said first array of ribs and said second array of ribs comprise a top rib width no greater than 400 µm, no greater than 300 µm, no greater than 200 µm, or no greater than 100 µm.

4. The lead acid battery separator of claim 1, wherein the backweb thickness is 250 microns, and a total thickness of the backweb, the first array of ribs and the second array of ribs is between 800 microns and 1.0 mm.

5. The lead acid battery separator of claim 1 wherein:
said nucleation additive is at least one of carbon and Barium Sulfate ($BaSO_4$);
said nucleation additive is conductive and is selected from the group consisting of: carbon, conductive carbon, graphite, artificial graphite, activated carbon, carbon paper, acetylene black, carbon black, high surface area carbon black, graphene, high surface area graphene, keitjen black, carbon fibers, carbon filaments, carbon nanotubes, open-cell carbon foam, a carbon mat, carbon felt, carbon Buckminsterfullerene ("Bucky Balls"), an aqueous carbon suspension, flake graphite, oxidized carbon, and combinations thereof;
said nucleation additive is within said porous membrane;
said nucleation additive is on said porous membrane; or
said nucleation additive is applied to said surface of said porous membrane, a scrim, and/or a mat by a method selected from the group consisting of; roller coating, chemical vapor deposition, co-extrusion, a controlled burn to char said surface, a controlled burn to char said surface via plasma exposure, a controlled burn to char said surface via UV exposure, toner printing, ink-jet printing, flexography printing, lithography printing, slurry coating, spraying an aqueous carbon suspension, impregnation, and combinations thereof.

6. A lead acid battery comprising:
a positive electrode and a negative electrode;
a separator, wherein at least a portion of said separator is disposed between said positive electrode and said negative electrode;
said separator comprising a porous polyolefin and/or polyvinyl and/or rubber membrane backweb, wherein said backweb comprises a positive surface with a first array of ribs extending therefrom, wherein said positive surface faces said positive electrode;
wherein said first array of ribs comprises at least 20 ribs in contact with said positive electrode; wherein each of said at least 20 ribs comprises a first rib top width that is no greater than 450 µm and a first rib top width that is less than a first rib base width; and
the separator including a conductive nucleation additive, said nucleation additive having a specific surface area of at least 1,250 m²/g.

7. The lead acid battery of claim 6, wherein said separator has a width of at least 120 mm or at least 160 mm.

8. The lead acid battery of claim 6, wherein said first array of ribs comprises at least 30 ribs, at least 40 ribs, or at least 50 ribs in contact with said positive electrode.

9. The lead acid battery of claim 6, wherein said first rib top width is no greater than 400 µm, no greater than 300 µm, or no greater than 200 µm.

10. The lead acid battery of claim 6 wherein:
said nucleation additive is at least one of carbon and barium sulfate ($BaSO_4$);
wherein said nucleation additive is conductive and is selected from the group consisting of: carbon, conductive carbon, graphite, artificial graphite, activated carbon, carbon paper, acetylene black, carbon black, high surface area carbon black, graphene, high surface area graphene, keitjen black, carbon fibers, carbon filaments, carbon nanotubes, open-cell carbon foam, a carbon mat, carbon felt, carbon Buckminsterfullerene ("Bucky Balls"), an aqueous carbon suspension, flake graphite, oxidized carbon, and combinations thereof;
said nucleation additive is within said porous membrane;
said nucleation additive is on said porous membrane; or
said nucleation additive is applied to said surface of said porous membrane, a scrim, and/or a mat by a method selected from the group consisting of; roller coating, chemical vapor deposition, co-extrusion, a controlled burn to char said surface, a controlled burn to char said surface via plasma exposure, a controlled burn to char said surface via UV exposure, toner printing, ink-jet printing, flexography printing, lithography printing, slurry coating, spraying an aqueous carbon suspension, impregnation, and combinations thereof.

11. The lead acid battery of claim 6, wherein each of said first array of ribs comprises a series of discontinuous peaks; each discontinuous peak being in complete contact with said positive electrode creating a discontinuous supported area of said positive electrode comprising a plurality of supported portions of said positive electrode, and an unsupported area of said positive electrode; wherein a distance between adjacent supported portions of said plurality of supported portions of said positive electrode is no more than 6.0 mm, no more than 5.0 mm, no more than 4.0 mm, no more than 3.0 mm, no more than 2.0 mm, no more than 1.0 mm.

12. The lead acid battery of claim 6, wherein said porous membrane backweb comprises a second surface facing said negative electrode, having a second array of ribs extending therefrom.

13. The lead acid battery of claim 12, wherein said first array of ribs have a first height and said second array of ribs a second height; and
wherein said first height is less than 300% of said second height, less than 200% of said second height, or less than 100% of said second height.

14. The lead acid battery of claim 12, wherein said backweb has a backweb thickness defined as the distance between said first surface and said second surface;
said first array of ribs having a first height and said second array of ribs having a second height;
said separator having an overall thickness equal to the sum of said backweb thickness, said first rib height and said second rib height; and
wherein said overall thickness is less than 1.5 mm.

15. The lead acid battery separator of claim 12, wherein said second array of ribs comprises a second rib top width that is no greater than 400 µm, no greater than 300 µm, no greater than 200 µm, no greater than 100 µm.

16. The lead acid battery of claim 12, wherein said second array of ribs are chosen from the group consisting of solid ribs, discrete broken ribs, continuous ribs, discontinuous ribs, angled ribs, linear ribs, longitudinal ribs extending substantially in a machine direction of the porous membrane, lateral ribs extending substantially in a cross-machine direction of the porous membrane, transverse ribs extending substantially in a cross-machine direction of the porous membrane, cross ribs extending substantially in a cross-machine direction of the porous membrane, discrete teeth or toothed ribs, serrations, serrated ribs, battlements or battlemented ribs, curved or sinusoidal ribs, disposed in a solid or broken zig-zag-like fashion, grooves, channels, textured areas, embossments, dimples, porous, non-porous, mini ribs or cross-mini ribs, and combinations thereof;
wherein said battery is one chosen from the group consisting of a flat-plate battery, a flooded lead acid battery, an enhanced flooded lead acid battery ("EFB"), a valve regulated lead acid ("VRLA") battery, a deep-cycle battery, a gel battery, an absorptive glass mat ("AGM") battery, a tubular battery, an inverter battery, a vehicle battery, a starting-lighting-ignition ("SLI") vehicle battery, an idling-start-stop ("ISS") vehicle battery, an automobile battery, a truck battery, a motorcycle battery, an all-terrain vehicle battery, a forklift battery, a golf cart battery, a hybrid-electric vehicle ("HEV") battery, an electric vehicle battery, an e-rickshaw battery, an energy storage system battery, a storage battery, and an e-bike battery;
wherein said lead acid battery is one of a flat plate battery, a tubular battery, a flooded lead acid battery, an enhanced flooded lead acid battery, a gel battery, an absorptive glass mat battery, a deep cycle battery, a battery prone to NAM and/or PAM swelling, and a battery operating in a partial state of charge; or
wherein said lead acid battery is one of a stationary battery and a battery in motion.

17. A lead acid battery separator comprising:
a porous membrane including a nucleation additive and having a backweb with a first surface, a second surface, and a backweb thickness defined as the distance between said first surface and said second surface;
a first array of ribs extending from said first surface, and a second array of ribs extending from said second surface;
said first array of ribs having a first height, and said second array of ribs having a second height;
wherein the backweb does not show deformation at compression pressures up to 27.5 kPa;
wherein said first height is no more than 300%, no more than 200%, or no more than 100% of said second height;
wherein each of said ribs has a rib base width and a rib top width, the rib top width less than the rib base width, and the rib top width no greater than 450 µm;
wherein the nucleation additive is conductive and has a specific surface area of at least 1,250 $m^2/g$, wherein each of said ribs has a trapezoidal shape and a 7° draft angle.

18. The lead acid battery of claim 1, wherein each rib of said first array of ribs is segmented and comprised of multiple rib teeth extending from said first surface, and each rib of said second array of ribs is segmented and comprised of multiple rib teeth extending from said second surface.

19. The lead acid battery of claim 6, wherein each rib of said first array of ribs is segmented and comprised of multiple rib teeth extending from said first surface, and each rib of said second array of ribs is segmented and comprised of multiple rib teeth extending from said second surface.

* * * * *